US007673615B2

(12) United States Patent
Oe et al.

(10) Patent No.: US 7,673,615 B2
(45) Date of Patent: Mar. 9, 2010

(54) INTERNAL COMBUSTION ENGINE KNOCKING JUDGING DEVICE AND KNOCKING JUDGING METHOD

(75) Inventors: Shuhei Oe, Kariya (JP); Kouzi Ohara, Aichi-ken (JP); Satoshi Masuda, Kariya (JP); Yuuichi Takemura, Anjo (JP); Rihito Kaneko, Aichi-ken (JP); Kenji Kasashima, Aichi-ken (JP); Masatomo Yoshihara, Toyota (JP); Kenji Senda, Okazaki (JP); Norihito Hanai, Toyota (JP); Yasuhiro Yamasako, Toyota (JP)

(73) Assignees: Toyota Jidosha Kabushiki Kaisha, Toyota-shi (JP); Denso Corporation, Kariya-shi (JP); Nippon Soken, Inc., Nishio-shi (JP)

( * ) Notice: Subject to any disclaimer, the term of this patent is extended or adjusted under 35 U.S.C. 154(b) by 65 days.

(21) Appl. No.: 12/092,163

(22) PCT Filed: Oct. 1, 2007

(86) PCT No.: PCT/JP2007/069541

§ 371 (c)(1),
(2), (4) Date: Jun. 17, 2008

(87) PCT Pub. No.: WO2008/044623

PCT Pub. Date: Apr. 17, 2008

(65) Prior Publication Data
US 2008/0262705 A1    Oct. 23, 2008

(30) Foreign Application Priority Data
Oct. 6, 2006    (JP)    ............................. 2006-274948
May 10, 2007    (JP)    ............................. 2007-125892

(51) Int. Cl.
*F02P 5/00*    (2006.01)
*G01L 23/22*    (2006.01)

(52) U.S. Cl. ............................ 123/406.29; 123/406.34; 73/35.01; 73/35.09

(58) Field of Classification Search ............ 123/406.29, 123/406.33–406.39; 73/35.01, 35.03, 35.06, 73/35.09
See application file for complete search history.

(56) References Cited

U.S. PATENT DOCUMENTS 5,230,316 A * 7/1993 Ichihara et al. ......... 123/406.38

(Continued)

FOREIGN PATENT DOCUMENTS

JP    3 96641    4/1991

(Continued)

*Primary Examiner*—John T Kwon
(74) *Attorney, Agent, or Firm*—Oblon, Spivak, McClelland, Maier & Neustadt, L.L.P.

(57) ABSTRACT

An engine ECU executes: calculating 15-degrees integrated value integrating vibration intensity for each of six crank angle ranges; detecting an amount of change in the 15-degrees integrated value between ignition cycles; specifying two ranges having larger amounts of change; specifying a crank angle having intensity larger than that of a neighboring crank angle in a search range determined to be the same as the specified ranges; calculating a coefficient of correlation K corresponding to a difference between a vibration waveform and a knock waveform model while the specified crank angle is matched with a timing at which intensity peaks in the knock waveform model; and, if the coefficient of correlation K is larger than a threshold value K(0), determining that knock has occurred.

84 Claims, 29 Drawing Sheets

U.S. PATENT DOCUMENTS

| | | | |
|---|---|---|---|
| 5,347,846 A * | 9/1994 | Kitano et al. | 73/35.04 |
| 6,701,894 B2 * | 3/2004 | Katagami | 123/406.33 |
| 7,263,430 B2 * | 8/2007 | Kasashima et al. | 701/111 |
| 2005/0251320 A1 | 11/2005 | Kasashima et al. | |
| 2006/0136117 A1 | 6/2006 | Kaneko et al. | |
| 2007/0012090 A1 * | 1/2007 | Yoshihara et al. | 73/35.09 |

FOREIGN PATENT DOCUMENTS

| | | |
|---|---|---|
| JP | 8 4580 | 1/1996 |
| JP | 11-270400 | 10/1999 |
| JP | 2003 21032 | 1/2003 |
| JP | 2005 188297 | 7/2005 |
| JP | 2006 307708 | 11/2006 |
| JP | 2006 307711 | 11/2006 |

* cited by examiner ental COMBUSTION ENGINE
KNOCKING JUDGING DEVICE AND
KNOCKING JUDGING METHOD

TECHNICAL FIELD

The present invention relates to a knock determination device and a knock determination method for an internal combustion engine and, more specifically, to knock determination based on vibration waveform of the internal combustion engine.

BACKGROUND ART

Conventionally, various methods of detecting knocking (knock) of an internal combustion engine have been known. By way of example, a technique has been known which determines that knock has occurred when vibration intensity of an internal combustion engine is above a threshold value. It is possible, however, that noise such as vibration experienced when an intake valve or an exhaust valve is closed has intensity higher than the threshold value, while knocking does not occur. This may leads to an erroneous determination that knock has occurred, though knock has not occurred. Therefore, techniques for determining presence/absence of knocking based on vibration waveform to take into consideration characteristics other than the intensity, such as crank angle at which vibration occurs or attenuation factor have been proposed.

Japanese Patent Laying-Open No. 2003-021032 discloses a knock control device for an internal combustion engine, including a knock sensor for detecting knocking of the internal combustion engine, a statistical processing unit for statistically processing an output signal detected by the knock sensor, a first temporary determining unit for determining knock occurrence based on the result of processing by the statistical processing unit, a second temporary determining unit for determining knock occurrence based on the waveform of the output signal detected by the knock sensor, and a final knock determining unit for finally determining knock occurrence based on the temporary knock determination by the first temporary determining unit and the temporary knock determination by the second temporary determining unit. The second temporary determining unit temporarily determines occurrence of a knock based on a determination period in which the output signal output from the knock sensor is above a prescribed value, and on a maximum value of the output signal detected in the determination period. The final knock determining unit finally determines that knock has occurred, if both the first and second temporary determining units determined that knock has occurred.

Assuming that the knock occurrence is determined temporarily based on the determination period in which the output signal output from the knock sensor is above a prescribed value and on a maximum value of the output signal detected in the determination period as in the knock control device described in Japanese Patent Laying-Open No. 2003-021032, erroneous determination may be made if vibration of high intensity occurs regularly by a cause other than knocking in the internal combustion engine. Further, as the knock occurrence is determined based on the maximum value in the determination period in which the output signal output from the knock sensor is above a prescribed value, erroneous determination may be made if vibration caused not by knocking has higher vibration intensity than the vibration caused by knocking.

DISCLOSURE OF THE INVENTION

An object of the present invention is to provide a knock determination device and a knock determination method for an internal combustion engine that can reduce erroneous determination.

According to an aspect, the present invention provides a knock determination device for an internal combustion engine, including a knock sensor detecting intensity of vibration of the internal combustion engine, and an operation unit. The operation unit detects a waveform of vibration of the internal combustion engine based on the detected intensity, calculates, for each of a predetermined plurality of crank angle ranges, an integrated value integrating the vibration intensity of the waveform, detects an amount of change in the integrated value between ignition cycles, based on a difference between the integrated value and a predetermined value, specifies a predetermined number of crank angle ranges in which the amount of change in the integrated value is larger, among the plurality of crank angle ranges, specifies a crank angle having an intensity higher than the intensity in a neighboring crank angle, in a search range determined with reference to a specified crank angle range, and while a timing at which intensity becomes the highest in a waveform model defined as a reference of vibration in the internal combustion engine is matched with the specified crank angle, based on a result of comparison between the waveform and the waveform model in this state, determines whether knock has occurred in the internal combustion engine or not.

In this arrangement, vibration intensity of the internal combustion engine is detected. Based on the detected intensity, vibration waveform of the internal combustion engine is detected. An integrated value integrating vibration intensity of the waveform is calculated for each of a plurality of predetermined crank angle ranges. Based on a difference between the integrated value and a predetermined value, an amount of change in the integrated value between ignition cycles is detected. Among the plurality of crank angle ranges, a predetermined number of crank angle ranges in which the amount of change in the integrated value is large are specified. In a search range determined using the specified crank angle range, a crank angle having higher intensity than a neighboring crank angle is specified. In this manner, a crank angle that can be considered to have vibration intensity changed between ignition cycles can be specified. In other words, a crank angle at which occurrence of knocking is highly possible, can be specified. A timing at which intensity becomes the highest in a waveform model defined as a reference of vibration in the internal combustion engine is matched with the specified crank angle and, based on a result of comparison between the waveform and the waveform model in this state, whether knock has occurred in the internal combustion engine or not is determined. Therefore, it becomes possible to determine whether knock has occurred or not based on the portion where intensity abruptly increases in the detected waveform, and to avoid determination as to whether knock has occurred or not based on portions constantly having high intensity. Therefore, false determination that knocking occurred when actually there is no knocking can be avoided. As a result, erroneous determination can be reduced.

Preferably, the operation unit determines that knock has not occurred in the internal combustion engine if the specified crank angle is in a predetermined range.

In this arrangement, when the specified crank angle is in a predetermined range, it is determined that knock has not occurred in the internal combustion engine. Therefore, even when vibration intensity increases accidentally at a crank angle at which knocking occurrence is impossible, false determination that knock has occurred when actually there is no knocking can be avoided.

More preferably, a range same as the specified crank angle range is determined to be the search range.

In this arrangement, from the crank angle range in which the amount of change in integrated value between ignition cycles is large, a vibration peak is detected. Therefore, it becomes possible to detect the vibration peak from the crank angle range at which knocking occurrence is highly possible. Consequently, vibration peak derived from knocking can be specified with high accuracy.

More preferably, a range including the specified crank angle range and wider than the specified crank angle range is determined to be the search range.

In this arrangement, the vibration peak is detected from a range that encompasses the specified crank angle range and wider than the specified crank angle range. Therefore, it becomes possible to detect the vibration peak from the vicinity of crank angle range in which the amount of change of the integrated value is large. Thus, it becomes possible to detect the vibration peak from the crank angle range at which knocking occurrence is highly possible. Consequently, vibration peak derived from knocking can be specified with high accuracy.

More preferably, the operation unit determines that knock has not occurred in the internal combustion engine if a crank angle having higher intensity than a neighboring crank angle does not exist in the search range.

In this arrangement, if there is no crank angle having higher intensity than a neighboring crank angle in the search range, it is determined that knock has not occurred in the internal combustion engine. Therefore, it becomes possible to determine that knock has not occurred in the internal combustion engine, if a vibration peak cannot be found. Therefore, even when vibration intensity increases accidentally at a crank angle at which knocking occurrence is impossible, for example, outside the search range, false determination that knock has occurred when actually there is no knocking can be avoided.

More preferably, the operation unit detects the amount of change in the integrated value between ignition cycles, based on an absolute value of difference between the integrated value and the predetermined value.

In this arrangement, the amount of change in the integrated value between ignition cycles is detected, from the absolute value of difference between the integrated value and the predetermined value. Therefore, even if the integrated value decreases as in the case when knocking of low intensity follows knocking of high intensity, the amount of change in the integrated value can be calculated.

More preferably, the operation unit calculates ratio of the amount of change of the integrated value with respect to a sum of amounts of change in the integrated value. A number corresponding to the calculated ratio is determined to be the predetermined number.

In this arrangement, the crank angle ranges in which the amount of change in integrated value is large are specified by the number that corresponds to the ratio of amount of change of each integrated value with respect to the total sum of the amounts of change of integrated values. By way of example, if only one ratio among the ratios is larger than the predetermined ratio, "1" is defined as the predetermined number.

Therefore, if it is the case that the amount of change of the integrated value is large only in one range, it is possible to avoid specifying unnecessarily larger number of ranges. Consequently, it becomes possible to avoid specifying a range of which relative amount of change of the integrated value is large but absolute amount of change of the integrated value is small. As a result, it becomes possible to avoid erroneous specification of a crank angle at which vibration peaks, from the crank angle range in which knocking occurrence is unlikely.

More preferably, if at least one of the ratios is larger than a predetermined ratio, 1 is determined to be the predetermined number.

In this arrangement, if at least one of the ratios is higher than the predetermined ratio, "1" is defined as the predetermined number. Consequently, it becomes possible to avoid specifying a range of which relative amount of change of the integrated value is large but absolute amount of change of the integrated value is small. As a result, it becomes possible to avoid erroneous detection of a vibration peak from the crank angle range in which knocking occurrence is unlikely.

More preferably, vibration intensity and the waveform of the internal combustion engine are detected in a plurality of ignition cycles. The integrated value is calculated for each ignition cycle. The predetermined value is an integrated value of an ignition cycle preceding the ignition cycle in which the waveform to be compared with the waveform model is detected.

In this arrangement, the integrated value is calculated for each ignition cycle. The predetermined value is the integrated value in the ignition cycle prior to the ignition cycle in which the waveform to be compared with the waveform model is detected. Therefore, the amount of change in the integrated value between ignition cycles can be detected.

More preferably, the predetermined value is an integrated value of an ignition cycle preceding the ignition cycle in which the waveform to be compared with the waveform model is detected and satisfying a condition that maximum vibration intensity is smaller than a predetermined intensity.

In this arrangement, the predetermined value is the integrated value in the ignition cycle prior to the ignition cycle in which the waveform to be compared with the waveform model is detected and satisfying the condition that the maximum value of vibration intensity is smaller than the predetermined intensity. Therefore, it becomes possible to detect the amount of change of the integrated value using the integrated value of the ignition cycle of which maximum vibration intensity is smaller than a predetermined intensity, that is, the ignition cycle considered to be free of knocking, as a reference. Consequently, it becomes possible to prevent decrease in the amount of change in the integrated value despite the fact that actually knock has occurred. As a result, it becomes possible to specify with high accuracy a range in which knocking could possibly have occurred.

More preferably, the predetermined value is an integrated value of an ignition cycle preceding the ignition cycle in which the waveform to be compared with the waveform model is detected and continuously satisfying, for more than a predetermined number of times, the condition that maximum vibration intensity is larger than a predetermined intensity.

In this arrangement, the predetermined value is the integrated value in the ignition cycle prior to the ignition cycle in which the waveform to be compared with the waveform model is detected and continuously satisfying for more than a prescribed number of times the condition that the maximum value of vibration intensity is larger than the predetermined intensity. Therefore, even if the vibration intensity is high, it can be used as a reference for calculating the amount of change of the integrated value as long as it is in a steady state. Consequently, erroneous determination of a vibration having high intensity caused not by knocking to be the vibration caused by knocking can be avoided.

More preferably, the predetermined value is an operation value obtained by smoothing the integrated value.

In this arrangement, the operation value obtained by smoothing the integrated value is used as the predetermined value. Therefore, it becomes possible to detect the amount of change in the integrated value using the operation value that does not change much between ignition cycles. Consequently, it becomes possible to prevent such a situation that references for detecting the amount of change of the integrated value differ considerably from one ignition cycle to another. As a result, stable and highly accurate determination of knocking occurrence becomes possible.

More preferably, the predetermined value is an operation value obtained by smoothing the integrated value in an ignition cycle of which maximum vibration intensity is smaller than a predetermined intensity.

In this arrangement, an operation value obtained by smoothing the integrated value of the ignition cycle of which maximum vibration intensity is smaller than the predetermined intensity is used as the predetermined value. Consequently, it is possible to calculate the operation value from, for example, integrated value excluding the integrated value of that ignition cycle in which knocking occurred. Therefore, the amount of change of the integrated value is detected based on the operation value that does not change much between ignition cycles. Consequently, it becomes possible to prevent such a situation that references for detecting the amount of change of the integrated value differ considerably from one ignition cycle to another. As a result, stable and highly accurate determination of knocking occurrence becomes possible.

More preferably, the operation unit calculates a value corresponding to a difference between the waveform and the waveform model such that the value becomes larger as the difference between the waveform and the waveform model becomes smaller, and when the value corresponding to the difference becomes larger than a threshold value, determines that knock has occurred.

In this arrangement, the value corresponding to the difference between the waveform and the waveform model is calculated, which value is made larger as the difference between the waveform and the waveform model is smaller. When the value corresponding to the difference is larger than the threshold value, knocking is determined to have occurred. Thus, it is possible to determine whether knock has occurred or not with high accuracy based on the waveform.

According to another aspect, the present invention provides a knock determination device for an internal combustion engine, including a knock sensor detecting intensity of vibration of the internal combustion engine, and an operation unit. The operation unit detects a waveform of vibration of the internal combustion engine based on the detected intensity, calculates, for each of a predetermined plurality of crank angle ranges, an integrated value integrating the vibration intensity of the waveform, detects an amount of change in the integrated value between ignition cycles for each of the plurality of crank angle ranges, specifies a predetermined number of crank angle ranges in which the amount of change in the integrated value is larger, among the plurality of crank angle ranges, determines whether the integrated value in the specified range has changed not because of knocking, if it is determined that the integrated value in the specified range has changed not because of knocking, corrects the detected vibration waveform such that amount of change in the integrated value in the specified range becomes smaller, calculates for each of the plurality of crank angle ranges, an integrated value integrating vibration intensities of the corrected waveform, and determines whether knock has occurred or not using a sum of each of the integrated values of the corrected waveform.

In this arrangement, vibration intensity of the internal combustion engine is detected. Based on the detected intensity, vibration waveform of the internal combustion engine is detected. An integrated value integrating vibration intensity of the waveform is calculated for each of a plurality of predetermined crank angle ranges. An amount of change of the integrated value between ignition cycles is detected. Among the plurality of crank angle ranges, a predetermined number of crank angle ranges in which the amount of change in the integrated value is larger are specified. In this manner, a crank angle range that can be considered to have vibration intensity changed between ignition cycles can be specified. In other words, a crank angle range at which occurrence of knocking is highly possible, can be specified. It is noted, however, that vibration intensity can abruptly increase not because of knocking. Therefore, if it is determined that the integrated value in the specified range has changed not because of knocking, the detected vibration waveform is corrected such that the amount of change of the integrated value in the specified range becomes small. Consequently, it becomes possible to exclude from the detected waveform that portion which has intensity increased abruptly by a factor different from knocking (for example, operation of a component of the internal combustion engine). The integrated value obtained by integrating vibration intensity of the corrected waveform is calculated for each of the plurality of crank angle ranges. Using the sum of integrated values of corrected waveforms, whether knock has occurred or not is determined. Therefore, it is possible to determine whether knock has occurred or not using the waveform not much influenced by the intensity increased not by knocking. Therefore, erroneous determination of knocking occurrence can be avoided. As a result, a knock determination device or a knock determination method for an internal combustion engine that can reduce erroneous determination can be provided.

Preferably, if it is determined that the integrated value in the specified ranges has changed not because of knocking, the operation unit corrects the detected vibration waveform such that the integrated value of the specified range becomes equal to an integrated value calculated in the last ignition cycle, so that the amount of change of the integrated value becomes smaller.

In this arrangement, the detected vibration waveform is corrected such that the integrated value in the specified range becomes equal to the integrated value calculated in the previous ignition cycle. Consequently, it becomes possible to exclude from the detected waveform that portion which has intensity increased abruptly by a factor different from knocking.

More preferably, the operation unit detects the amount of change of the integrated value based on a difference of the integrated values of continuous ignition cycles.

In this arrangement, it is possible to detect the amount of change of the integrated value from the difference of the integrated values of continuous ignition cycles.

More preferably, the operation unit detects the amount of change of the integrated value based on an absolute value of difference of the integrated values of continuous ignition cycles.

In this arrangement, it is possible to detect the amount of change of the integrated value from the absolute value of difference of the integrated values of continuous ignition cycles.

More preferably, the operation unit calculates an operation value by smoothing the integrated value for each of the plurality of crank angle ranges, and if it is determined that the integrated value in the specified range has changed not because of knocking, corrects the detected vibration waveform such that the integrated value of the specified range becomes equal to the operation value, so that the amount of change of the integrated value becomes smaller.

In this arrangement, the detected vibration waveform is corrected such that the integrated value of the specified range becomes equal to the operation value obtained by smoothing the integrated value. Thus, it becomes possible to exclude from the detected waveform that portion which has intensity increased abruptly by a factor different from knocking.

More preferably, the operation unit detects the amount of change of the integrated value based on a difference between the integrated value and the operation value.

In this arrangement, it is possible to detect the amount of change of the integrated value from the difference between the integrated value and the operation value.

More preferably, the operation unit detects the amount of change of the integrated value based on an absolute value of difference between the integrated value and the operation value.

In this arrangement, it is possible to detect the amount of change of the integrated value from the absolute value of difference between the integrated value and the operation value.

More preferably, the operation unit specifies a crank angle having an intensity higher than the intensity of a neighboring crank angle, in a search range determined with reference to the specified range, and while a timing at which intensity becomes the highest in a waveform model defined as a reference of vibration in the internal combustion engine is matched with the specified crank angle, based on a result of comparison between the waveform and the waveform model in this state, determines whether the integrated value in the specified range has changed not because of knocking.

In a search range determined using the specified range, a crank angle having higher intensity than a neighboring crank angle is specified. In this manner, a crank angle that can be considered to have vibration intensity changed between ignition cycles can be specified. In other words, a crank angle at which occurrence of knocking is highly possible, can be specified. A timing at which intensity becomes the highest in a waveform model defined as a reference of vibration in the internal combustion engine is matched with the specified crank angle and, based on a result of comparison between the waveform and the waveform model in this state, whether knock has occurred in the internal combustion engine or not is determined. Therefore, it becomes possible to determine whether knock has occurred or not based on the portion where intensity abruptly increases in the detected waveform, and to avoid determination as to whether knock has occurred or not based on portions constantly having high intensity. Therefore, false determination that knock has occurred when actually there is no knocking can be avoided. As a result, a knock determination device or a knock determination method for an internal combustion engine that can reduce erroneous determination can be provided.

More preferably, the operation unit calculates a coefficient corresponding to a difference between the waveform and the waveform model such that the coefficient becomes larger as the difference between the waveform and the waveform model becomes smaller, and determines, if the coefficient is larger than a threshold value, that the integrated value in the specified range has changed because of knocking, and determines, if the coefficient is smaller than the threshold, that the integrated value in the specified range has changed not because of knocking.

In this arrangement, the coefficient corresponding to the difference between the waveform and the waveform model is calculated, which coefficient is made larger as the difference between the waveform and the waveform model is smaller. The larger the coefficient, the higher becomes the possibility that knocking occurred. Therefore, when the coefficient is larger than the threshold value, it is determined that the integrated value in the specified range has changed because of knocking. On the contrary, if the coefficient is smaller than the threshold value, it is determined that the integrated value in the specified range has changed not because of knocking. Thus, it is possible to determine with high accuracy whether the integrated value has changed because of knocking or not.

More preferably, the operation unit determines, if the specified crank angle is in a predetermined range, that the integrated value in the specified range has changed not because of knocking.

In this arrangement, if the specified crank angle is in the predetermined range, it is determined that the integrated value in the specified range has changed not because of knocking. Therefore, even when vibration intensity increases accidentally at a crank angle at which knocking occurrence is impossible, false determination that knock has occurred when actually there is no knocking can be avoided.

More preferably, the operation unit specifies a plurality of crank angle ranges in which the amount of change in the integrated value is larger, among the plurality of crank angle ranges, and the operation unit determines whether the integrated values in the plurality of specified ranges have changed not because of knocking.

In this arrangement, a plurality of crank angle ranges in which the amount of change of the integrated value is larger are specified. Whether the integrated value in the plurality of specified ranges have changed because of knocking or not is determined. Consequently, the accuracy in specifying the range in which the integrated value has changed not because of knocking can be enhanced.

More preferably, if it is determined that the integrated value in at least one of the plurality of specified ranges has changed because of knocking, the operation unit inhibits correction of the detected waveform.

In this arrangement, if it is determined that the integrated value in at least one of the plurality of specified ranges has changed because of knocking, whether knock has occurred or not is determined using the sum of integrated values calculated with the detected waveforms not corrected. This simplifies the process.

Further preferably, if it is determined that the integrated value in at least one of the plurality of specified ranges has changed not because of knocking, the operation unit corrects the detected vibration waveform such that the amount of change in the integrated value in the range in which the integrated value is determined to have changed not because of knocking becomes smaller.

In this arrangement, if it is determined that the integrated value in at least one of the plurality of specified ranges has changed not because of knocking, the detected vibration waveform is corrected such that the amount of change of the integrated value in the range of which integrated value is determined to have changed not because of knocking becomes small. Consequently, it becomes possible to exclude from the detected waveform that portion which has intensity increased abruptly by a factor different from knocking.

More preferably, the operation unit corrects a determination value used for determining whether knock has occurred or not, using a sum of the integrated values of the corrected waveform, and determines whether knock has occurred or not based on a result of comparison between vibration intensity of the internal combustion engine and the corrected determination value, and thereby determines whether knock has occurred or not using the sum of each of the integrated values of the corrected waveform. In this arrangement, the determination value used for determining whether knock has occurred or not is corrected using the sum of respective integrated values of corrected waveforms. Whether knock has occurred or not is determined based on the result of comparison of the vibration intensity of the internal combustion engine and corrected determination value, and hence, whether knock has occurred or not is determined using the sum of integrated values of the corrected waveform. Accordingly, it becomes possible to determine with high accuracy whether knock has occurred or not, using the determination value that is corrected in consideration of vibration characteristic of each individual internal combustion engine.

BEST MODES FOR CARRYING OUT THE INVENTION

Figure 1:
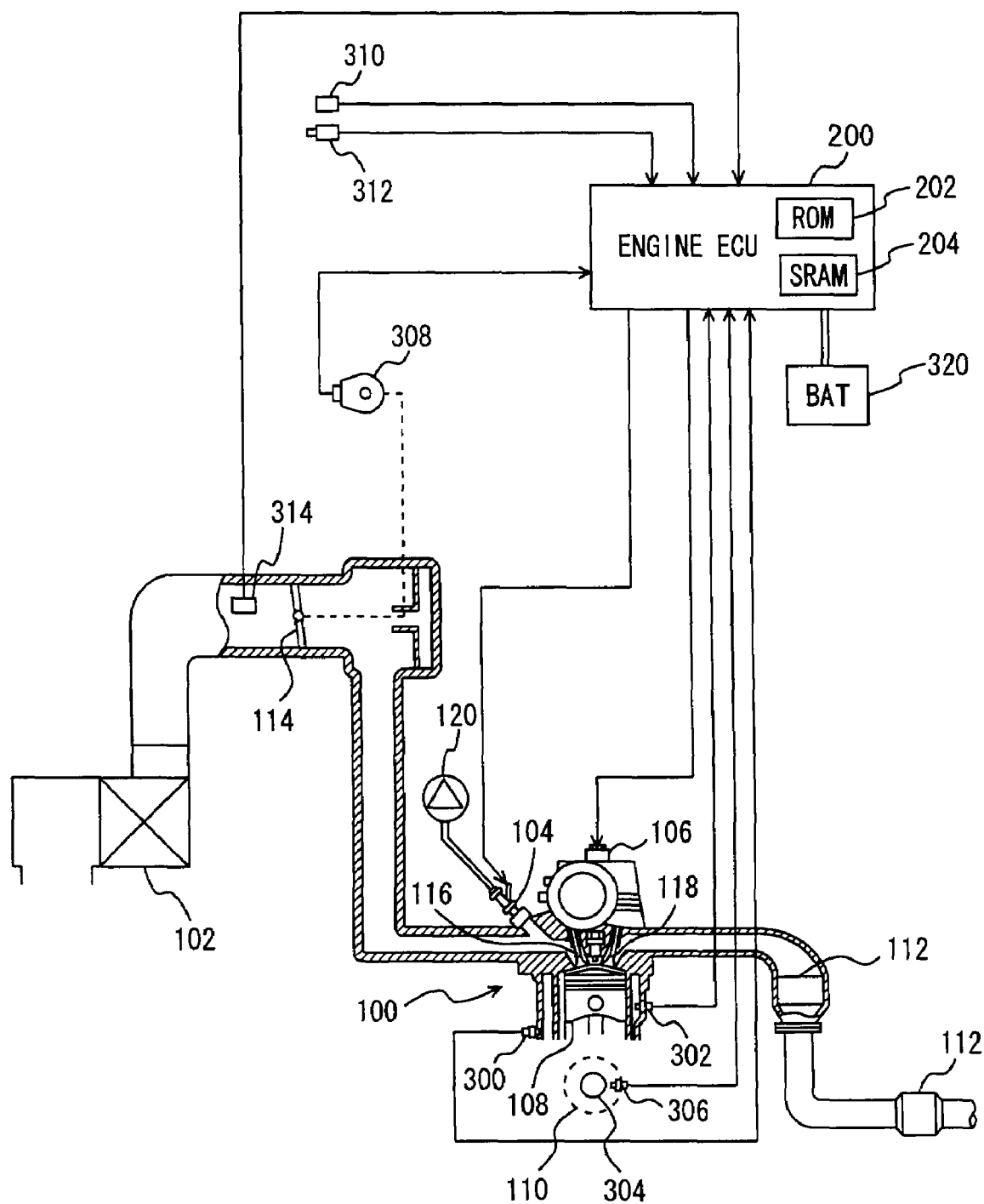
FIG. 1 is a schematic configuration diagram showing an engine controlled by an engine ECU as a knock determination device in accordance with a first embodiment of the present invention.

Embodiments of the present invention will be described in the following with reference to the figures. In the following description, the same components are denoted by the same reference characters. The names and functions are also the same. Therefore, detailed description thereof will not be repeated.

First Embodiment

Referring to FIG. 1, an engine 100 of a vehicle mounting the knock determination device in accordance with an embodiment of the present invention will be described. Engine 100 is provided with a plurality of cylinders. The knock determination device in accordance with the present embodiment is realized by executing a program stored, for example, in an ROM (Read Only Memory) 202 of an engine ECU (Electronic Control Unit) 200.

Engine 100 is an internal combustion engine, in which a mixture of air taken through an air cleaner 102 and a fuel injected by an injector 104 is ignited by a spark plug 106 and burned in a combustion chamber. Though timing of ignition is adjusted to attain MBT (Minimum advance for Best Torque) to maximize output torque, it is advanced or retarded in accordance with the state of operation of engine 100 when, for example, knocking occurs.

The burning of air-fuel mixture causes combustion pressure that presses a piston 108 down, whereby a crankshaft 110 rotates. The combusted air-fuel mixture (or exhaust gas) is purified by a three-way catalyst 112 and thereafter discharged outside the vehicle. The amount of air taken into engine 100 is adjusted by a throttle valve 114.

Engine 100 is controlled by engine ECU 200 having connected thereto a knock sensor 300, a water temperature sensor 302, a crank position sensor 306 arranged opposite to a timing rotor 304, a throttle open position sensor 308, a vehicle speed sensor 310, an ignition switch 312 and an air flow meter 314.

A knock sensor 300 is provided in a cylinder block of engine 100. Knock sensor 300 is implemented by a piezoelectric element. As engine 100 vibrates, knock sensor 300 generates a voltage having a magnitude corresponding to that of the vibration. Knock sensor 300 transmits a signal representing the voltage to engine ECU 200. Water temperature sensor 302 detects temperature of cooling water in engine 100 at a water jacket and transmits a signal representing a resultant detection to engine ECU 200.

Timing rotor 304 is provided at crankshaft 110 and rotates together with crankshaft 110. Timing rotor 304 is circumferentially provided with a plurality of protrusions spaced by a predetermined distance. Crank position sensor 306 is arranged opposite to the protrusions of timing rotor 304. When timing rotor 304 rotates, an air gap between the protrusions of timing rotor 304 and crank position sensor 306 varies, so that magnetic flux passing through a coil portion of crank position sensor 306 increases/decreases, thus generating electromotive force. Crank position sensor 306 transmits a signal representing the electromotive force to engine ECU 200. From the signal transmitted from crank position sensor 306, engine ECU 200 detects a crank angle and rotation number of crankshaft 110.

Throttle open position sensor 308 detects a throttle open position and transmits a signal representing a resultant detection to engine ECU 200. Vehicle speed sensor 310 detects number of rotations of a wheel (not shown) and transmits a signal representing a resultant detection to engine ECU 200. From the number of rotations of the wheel, engine ECU 200 calculates the vehicle speed. Ignition switch 312 is turned on by a driver, for starting engine 100. Air flow meter 314 detects amount of air taken into engine 100, and transmits a signal representing a resultant detection to engine ECU 200.

Engine ECU 200 operates with electric power fed from an auxiliary battery 320. Engine ECU 200 uses the signals transmitted from various sensors and ignition switch 312 as well as maps and programs stored in ROM 202 and an SRAM (Static Random Access Memory) 204 to perform an operation to control equipment so that engine 100 attains a desired driving condition.

In the present embodiment, using a signal transmitted from knock sensor 300 and a crank angle, engine ECU 200 detects a waveform of vibration (hereinafter referred to as "vibration waveform") of engine 100 at a predetermined knock detection gate (a section from a predetermined first crank angle to a predetermined second crank angle) and from the detected vibration waveform determines whether knock has occurred in engine 100. The knock detection gate of the present embodiment is from the top dead center (0°) to 90° in a combustion stroke. It is noted that the knock detection gate is not limited thereto. The knock detection gate corresponds to the first range of the first invention described above.

Figure 2:
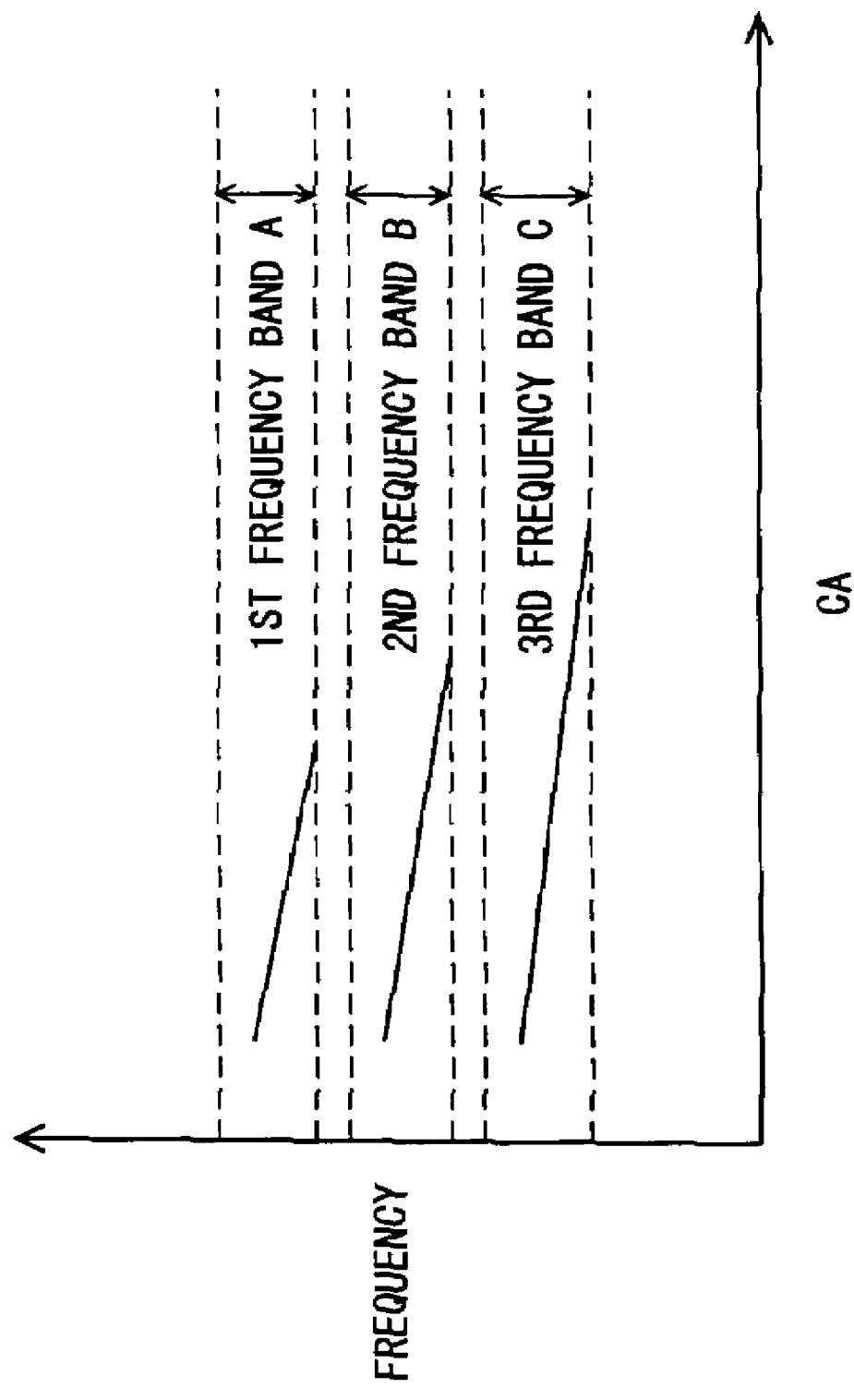
FIG. 2 shows frequency bands of vibrations generated in the engine when knock occurs.

When the engine knocks, vibrations occur in engine 100 at frequencies around the frequencies represented by solid lines in FIG. 2. The frequency of vibration caused by knocking is not constant but has a prescribed bandwidth. Therefore, in the present embodiment, vibrations at frequencies included in a first frequency band A, a second frequency band B, and a third frequency band C are detected, as shown in FIG. 2. In FIG. 2, CA represents crank angle. The number of frequency bands including the frequencies of vibration attributed to knocking is not limited to three.

Figure 3:
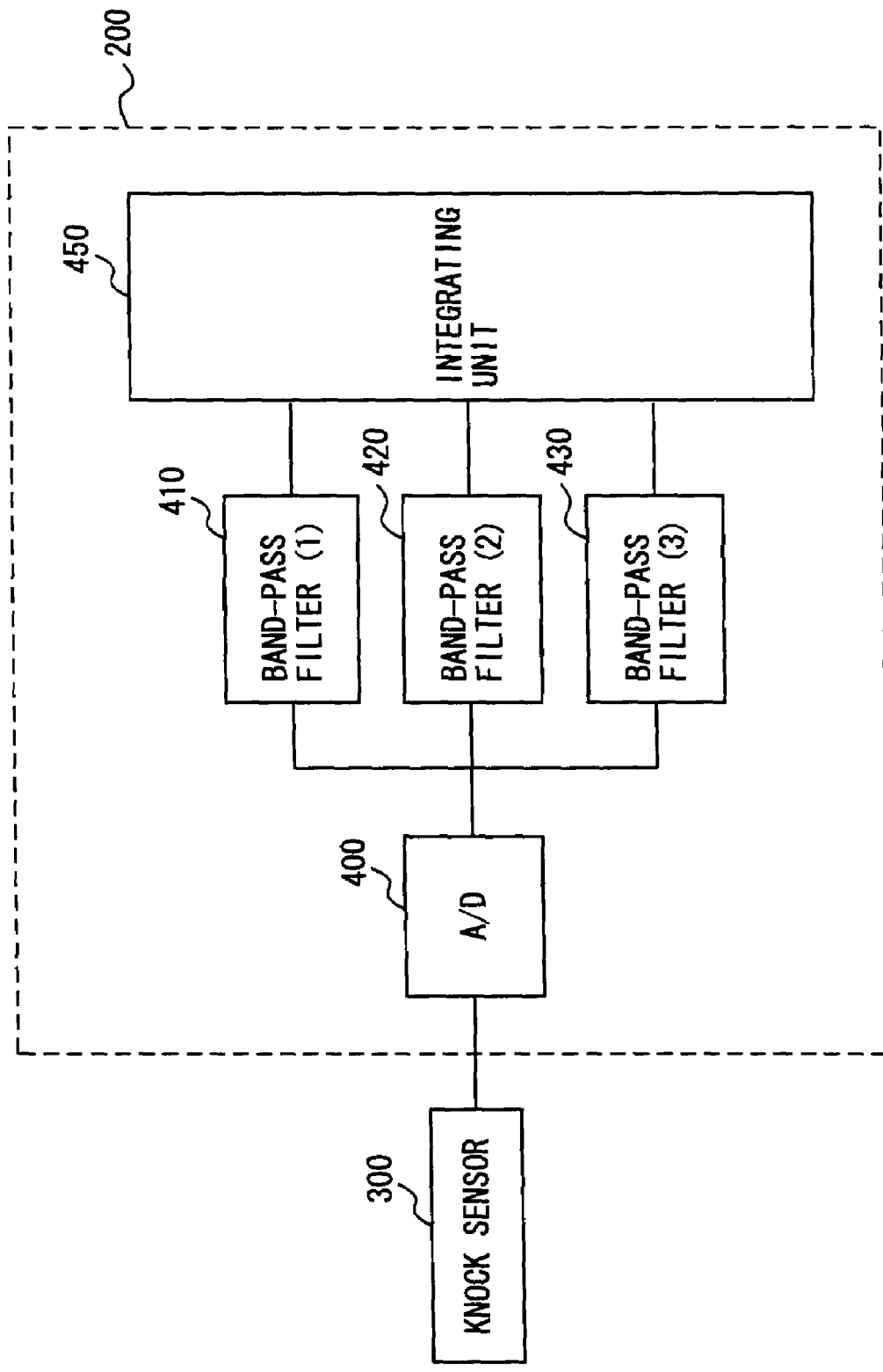
FIG. 3 is a control block diagram showing the engine ECU of FIG. 1.

Referring to FIG. 3, engine ECU 200 will further be described. Engine ECU 200 includes an A/D (analog/digital) converting unit 400, a band-pass filter (1) 410, a band-pass filter (2) 420, a band-pass filter (3) 430, and an integrating unit 450.

A/D converting unit 400 converts an analog signal transmitted from knock sensor 300 to a digital signal. Band-pass filter (1) 410 passes only the signal in the first frequency band A of the signals transmitted from knock sensor 300. Specifically, of the vibrations detected by knock sensor 300, only the vibrations in the first frequency band A are extracted by band-pass filter (1) 410.

Band-pass filter (2) 420 passes only the signal in the second frequency band B of the signals transmitted from knock sensor 300. Specifically, of the vibrations detected by knock sensor 300, only the vibrations in the second frequency band B are extracted by band-pass filter (2) 420.

Band-pass filter (3) 430 passes only the signal in the third frequency band C of the signals transmitted from knock sensor 300. Specifically, of the vibrations detected by knock sensor 300, only the vibrations in the third frequency band C are extracted by band-pass filter (3) 430.

Integrating unit 450 integrates the signals selected by band-pass filter (1) 410 to band-pass filter (3) 430, that is, vibration intensities, five degrees by five degrees of the crank angle. In the following, the value integrated for five degrees of crank angle will be denoted as 5-degrees integrated value. Calculation of 5-degrees integrated value is done for each frequency band. Calculation of 5-degrees integrated value realizes detection of frequency waveform in each frequency band.

Further, the thus calculated 5-degrees integrated values of the first frequency band A to the third frequency band C are added in correspondence with the crank angle. Specifically, vibration waveforms of the first frequency band A to the third frequency band C are combined.

Figure 4:
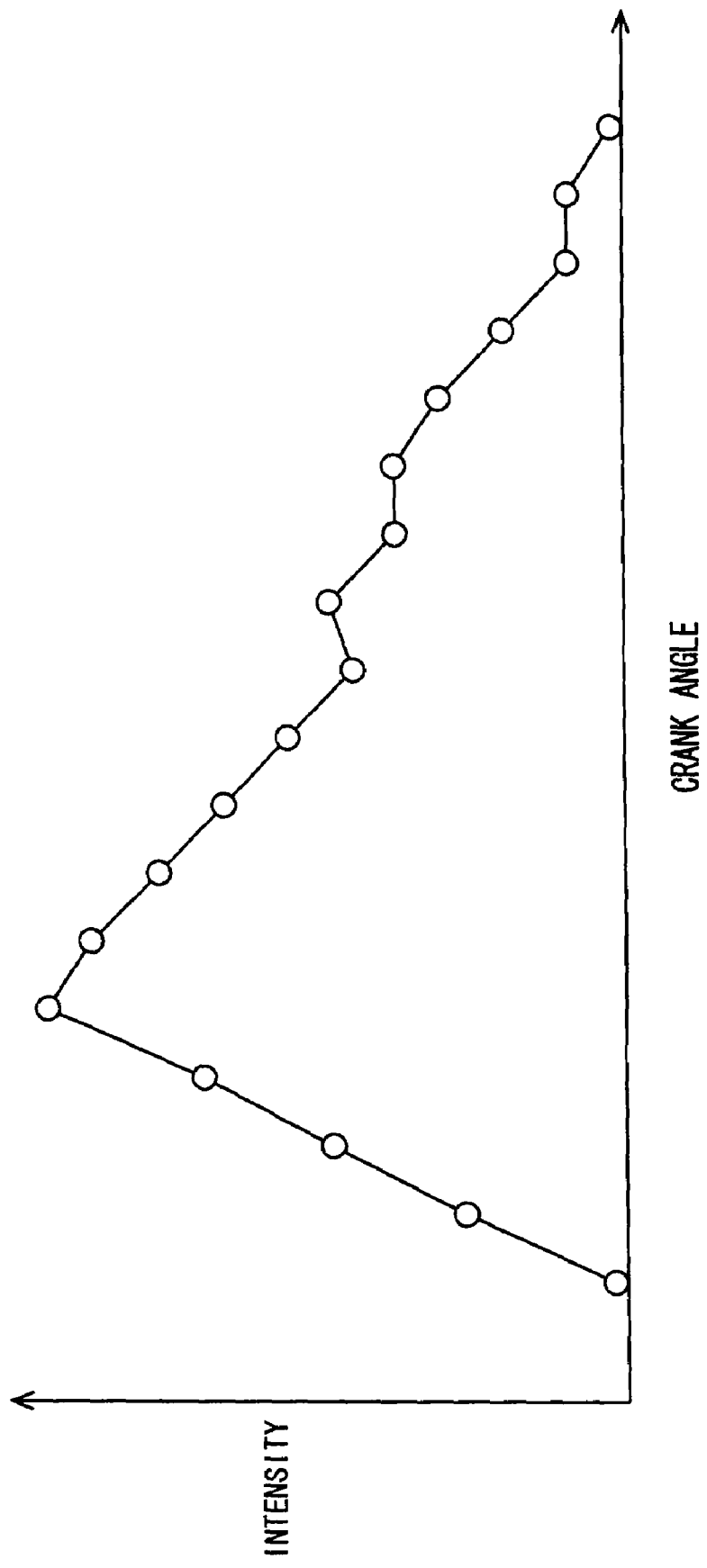
FIG. 4 shows an engine vibration waveform.

Consequently, the vibration waveform of engine 100 is detected as shown in FIG. 4. The combined waveform of the first to third frequency bands A to C is used as the vibration waveform of engine 100.

Figure 5:
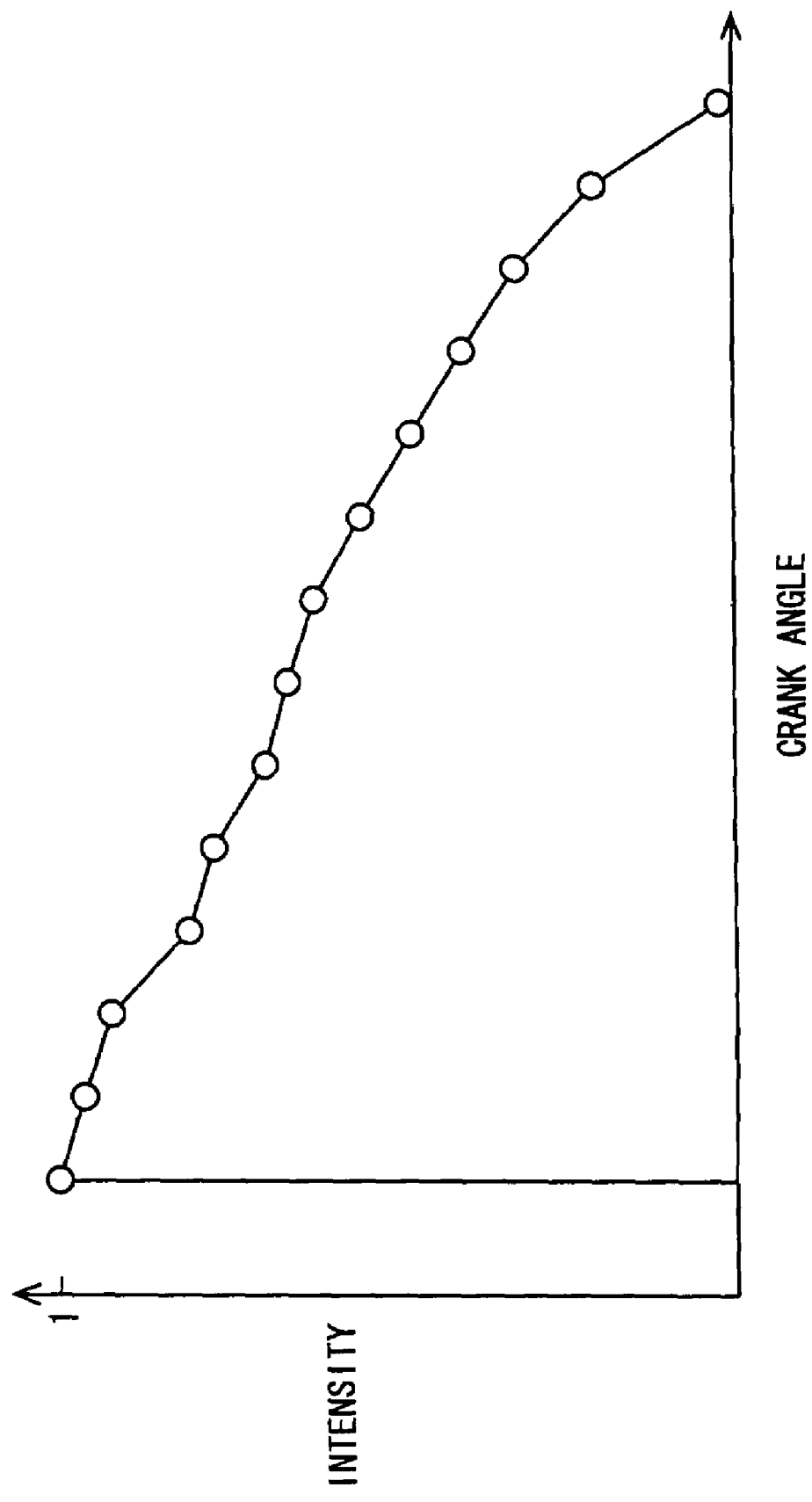
FIG. 5 shows a knock waveform model stored in an ROM of the engine ECU.

The detected vibration waveform is compared with the knock waveform model stored in ROM 202 of engine ECU 200 as shown in FIG. 5. The knock waveform model is formed in advance as a model vibration waveform when engine 100 knocks.

In the knock waveform model, magnitude of vibration is represented by a dimensionless number of 0 to 1 and does not uniquely correspond to a crank angle. More specifically, for the knock waveform model of the present embodiment, while it is determined that the vibration intensity decreases as the crank angle increases after the peak value of vibration intensity, the crank angle at which the vibration intensity assumes the peak value is not determined.

The knock waveform model of the present embodiment corresponds to the vibration after the peak intensity of vibration generated by knocking. A knock waveform model that corresponds to vibration after the rise of vibration caused by knocking may be stored.

The knock waveform model is formed and stored in advance based on a vibration waveform of engine 100 detected when knocking is forced by an experiment or the like.

The knock waveform model is formed by using an engine 100 (hereinafter referred to as central characteristic engine) of which size and output value of knock sensor 300 are the central values of size tolerance and output tolerance of knock sensor 300. In other words, the knock waveform model is the vibration waveform obtained when knocking is forced in the central characteristic engine. The method of forming the knock waveform model is not limited thereto, and it may be formed, by way of example, by simulation.

Figure 6:
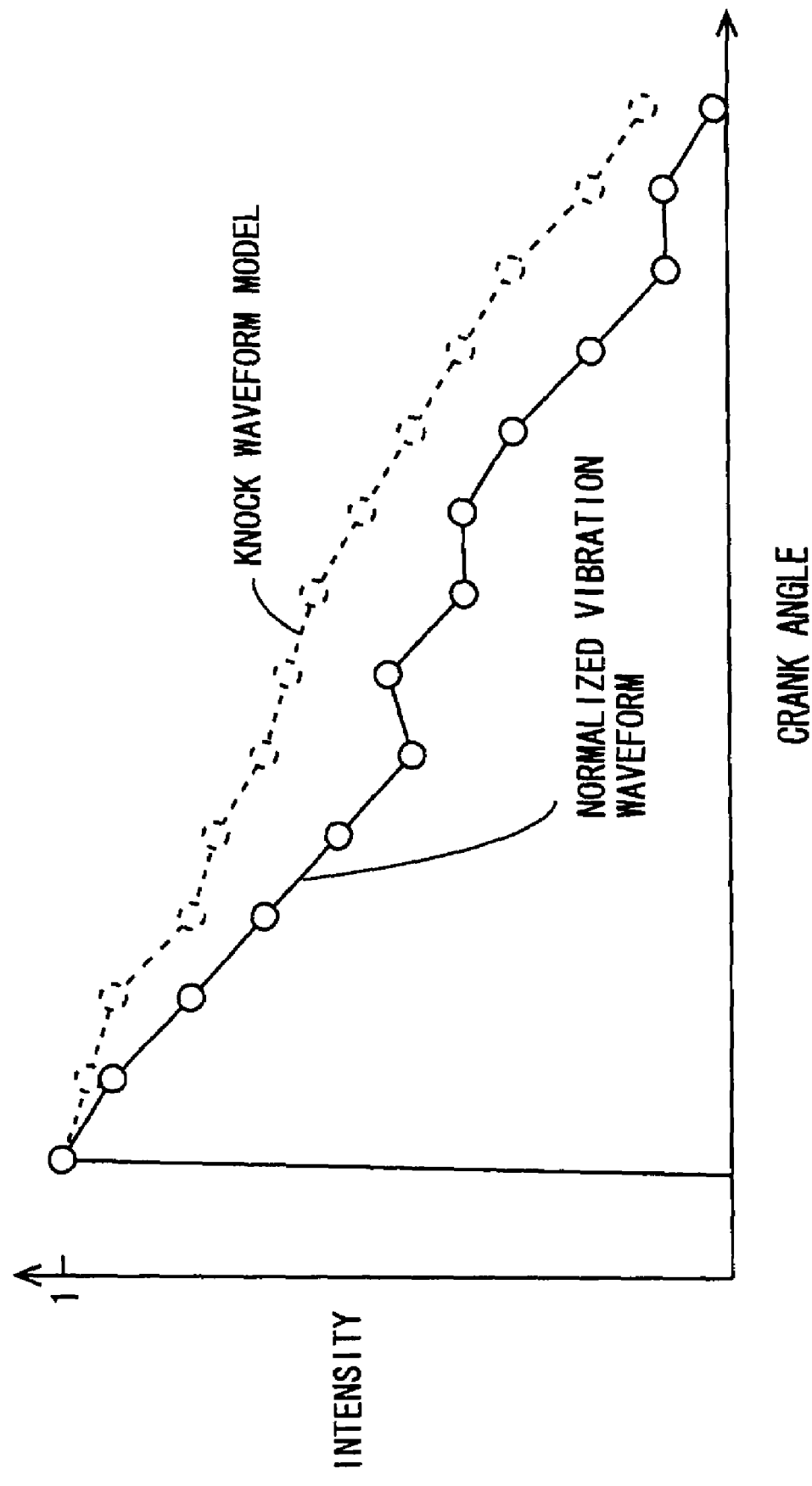
FIG. 6 shows comparison between the vibration waveform and the knock waveform model.

In the comparison between the detected waveform and the knock waveform model, a normalized waveform and the knock waveform model are compared, as shown in FIG. 6. Here, normalization refers, for instance, to representation of vibration intensity by a dimensionless number of 0 to 1, by dividing each five-degrees integrated value by a five-degrees integrated value larger than a five-degrees integrated value of neighboring crank angle and the largest among such five-degrees integrated values, that is, the peak of five-degrees integrated value. The method of normalization is not limited thereto.

In the present embodiment, engine ECU 200 calculates a coefficient of correlation K, which is a value related to a deviation between the normalized vibration waveform and the knock waveform model. The crank angle at which intensity (5-degrees integrated value) of the vibration waveform peaks is matched with a timing at which the intensity of knock waveform model peaks, and in this state, absolute value of deviation (amount of displacement) between the normalized vibration waveform and the waveform model is calculated crank angle by crank angle (at every 5 degrees), whereby the coefficient of correlation K is calculated. Here, the method of specifying the crank angle at which the intensity peaks in the vibration waveform will be described in detail later.

When we represent the absolute value of deviation between the normalized vibration waveform and the knock waveform model for each crank angle by $\Delta S(I)$ (wherein I is a natural number) and the vibration intensity of knock waveform model integrated by the crank angle (i.e., the area of knock waveform model) by S, then the coefficient of correlation K is calculated by an equation $K=(S-\Sigma\Delta S(I))/S$, where $\Sigma\Delta S(I)$ represents a sum of $\Delta S(I)$s. In the present embodiment, coefficient of correlation K is calculated as a larger value when the signal waveform has a shape closer to the knock waveform model. Therefore, if the vibration waveform includes vibration waveform caused not by knocking, the calculated coefficient of correlation K comes to have a smaller value. Note that the coefficient of correlation K may be calculated by a different method.

Further, engine ECU 200 calculates a knock intensity N based on the maximum value among the 5-degrees integrated values. When we represent the maximum value of 5-degrees integrated values by P and the value representing the magnitude of vibration of engine 100 while engine 100 is not knocking by BGL (Back Ground Level), the nock intensity N is calculated by the equation N=P/BGL. The maximum value P of 5-degrees integrated value for calculating knock intensity N is subjected to logarithmic conversion. Note that the knock intensity N may be calculated by a different method.

The value BGL is calculated by subtracting, in the frequency distribution of intensity value LOG(V), which will be described later, a product of standard deviation $\sigma$ and a coefficient (for example, "1") from the median V(50). BGL may be calculated by a different method, and BGL may be stored in ROM 202.

In the present embodiment, engine ECU 200 compares the calculated knock intensity N with the determination value V(J) stored in SRAM 204, and further compares the detected waveform with the stored knock waveform model, and determines for every one ignition cycle (720 degrees of crank angle) whether knock has occurred in engine 100 or not.

Figure 7:
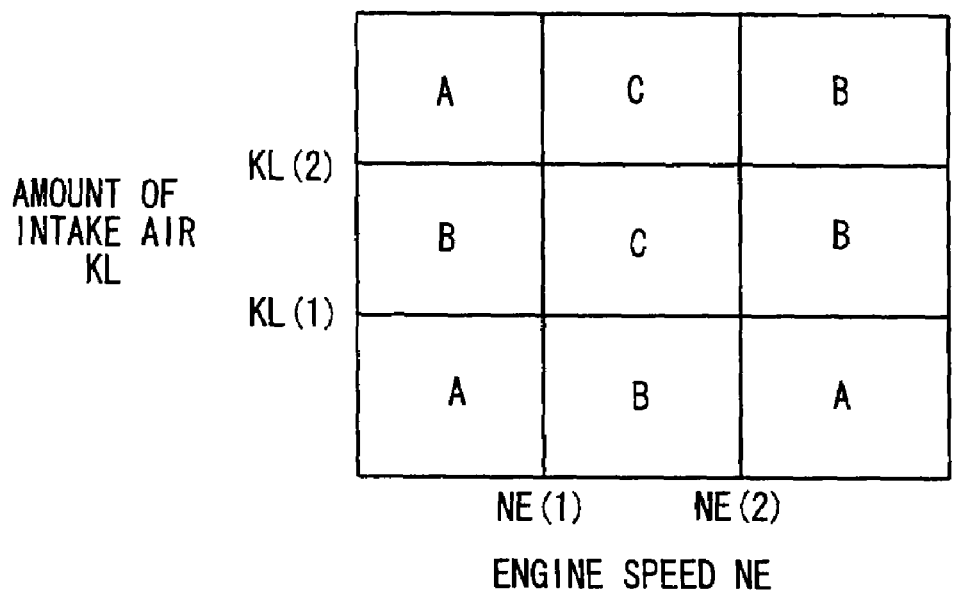
FIG. 7 shows a map of determination value V(J) stored in an ROM or an SRAM of engine ECU.

As shown in FIG. 7, the determination value V(J) is stored as a map, for each of the ranges divided by the state of operation using engine speed NE and intake air amount KL as parameters. In the present embodiment, nine ranges are provided for each cylinder, by the division in accordance with low speed (NE<NE(1)), middle speed (NE(1)$\leq$NE<NE(2)), high speed (NE(2)$\leq$NE), low burden (KL$\leq$KL(1)), middle burden (KL(1)$\leq$KL<KL(2)) and high burden (KL(2)$\leq$KL). The number of ranges is not limited thereto. Further, ranges may be divided using a parameter or parameters other than the engine speed NE and intake air amount KL.

At the time of shipment of engine 100 or the vehicle, a value determined in advance through an experiment or the like is used as the determination value V(J) (initial determination value V(J) at shipment) stored in ROM 202. Dependent on variation in output values or degradation of knock sensor 300, detected intensity may possibly vary even if the vibration occurring in engine 100 is the same. In that case, it is necessary to correct the determination value V(J) and to determine whether knock has occurred or not using the determination value V(J) appropriate for the actually detected intensity.

Therefore, in the present embodiment, a knock determination level V(KD) is calculated based on a frequency distribution representing relation between an intensity value LOG(V) obtained by logarithmic conversion of intensity V and frequency (number of times, or probability) of detection of each intensity value LOG(V).

For every range defined by the engine speed NE and the intake air amount KL as parameters, the intensity value LOG (V) is calculated. The intensity V used for calculating intensity value LOG(V) is the maximum intensity (maximum 5-degrees integrated value) of the detected waveform. Based on the calculated intensity value LOG(V), the median V(50) at which the frequency of intensity value LOG(V) accumulated from the minimum value attains 50% is calculated. Further, standard deviation $\sigma$ of intensity value LOG(V) not larger than the median V(50) is calculated. By way of example, in the present embodiment, the median V(50) and standard deviation $\sigma$, which are approximated to the median and standard deviation calculated based on a plurality (for example, 200 cycles) of intensity values LOG(V), are calculated by the following method, cycle by cycle of ignition.

If the intensity value LOG(V) detected at present is larger than the median V(50) calculated last time, a value obtained by adding a predetermined value C(1) to the median (50) calculated last time is provided as the median V(50) this time. On the contrary, if the intensity value LOG(V) detected at present is smaller than the median V(50) calculated last time, a value obtained by subtracting a predetermined value C(2) (by way of example, the value C(2) may be the same as C(1)) from the median (50) calculated last time is provided as the median V(50) this time.

If the intensity value LOG(V) detected this time is smaller than the median V(50) calculated last time and larger than a value obtained by subtracting the standard deviation σ calculated last time from the median V(50) calculated last time, a value obtained by subtracting double a predetermined value C(3) from the standard deviation σ calculated last time is provided as the standard deviation σ this time. On the contrary, if the intensity value LOG(V) detected at present is larger than the median V(50) calculated last time, or if it is smaller than the value obtained by subtracting the standard deviation σ calculated last time from the median V(50) calculated last time, a value obtained by adding a predetermined value C(4) (by way of example, the value C(4) may be the same as C(3)) to the standard deviation σ calculated last time is provided as the standard deviation σ this time. The median V(50) and the standard deviation σ may be calculated by other methods. Further, initial values of the median V(50) and the standard deviation σ may be preset values, or "0".

Figure 8:
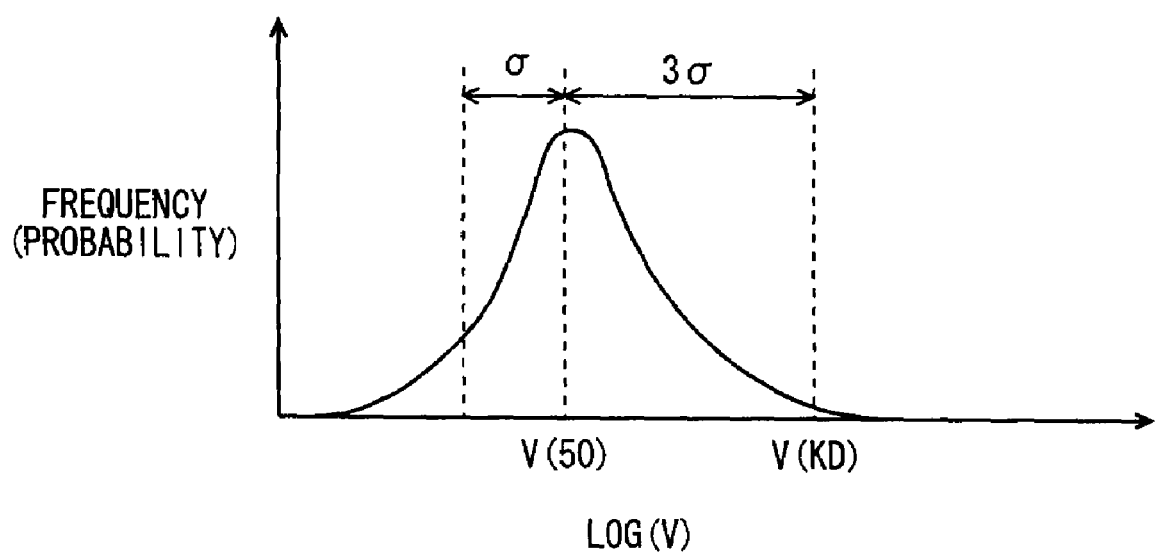
FIG. 8 is a (first) diagram representing frequency distribution of intensity value LOG(V).

Using the median V(50) and the standard deviation σ, the knock determination level V(KD) is calculated. As shown in FIG. 8, a value obtained by adding a product of a coefficient U(1) (U(1) is a constant and, for example, U(1)=3) and standard deviation σ to the median V(50) is provided as the knock determination level V(KD). The knock determination level V(KD) may be calculated by a different method.

The ratio (frequency) of intensity values LOG(V) larger than the knock determination level V(KD) is determined to be the frequency of knocking, and counted as knock occupation ratio KC.

If the knock occupation ratio KC is larger than a threshold value KC(O), the determination value V(J) is corrected to be smaller by a predetermined correction amount A(1), so that frequency of retarding ignition timing increases. The corrected determination value V(J) is stored in SRAM 204.

The coefficient U(1) is a coefficient found from data and knowledge obtained through experiment or the like. The intensity value LOG(V) larger than the knock determination level when U(1)=3 is substantially equal to the intensity value LOG(V) of the ignition cycle in which knock actually occurred. A value other than "3" may be used as coefficient U(1).

In the following, a method of specifying a crank angle at which intensity peaks in the vibration waveform will be described.

Figure 9:
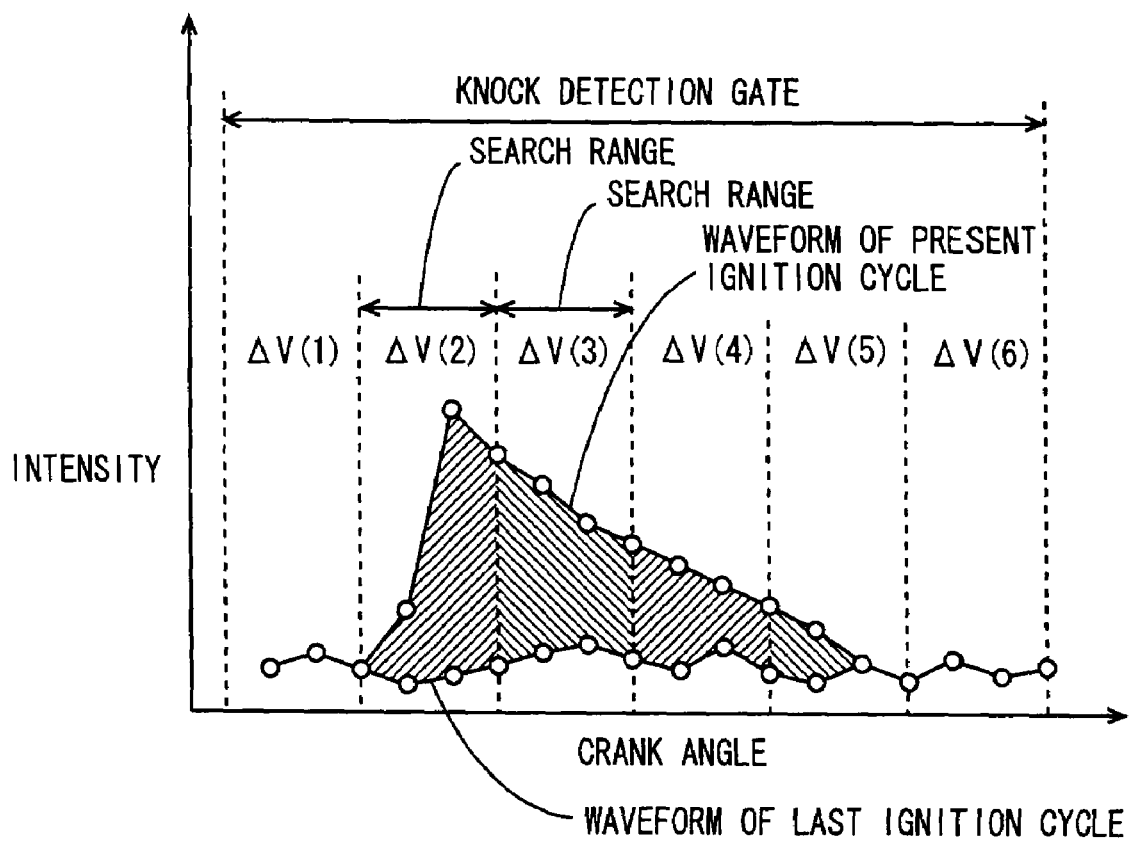
FIG. 9 is a (first) diagram representing amount of change of 15-degrees integrated value.

In the present embodiment, a 15-degrees integrated value integrating the intensity for each range defined by equally dividing the knock detection gate by 6, that is, for every crank angle of 15 degrees (three 5-degrees integration values) is calculated, as shown in FIG. 9. The 15-degrees integrated value is calculated for every few ignition cycles. The 15-degrees integrated value corresponds to the integrated value in the first invention described above. The number of ranges is not limited to 6, and any number of ranges may be used, as long as it is not smaller than 2.

From the difference between the 15-degrees integrated value of the present ignition cycle and the 15-degrees integrated value of the last (one preceding) ignition cycle, the amounts of change ΔV(1)~ΔV(6) represented by hatched lines in FIG. 9 are detected.

From the six ranges of which amounts of change ΔV(1)~ΔV(6) of 15-degrees integrated value are detected, two ranges having largest amounts of change are specified. The number of ranges to be specified is not limited to two.

Ranges that are the same as the specified ranges are determined to be a search range, and in the search range, a crank angle having intensity (five-degrees integrated value) higher than that of a neighboring crank angle and the highest among such intensities (five-degrees integrated value) is specified. Specifically, a crank angle at which the intensity peaks in the vibration waveform is specified. The crank angle is matched with the timing when vibration intensity is maximized in the knock waveform model, and the vibration waveform is compared with the knock waveform model.

Figure 10:
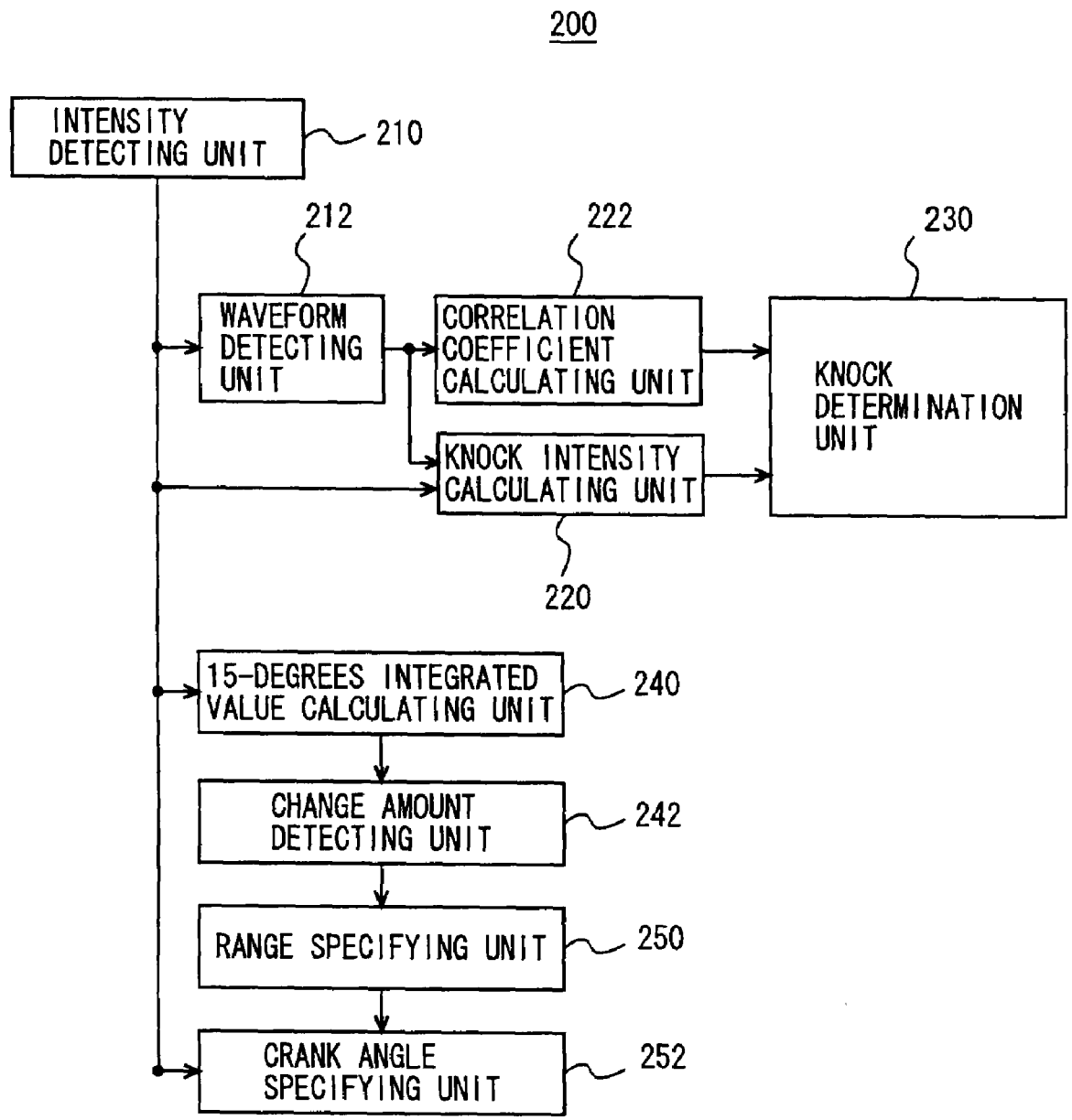
FIG. 10 is a functional block diagram of engine ECU as the knock determination device in accordance with the first embodiment of the present invention.

Referring to FIG. 10, functions of engine ECU 200 as a knock determination device in accordance with the present embodiment will be described. The functions of engine ECU 200 described in the following may be implemented by hardware or software.

Engine ECU 200 includes an intensity detecting unit 210, a waveform detecting unit 212, a knock intensity calculating unit 220, a correlation coefficient calculating unit 222, a knock determination unit 230, a 15-degrees integrated value calculating unit 240, a change amount detecting unit 242, a range specifying unit 250, and a crank angle specifying unit 252.

Intensity detecting unit 210 detects intensity V of vibration in the knock detection gate, based on the signal transmitted from knock sensor 300. Waveform detecting unit 212 detects vibration waveform in the knock detection gate by integrating vibration intensities V, 5 degrees by 5 degrees of crank angle.

Knock intensity calculating unit 220 calculates the knock intensity N. Correlation coefficient calculating unit 222 calculates the coefficient of correlation K. Knock determination unit 230 determines that knock has occurred, if the knock intensity N is larger than the determination value V(J) and the coefficient of correlation K is larger than the threshold value K(0).

The 15-degrees integrated value calculating unit 240 calculates 15-degrees integrated value for each of the ranges obtained by equally dividing the knock detection gate by 6. Change amount detecting unit 242 detects amounts of change ΔV(1) to Δ(6) of 15-degrees integrated value.

Range specifying unit 250 specifies a range of the crank angle in which the detected amount of change of 15-degrees integrated value is larger, from the six ranges. In the present embodiment, range specifying unit 250 specifies two ranges of which detected amount of change of 15-degrees integrated value is larger.

Crank angle specifying unit 252 specifies, in the search range determined to be the same range as the specified range, the crank angle of which intensity is larger than that of a neighboring crank angle and the largest among such intensities.

Figure 11:
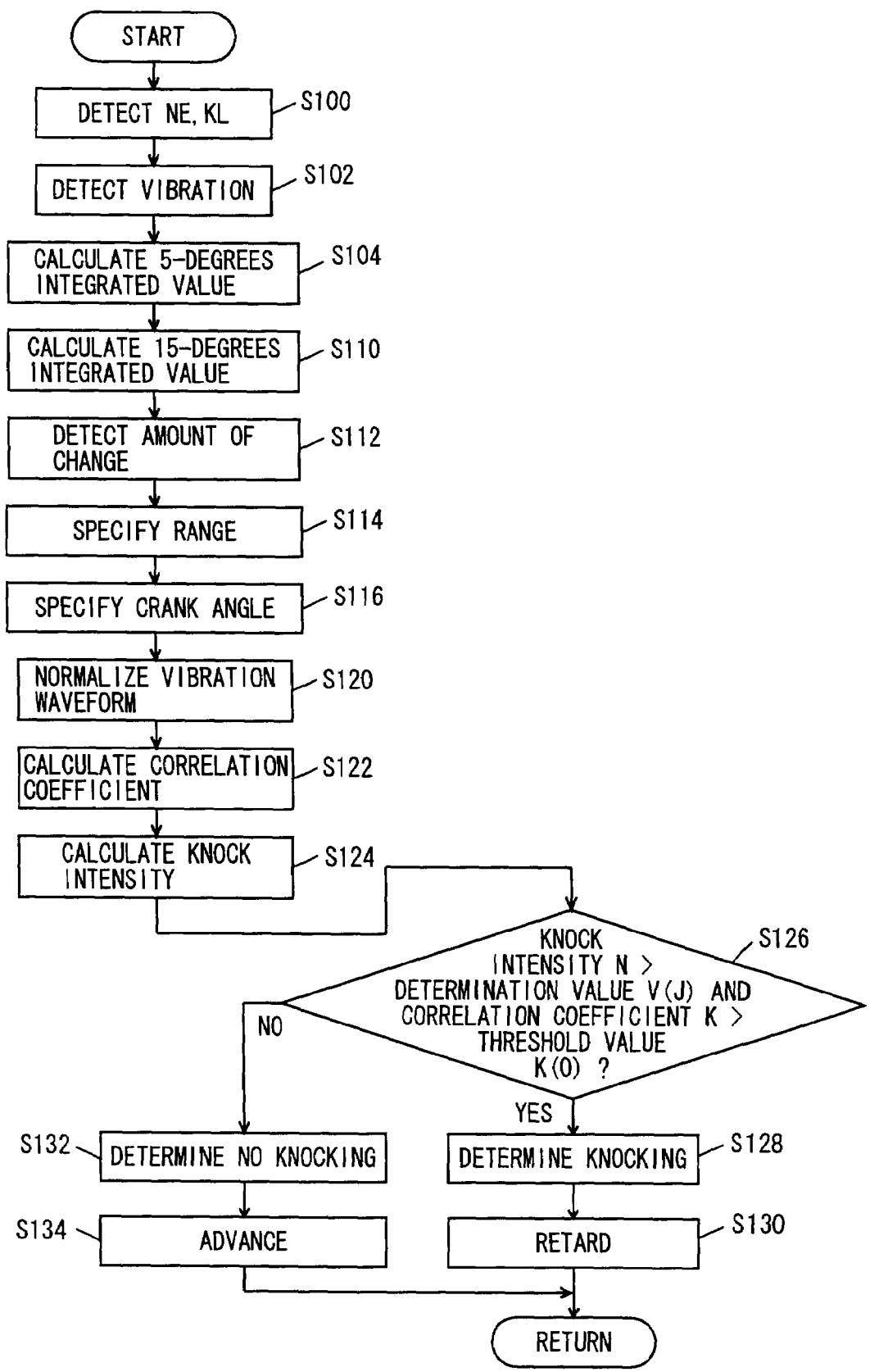
FIG. 11 is a flowchart representing a control structure of a program executed by engine ECU as the knock determination device in accordance with the first embodiment of the present invention.

Referring to FIG. 11, control structure of a program executed by engine ECU 200 as the knock determination device in accordance with the present embodiment will be described. The program described in the following is executed repeatedly in a predetermined period.

At step (hereinafter represented as S) 100, engine ECU 200 detects engine speed NE based on the signal transmitted from crank position sensor 306 and detects amount of intake air KL based on the signal transmitted from air flow meter 314.

At S102, engine ECU 200 detects the vibration intensity of engine 100 from a signal transmitted from knock sensor 300. The vibration intensity is represented by a value of voltage output from knock sensor 300. Note that the vibration intensity may be represented by a value corresponding to the value of the voltage output from knock sensor 300. The vibration intensity is detected in a combustion stroke for an angle from a top dead center to 90° (a crank angle of 90°).

At S104, engine ECU 200 calculates the 5-degrees integrated value, that is, integrated value of voltage output from knock sensor 300 (i.e., representing intensity of vibration), for a crank angle of every five degrees (integrated for only 5 degrees). The 5-degrees integrated value is calculated for the vibration of each of the first to third frequency bands A to C. Further, 5-degrees integrated values of the first to third frequency bands A to C are added in correspondence with the crank angles, and the vibration waveform of engine 100 is detected.

At S110, engine ECU 200 calculates 15-degrees integrated value for each of the ranges obtained by equally dividing the knock detection gate by 6.

At S112, engine ECU 200 detects amounts of change $\Delta V(1)$ to $\Delta V(6)$ of 15-degrees integrated value from the difference between the 15-degrees integrated value of the present ignition cycle and the 15-degrees integrated value of the last (one previous) ignition cycle.

At S114, engine ECU 200 specifies two ranges in which the detected amount of change in 15-degrees integrated value is larger, from the six ranges.

At S116, engine ECU 200 specifies, in the search range determined to be the same range as the specified range, the crank angle of which intensity (5-degrees integrated value) is larger than that of a neighboring crank angle and the largest among such intensities.

At S120, engine ECU 200 normalizes the vibration waveform of engine 100. At S122, engine ECU 200 calculates the coefficient of correlation K, which is the value related to the deviation between the normalized vibration waveform and the knock waveform model. At S124, engine ECU 200 calculates the knock intensity N.

At S126, engine ECU 200 determines whether knock intensity N is larger than the determination value V(J) or not, and whether the coefficient of correlation K is larger than the threshold value K(0) or not. If the knock intensity N is larger than the determination value V(J) and the coefficient of correlation K is larger than the threshold value K(0) (YES at S126), the process proceeds to S128. If not (NO at S126), the process proceeds to S132.

At S128, engine ECU 200 determines that knock has occurred in engine 100. At S130, engine ECU 200 retards the ignition timing. At S132, engine ECU 200 determines that knock has not occurred in engine 100. At S134, engine ECU 200 advances the ignition timing.

An operation of engine ECU 200 as the knock determination device according to the present embodiment based on the above-described configuration and flowchart will be described.

While engine 100 is in operation, engine speed NE is detected based on the signal transmitted from crank position sensor 306, and the amount of intake air KL is detected based on the signal transmitted from air flow meter 314 (S100). Further, vibration intensity of engine 100 is detected based on the signal transmitted from knock sensor 300 (S102).

In a combustion stroke for a range from the top dead center to 90°, 5-degrees integrated value for every five degrees is calculated for vibrations of each of the first to third frequency bands A to C (S104). The calculated 5-degrees integrated values of the first to third frequency bands A to C are added in correspondence with the crank angles, and the vibration waveform of engine 100 such as shown in FIG. 4 is detected.

Further, as shown in FIG. 9 described above, 15-degrees integrated value is calculated for each of the ranges obtained by equally dividing the knock detection gate by 6 (S110). Amounts of change $\Delta V(1)$ to $\Delta V(6)$ of 15-degrees integrated value are detected from the difference between the 15-degrees integrated value of the present ignition cycle and the 15-degrees integrated value of the last (one previous) ignition cycle (S112).

Knocking occurs abruptly and, therefore, it is highly possible that a range in which the amount of change $\Delta V(1)$ to $\Delta V(6)$ of 15-degrees integrated value is large includes the crank angle at which knock occurred. Therefore, two ranges having larger amount of change detected in 15-degrees integrated value are specified, among the six ranges (S114).

In the search range determined to be the same range as the specified range, the crank angle of which intensity is larger than that of a neighboring crank angle and the largest among such intensities is specified (S116). In this manner, a crank angle at which knock possibly has occurred can be specified.

The vibration waveform is normalized (S120). A timing at which vibration intensity becomes the highest in the knock waveform model is matched with the specified crank angle and, in this state, the absolute value $\Delta S(I)$ of the deviation between the normalized vibration waveform and the knock waveform model for each crank angle is calculated. Based on the sum $\Sigma \Delta S(I)$ of $\Delta S(I)$s and the value S obtained by integrating vibration intensity of the knock waveform model for the crank angle, the coefficient of correlation K is calculated as $K=(S-\Sigma\Delta S(I))/S$ (S122). In this manner, it becomes possible to have the degree of matching between the detected vibration waveform and the knock waveform model in numerical representation, which allows objective determination. Further, comparison between the vibration waveform and the knock waveform model allows analysis as to whether the vibration derives from knocking, based on the vibration behavior such as the attenuation tendency of vibration.

Further, knock intensity N is calculated (S124). If the knock intensity N is larger than the determination value V(J) and the coefficient of correlation K is larger than the threshold value K(0) (YES at S126), it is determined that knock has occurred (S128), and the ignition timing is retarded (S130). This prevents knocking.

If the knock intensity N is not larger than the determination value V(J) or the coefficient of correlation K is not larger than the threshold value K(0) (NO at S126), it is determined that knock has not occurred (S132), and the ignition timing is advanced (S134).

As described above, in engine ECU as the controller in accordance with the present embodiment, 15-degrees integrated value is calculated for each of the ranges obtained by equally dividing the knock detection gate by 6. Amounts of change $\Delta V(1)$ to $\Delta V(6)$ of 15-degrees integrated value are detected from the difference between the 15-degrees integrated value of the present ignition cycle and the 15-degrees integrated value of the last ignition cycle. Two ranges having larger amounts of change detected in 15-degrees integrated value are specified, among the six ranges. In the specified range, the crank angle of which intensity is larger than that of a neighboring crank angle and the largest among such intensities is specified. In this manner, it is possible to specify a crank angle that is considered to involve change in vibration intensity between ignition cycles. Specifically, a crank angle at which knock possibly has occurred can be specified. A timing at which vibration intensity becomes the highest in the knock waveform model is matched with the specified crank angle and, in this state, the coefficient of correlation K is calculated. Using the coefficient of correlation K, whether knock has occurred or not is determined. Consequently, it becomes possible to determine whether knock has occurred or not based on that portion of detected waveform at which the intensity abruptly increased. Therefore, determination as to whether knock has occurred or not based on the portion constantly having high intensity can be avoided. Thus, false determination that knock has occurred when actually there is no knocking can be avoided.

Second Embodiment

In the following, a second embodiment of the present invention will be described. In the present embodiment, if the crank angle specified as the crank angle in which the intensity (5-degrees integrated value) peaks is within a prescribed range, determination is made that knock has not occurred and, in this point it is different from the first embodiment. Except for this point, other configurations are the same as those of the first embodiment described above. Functions are also the same. Therefore, detailed description thereof will not be repeated.

Figure 12:
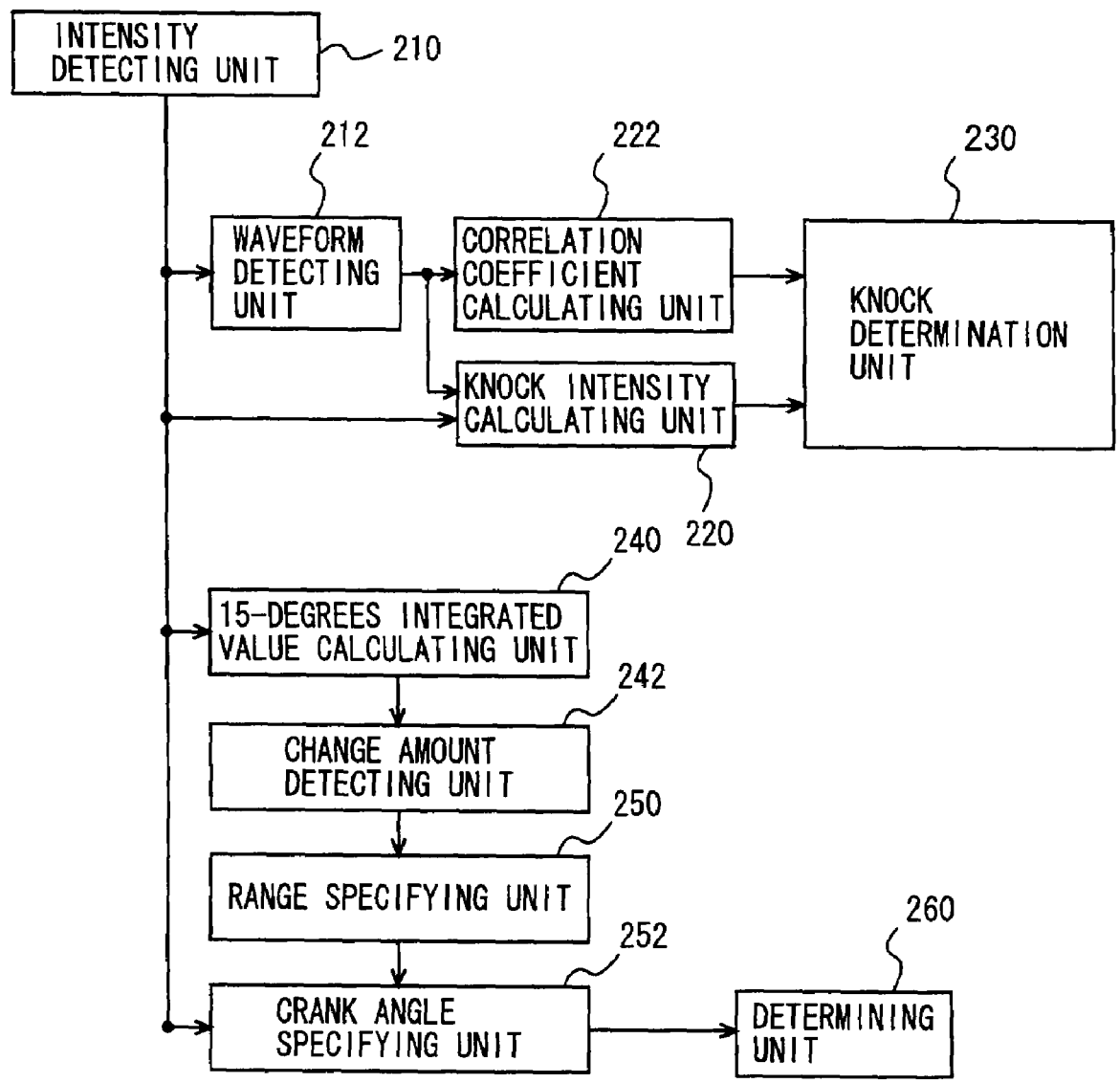
FIG. 12 is a functional block diagram of engine ECU as the knock determination device in accordance with a second embodiment of the present invention.

Referring to FIG. 12, functions of engine ECU 200 as the knock determination device in accordance with the present embodiment will be described. The functions of engine ECU 200 described below may be implemented by hardware or software. The same components as in the first embodiment above are denoted by the same reference characters and detailed description thereof will not be repeated here.

Engine ECU 200 additionally includes a determination unit 260. Determination unit 260 determines that knock has not occurred, if the crank angle specified as having peak intensity exists in a retarded side (larger crank angle) one of two ranges obtained by equally dividing the knock detection gate by two.

In other words, determination unit 260 determines that knock has not occurred, if the crank angle specified as having peak intensity does not exists in an advanced side (smaller crank angle) one of the two ranges obtained by equally dividing the knock detection gate by two.

The range used for determining that knock has not occurred is not limited to the range obtained by equally dividing the knock detection gate by two, and any range in the knock detection gate may be used. By way of example, a plurality of such ranges, such as the ranges from top dead center to 10° and from 55° to 90° may be set. Further, the range may be varied in accordance with the operation condition.

Figure 13:
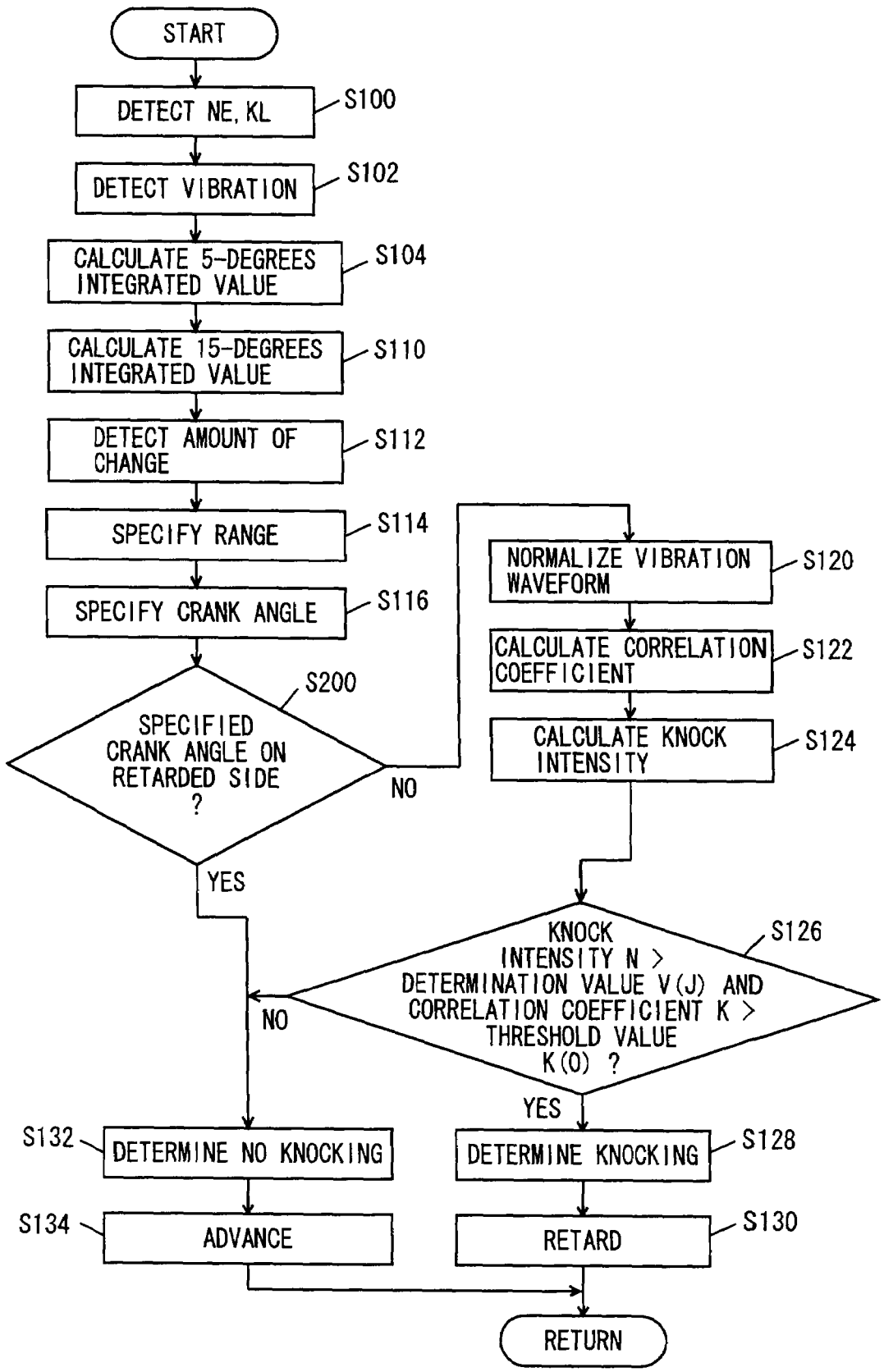
FIG. 13 is a flowchart representing a control structure of a program executed by engine ECU as the knock determination device in accordance with the second embodiment of the present invention.

Referring to FIG. 13, control structure of the program executed by engine ECU 200 as the knock determination device in accordance with the present embodiment will be described. The same processes as those of the first embodiment above are denoted by the same step numbers. Therefore, detailed description thereof will not be repeated.

At S200, engine ECU 200 determines whether or not the specified crank angle is in the retarded side one of the ranges obtained by equally dividing the knock detection gate by two. If the specified crank angle is in the retarded side one of the ranges obtained by equally dividing the knock detection gate by two (YES at S200), the process proceeds to S132. If not (NO at S200), the process proceeds to S120.

An operation of engine ECU 200 as the knock determination device according to the present embodiment based on the above-described configuration and flowchart will be described.

Figure 14:
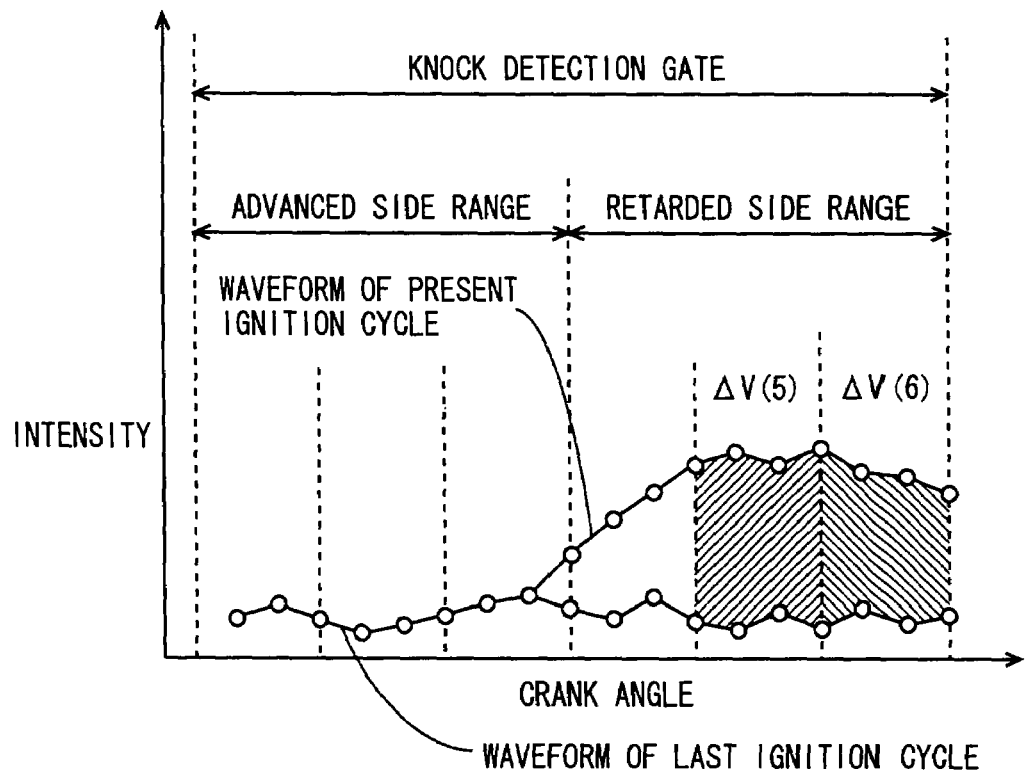
FIG. 14 is a (second) diagram representing amount of change of 15-degrees integrated value.

As shown by the hatching in FIG. 14, if the amount of change in 15-degrees integrated value is large in the range near the crank angle of 90°, that is, near the end point of knock detection gate, the crank angle involving peak intensity can be specified on the retarded side one of the ranges obtained by equally dividing the knock detection gate by two.

It is known that knock occurs near the top dead center in engine 100. In other words, vibration that occurs near the crank angle of 90° is caused not by knocking.

Therefore, if the range specified as the range in which the amount of change in 15-degrees integrated value is larger exists in the retarded side one of the ranges obtained by equally dividing the knock detection gate by two (YES at S200), it is determined that knock has not occurred (S132).

Therefore, even when vibration intensity increases accidentally at a crank angle at which knocking occurrence is impossible, false determination that knock has occurred when actually there is no knocking can be avoided. Rather than the determination that knock has not occurred, the coefficient of correlation K may be calculated to "0".

Third Embodiment

In the following, the third embodiment of the present invention will be described. In the present embodiment, a range including the range specified as having larger amount of change in 15-degrees integrated value and wider than the specified range is defined as the search range and, in this point, it is different from the first embodiment described above. If there is no crank angle in which the intensity peaks in the search range, it is determined that knock has not occurred, and in this point also, it differs from the first embodiment described above. Except for these points, other configurations are the same as those of the first embodiment described above. Functions are also the same. Therefore, detailed description thereof will not be repeated.

Figure 15:
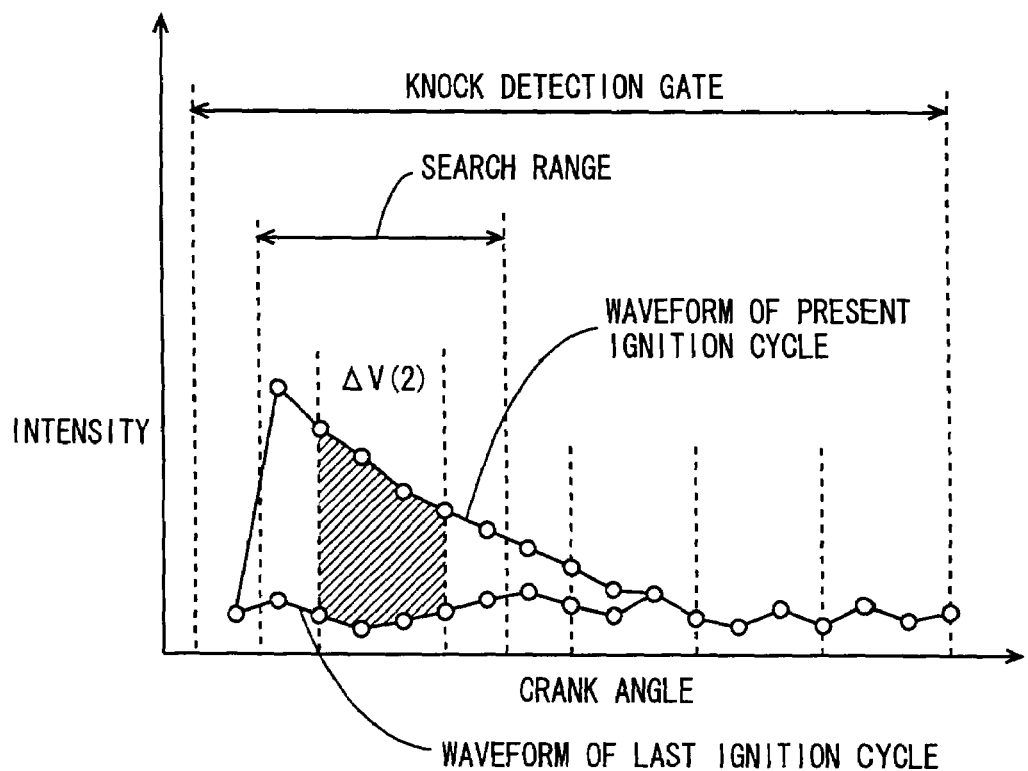
FIG. 15 shows a crank angle search range in which the intensity peaks, in a third embodiment of the present invention.

As shown in FIG. 15, in the present embodiment, a range including the range specified as having larger amount of change in 15-degrees integrated value and wider than the specified range is defined as the search range. Therefore, it is possible to detect a vibration peak even from the vicinity of a crank angle range in which the amount of change in the integrated value is large. Therefore, even if there is no crank angle in which intensity peaks in the range specified as having larger amount of change in 15-degrees integrated value, it is possible to specify a crank angle in which the intensity peaks, if such a crank angle exists near the specified range. As a result, peak intensity derived from knocking can be specified with higher accuracy.

Figure 16:
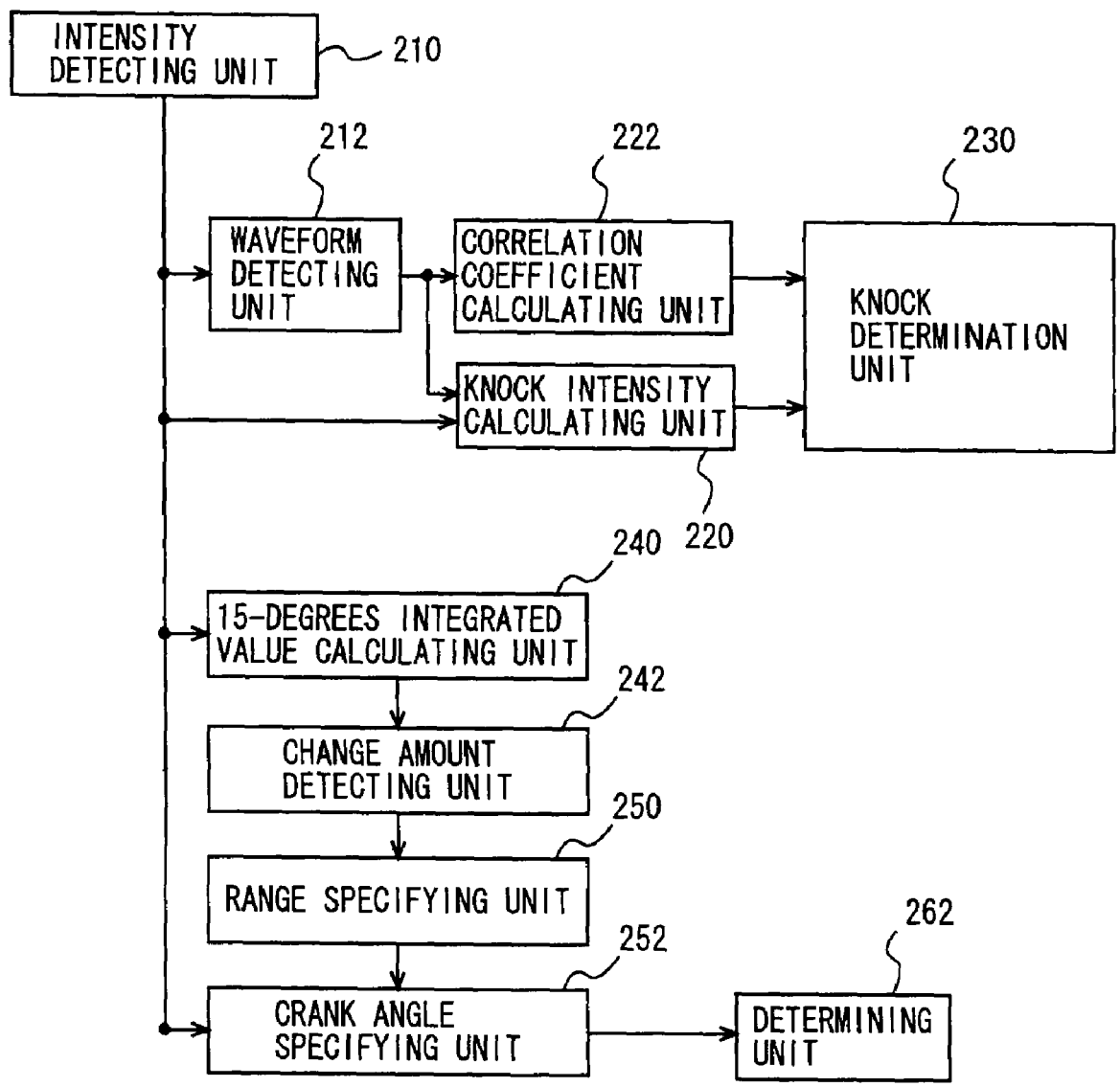
FIG. 16 is a functional block diagram of engine ECU as the knock determination device in accordance with a fourth embodiment of the present invention.

Referring to FIG. 16, functions of engine ECU 200 as the knock determination device in accordance with the present embodiment will be described. The functions of engine ECU 200 described below may be implemented by hardware or software. The same components as in the first embodiment above are denoted by the same reference characters and detailed description thereof will not be repeated here.

Engine ECU 200 additionally includes a determination unit 262. Determination unit 262 determines that knock has not occurred, if the crank angle specified as having higher intensity than that of a neighboring crank angle, that is, the crank angle having peak intensity, does not exist in the search range.

Figure 17:
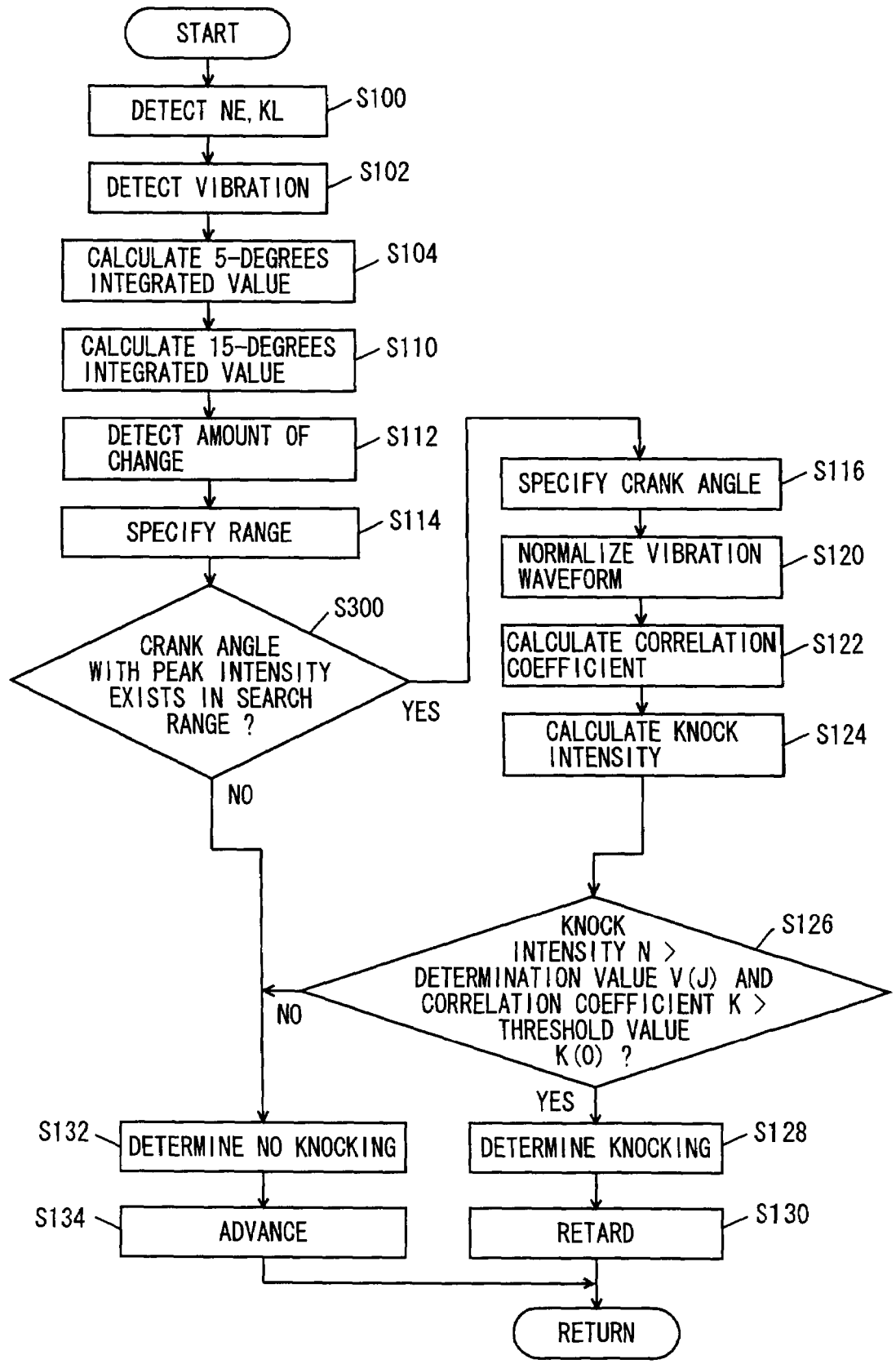
FIG. 17 is a flowchart representing a control structure of a program executed by engine ECU as the knock determination device in accordance with the fourth embodiment of the present invention.

Referring to FIG. 17, control structure of the program executed by engine ECU 200 as the knock determination device in accordance with the present embodiment will be described. The same processes as those of the first embodiment above are denoted by the same step numbers. Therefore, detailed description thereof will not be repeated.

At S300, engine ECU 200 determines whether there is any crank angle having higher intensity than that of a neighboring crank angle, that is, the crank angle having peak intensity, in the search range or not. If the crank angle having the peak intensity exists in the search range (YES at S300), the process proceeds to S116. If not (NO at S300), the process proceeds to S132.

An operation of engine ECU 200 as the knock determination device according to the present embodiment based on the above-described configuration and flowchart will be described.

If the crank angle in which the intensity peaks does not exist in the search range (YES at S300), it may be the case that vibration intensity accidentally increased at a crank angle in which knocking is impossible, that is, outside the search range. In this case, it is determined that knock has not occurred (S132). Therefore, false determination that knock has occurred when actually there is no knocking can be avoided. Rather than the determination that knock has not occurred, the coefficient of correlation K may be calculated to "0".

Fourth Embodiment

In the following, the fourth embodiment of the present invention will be described. In the present embodiment, the amount of change in the 15-degrees integrated value is detected from the absolute value of difference between the 15-degrees integrated value of the present ignition cycle and the 15-degrees integrated value of the last ignition cycle, and in this point it is different from the first embodiment described above. Except for this point, other configurations are the same as those of the first embodiment described above. Functions are also the same. Therefore, detailed description thereof will not be repeated.

Figure 18:
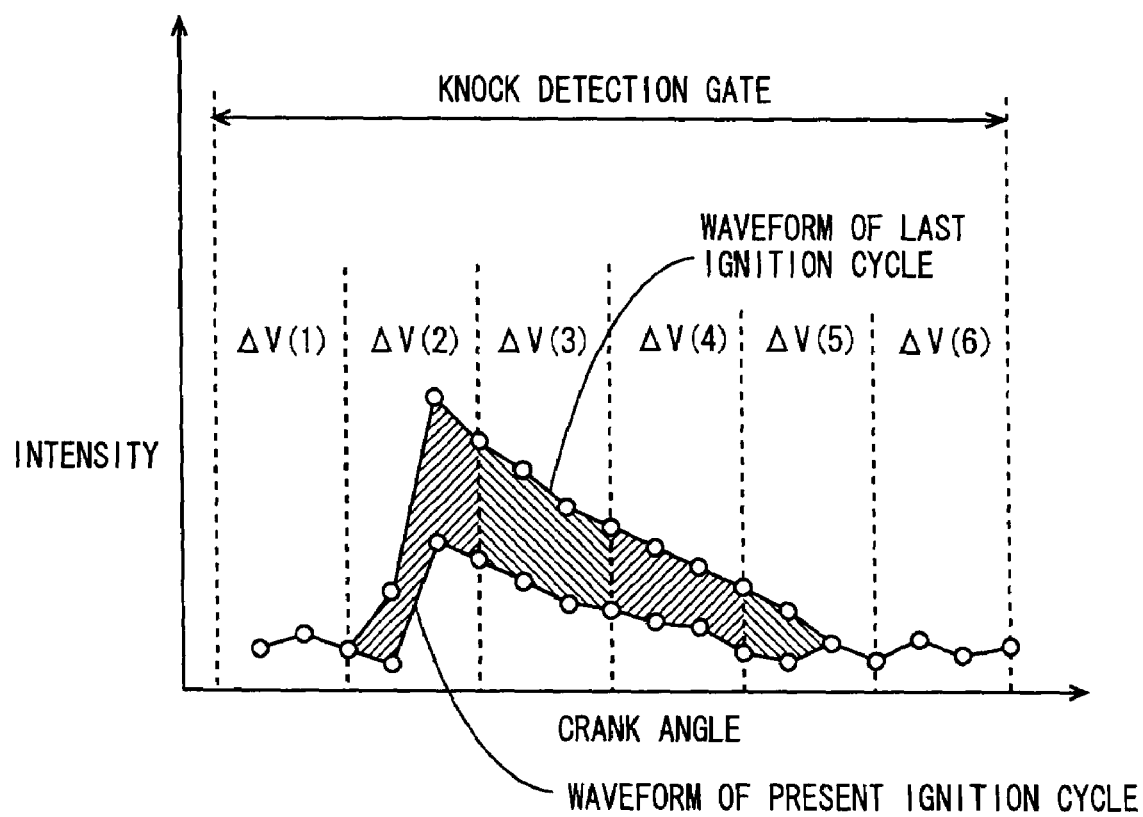
FIG. 18 is a (third) diagram representing amount of change of 15-degrees integrated value.

When the amounts of change $\Delta V(1)$ to $\Delta V(6)$ in the 15-degrees integrated value are detected from the absolute value of difference between the 15-degrees integrated value of the present ignition cycle and the 15-degrees integrated value of the last ignition cycle, the amounts of change $\Delta V(1)$ to $\Delta V(6)$ in the 15-degrees integrated value can be detected even if the intensity of the present ignition cycle is smaller than the intensity of the last ignition cycle, as shown by the hatching in FIG. 18.

Fifth Embodiment

In the following the fifth embodiment of the present invention will be described. In the present embodiment, the number of ranges to be specified as ranges having larger amount of change is determined in accordance with the ratio of each of the amounts of change $\Delta V(1)$ to $\Delta V(6)$ in the 15-degrees integrated value with respect to the sum $\Delta V(A)$ of amounts of change $\Delta V(1)$ to $\Delta V(6)$ in the 15-degrees integrated value and, in this point, it is different from the first embodiment described above. Except for this point, other configurations are the same as those of the first embodiment described above. Functions are also the same. Therefore, detailed description thereof will not be repeated.

Figure 19:
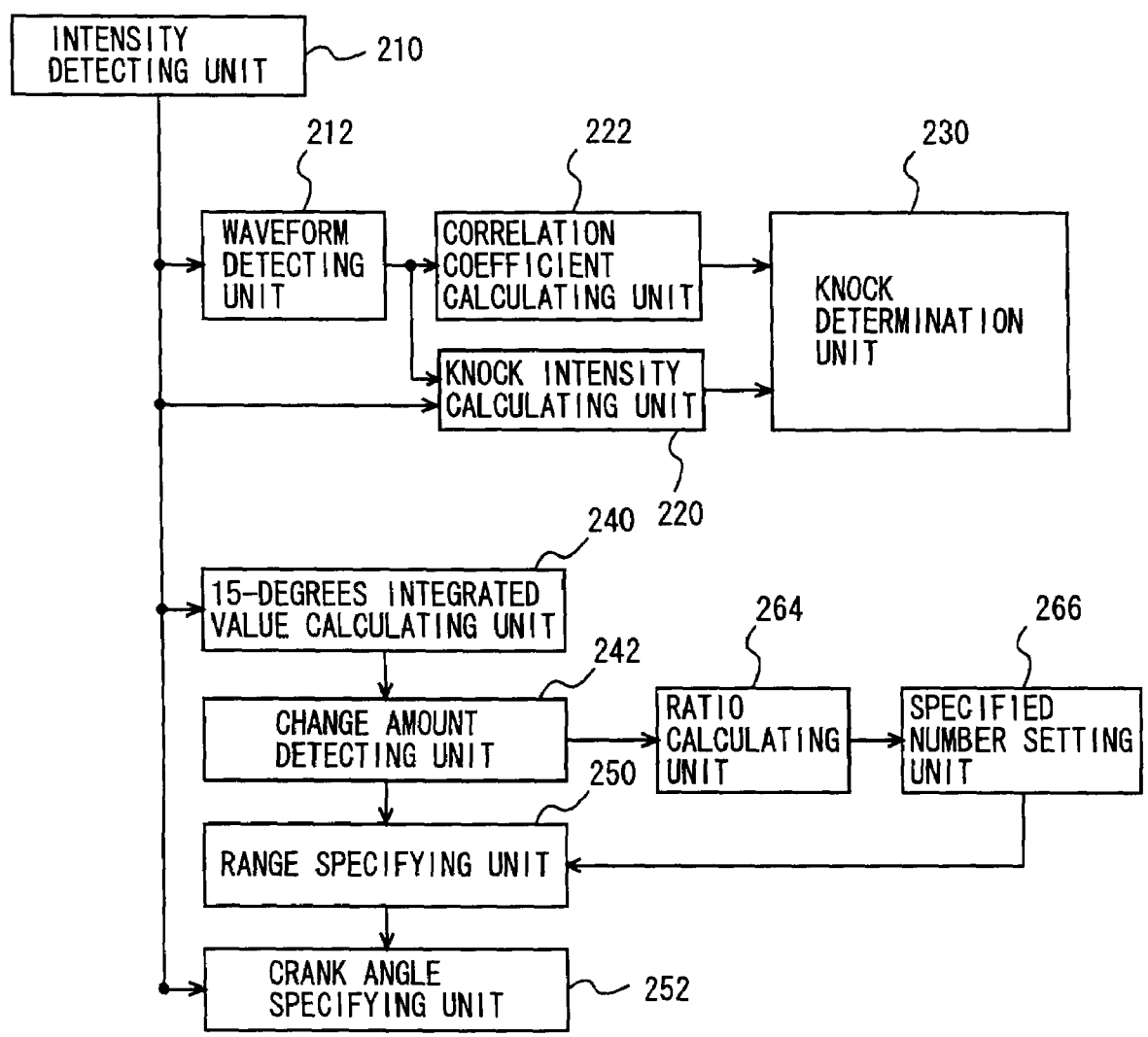
FIG. 19 is a functional block diagram of engine ECU as the knock determination device in accordance with a fifth embodiment of the present invention.

Referring to FIG. 19, functions of engine ECU 200 as the knock determination device in accordance with the present embodiment will be described. The functions of engine ECU 200 described below may be implemented by hardware or software. The same components as in the first embodiment above are denoted by the same reference characters and detailed description thereof will not be repeated here.

Engine ECU 200 further includes a ratio calculating unit 264 and a specified number setting unit 266. Ratio calculating unit 264 calculates the ratio of each of the amounts of change $\Delta V(1)$ to $\Delta V(6)$ in the 15-degrees integrated value with respect to the sum $\Delta V(A)$ of amounts of change $\Delta V(1)$ to $\Delta V(6)$ in the 15-degrees integrated value.

Specified number setting unit 266 determines "1" to be the number of ranges to be specified, if at least one of the ratios of the amounts of change $\Delta V(1)$ to $\Delta V(6)$ in the 15-degrees integrated value with respect to the sum $\Delta V(A)$ of amounts of change $\Delta V(1)$ to $\Delta V(6)$ in the 15-degrees integrated value is equal to or higher than a threshold value (for example, 50%).

The unit determines "2" to be the number of ranges to be specified, if all of the ratios of the amounts of change $\Delta V(1)$ to $\Delta V(6)$ in the 15-degrees integrated value with respect to the sum $\Delta V(A)$ of amounts of change $\Delta V(1)$ to $\Delta V(6)$ in the 15-degrees integrated value are lower than the threshold value. The number of the ranges to be specified may be other than "1" or "2".

Figure 20:
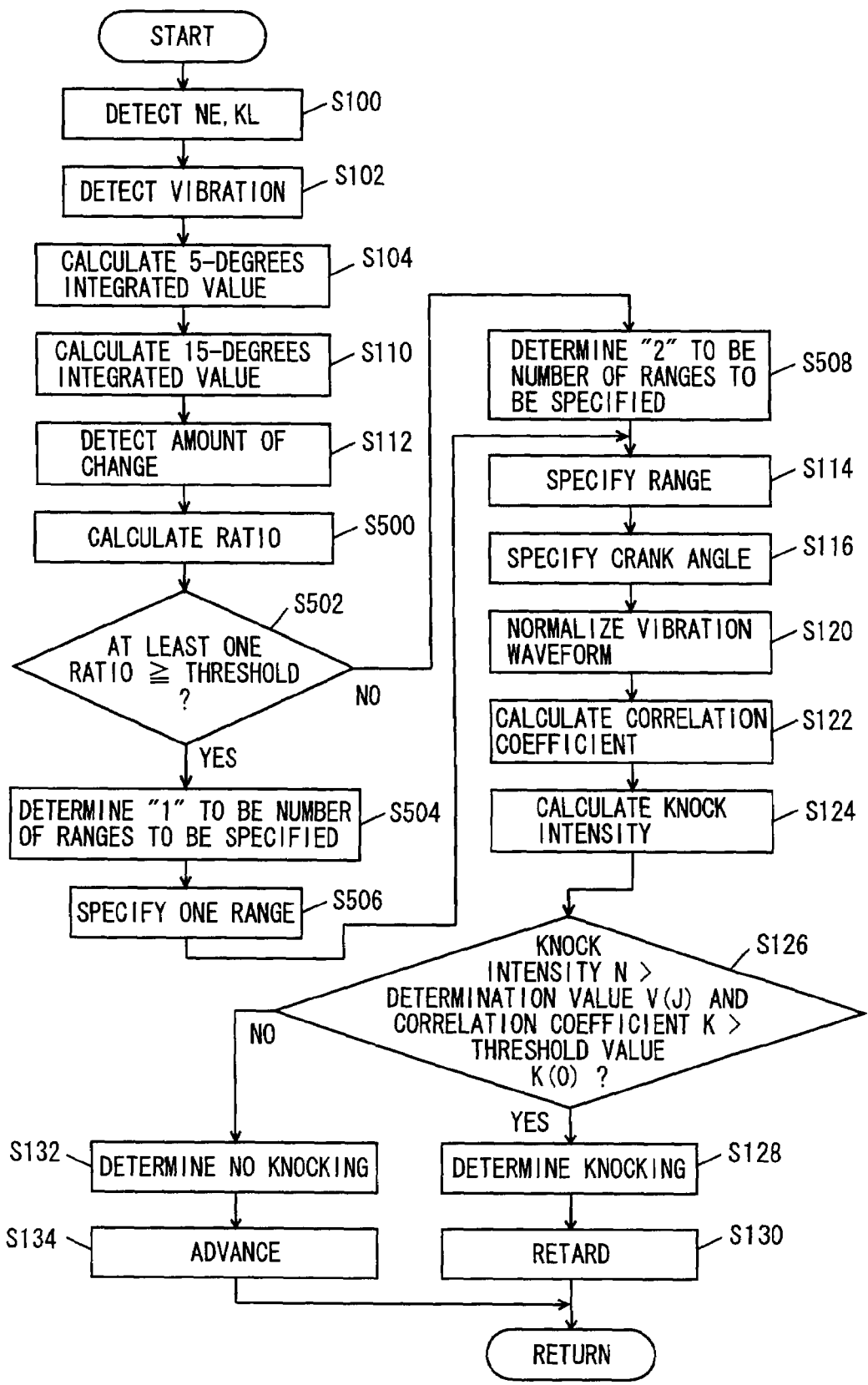
FIG. 20 is a flowchart representing a control structure of a program executed by engine ECU as the knock determination device in accordance with the fifth embodiment of the present invention.

Referring to FIG. 20, control structure of the program executed by engine ECU 200 as the knock determination device in accordance with the present embodiment will be described. The same processes as those of the first embodiment above are denoted by the same step numbers. Therefore, detailed description thereof will not be repeated.

At S500, engine ECU 200 calculates the ratio of each of the amounts of change $\Delta V(1)$ to $\Delta V(6)$ in the 15-degrees integrated value with respect to the sum $\Delta V(A)$ of amounts of change $\Delta V(1)$ to $\Delta V(6)$ in the 15-degrees integrated value.

At S502, engine ECU 200 determines whether or not at least one of the ratios of the amounts of change $\Delta V(1)$ to $\Delta V(6)$ in the 15-degrees integrated value with respect to the sum $\Delta V(A)$ of amounts of change $\Delta V(1)$ to $\Delta V(6)$ in the 15-degrees integrated value is equal to or higher than a threshold value.

If at least one of the ratios of the amounts of change $\Delta V(1)$ to $\Delta V(6)$ in the 15-degrees integrated value with respect to the sum $\Delta V(A)$ of amounts of change $\Delta V(1)$ to $\Delta V(6)$ in the 15-degrees integrated value is equal to or higher than the threshold value (YES at S502), the process proceeds to S504. If not (NO at S502), the process proceeds to S508.

At S504, engine ECU 200 determines "1" to be the number of ranges to be specified. At S506, engine ECU 200 specifies one range in which the detected amount of change in the 15-degrees integrated value is large. Specifically, it specifies the range in which the amount of change in the 15-degrees integrated value is the largest. At S508, engine ECU 200 determines "2" to be the number of ranges to be specified.

An operation of engine ECU 200 as the knock determination device according to the present embodiment based on the above-described configuration and flowchart will be described.

Figure 21:
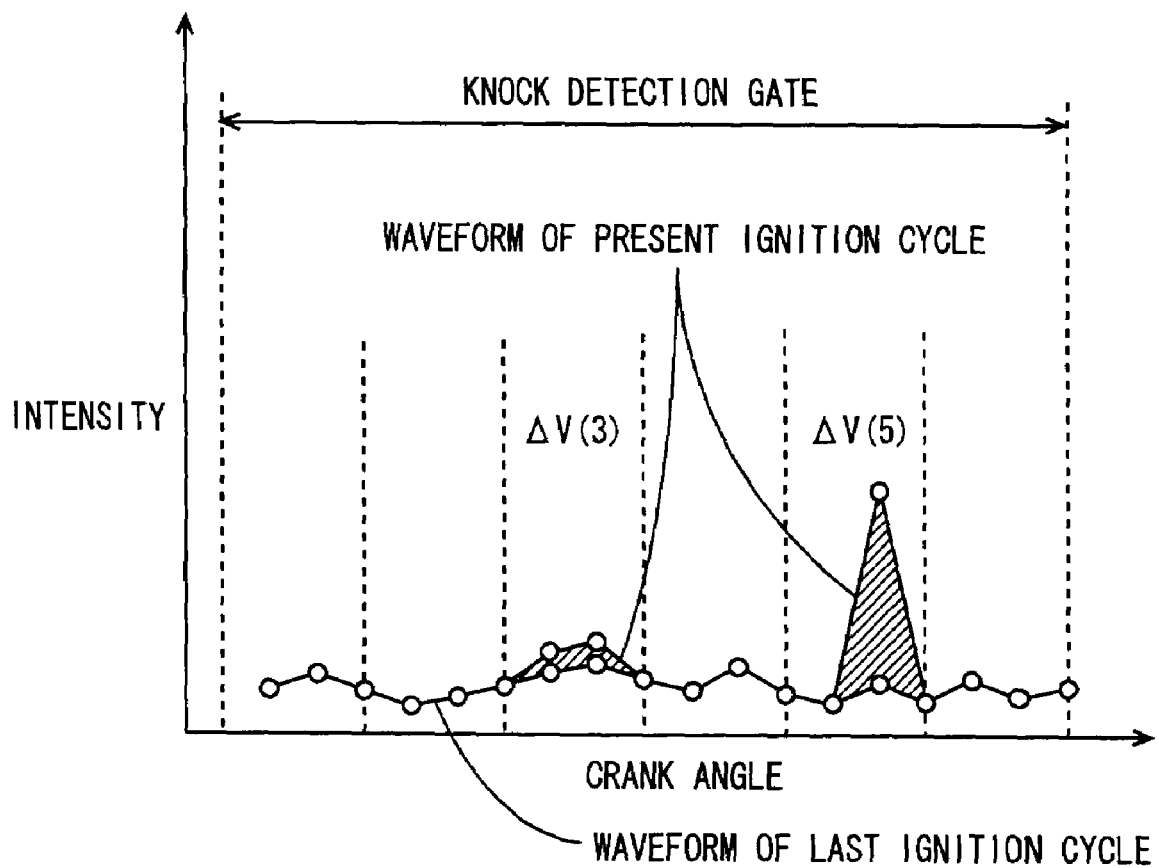
FIG. 21 is a (fourth) diagram representing amount of change of 15-degrees integrated value.

If knock does not occur but vibration is caused by a factor other than knocking, it is possible as shown in FIG. 21 that the amount of change in 15-degrees integrated value of the range in which knock is impossible increases significantly as compared with the amounts of change in 15-degrees integrated value of other ranges.

If two ranges are specified as ranges in which amount of change in 15-degrees integrated value is large, a range in which relative amount of change is large but absolute amount of change is small would possibly be specified. Specification of such a range may lead to an erroneous determination that knock has occurred.

Therefore, the ratios of the amounts of change ΔV(1) to ΔV(6) in the 15-degrees integrated value with respect to the sum ΔV(A) of amounts of change ΔV(1) to ΔV(6) in the 15-degrees integrated value are calculated (S500). If any one of the ratios of the amounts of change ΔV(1) to ΔV(6) in the 15-degrees integrated value with respect to the sum ΔV(A) of amounts of change ΔV(1) to ΔV(6) in the 15-degrees integrated value is equal to or higher than the threshold value (YES at S502), "1" is determined to be the number of ranges to be specified (S504).

Therefore, one having the larger amount of change detected in 15-degrees integrated value among the six ranges is specified (S506). Therefore, it becomes possible to avoid specification of a range in which relative amount of change is large but absolute amount of change is small. Accordingly, it is possible to prevent erroneous specification of a crank angle in which the intensity peaks, from a range of low possibility that knock has occurred. Therefore, erroneous determination can be reduced.

If all the ratios of the amounts of change ΔV(1) to ΔV(6) in the 15-degrees integrated value with respect to the sum ΔV(A) of amounts of change ΔV(1) to ΔV(6) in the 15-degrees integrated value are lower than the threshold value (NO at S502), "2" is specified as the number of ranges to be specified as normally done (S508).

Sixth Embodiment

In the following, the sixth embodiment of the present invention will be described. In the present embodiment, the amounts of change ΔV(1) to ΔV(6) in the 15-degrees integrated value are detected based on the difference from the 15-degrees integrated value of the last or more previous ignition cycle that satisfies the condition that intensity value LOG (V) is smaller than the knock determination level V(KD) and, in this point, the present embodiment differs from the first embodiment. Except for this point, other configurations are the same as those of the first embodiment described above. Functions are also the same. Therefore, detailed description thereof will not be repeated.

Figure 22:
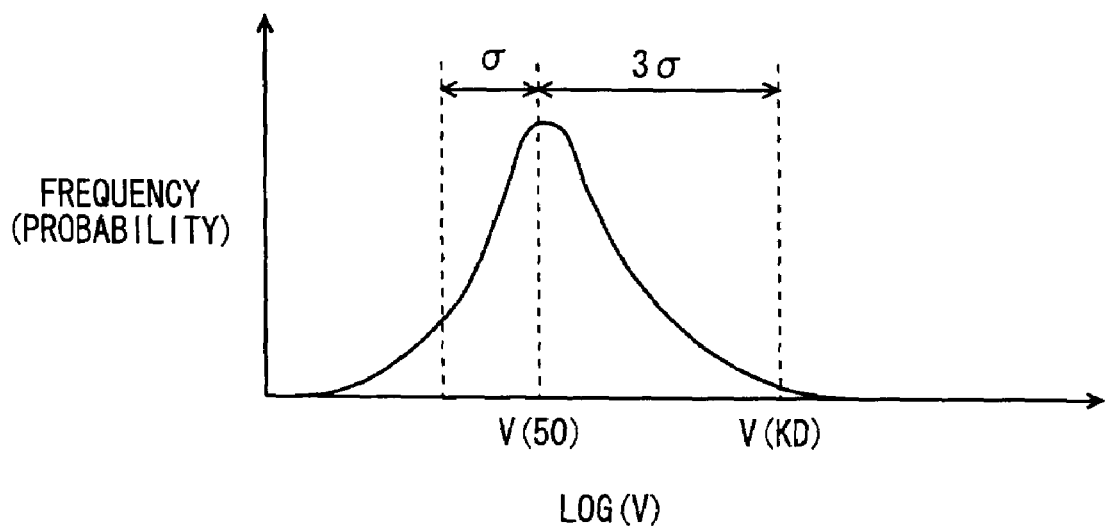
FIG. 22 is a (second) diagram representing frequency distribution of intensity value LOG(V).

In the present embodiment, the amounts of change ΔV(1) to ΔV(6) in the 15-degrees integrated value are detected based on the difference between the 15-degrees integrated values of the present ignition cycle and the 15-degrees integrated values of the last or more previous ignition cycle satisfying the conditions that intensity value LOG(V) is smaller than the knock determination level V(KD) shown in the frequency distribution of FIG. 22.

Specifically, If the intensity value LOG(V) of the last ignition cycle is not lower than the knock determination level V(KD) and the intensity value LOG(V) of the second last ignition cycle is smaller than the knock determination level V(KD), the amounts of change ΔV(1) to ΔV(6) in the 15-degrees integrated value are detected based on the difference between the 15-degrees integrated values of the present ignition cycle and the 15-degrees integrated values of the second last ignition cycle.

Here, the intensity value LOG(V) is calculated using the maximum intensity of the detected vibration waveform and, therefore, that the intensity value LOG(V) is smaller than the knock determination level V(KD) is the same that the maximum intensity of detected waveform is smaller than the value obtained by antilogarithmic transformation of knock determination level V(KD).

Figure 23:
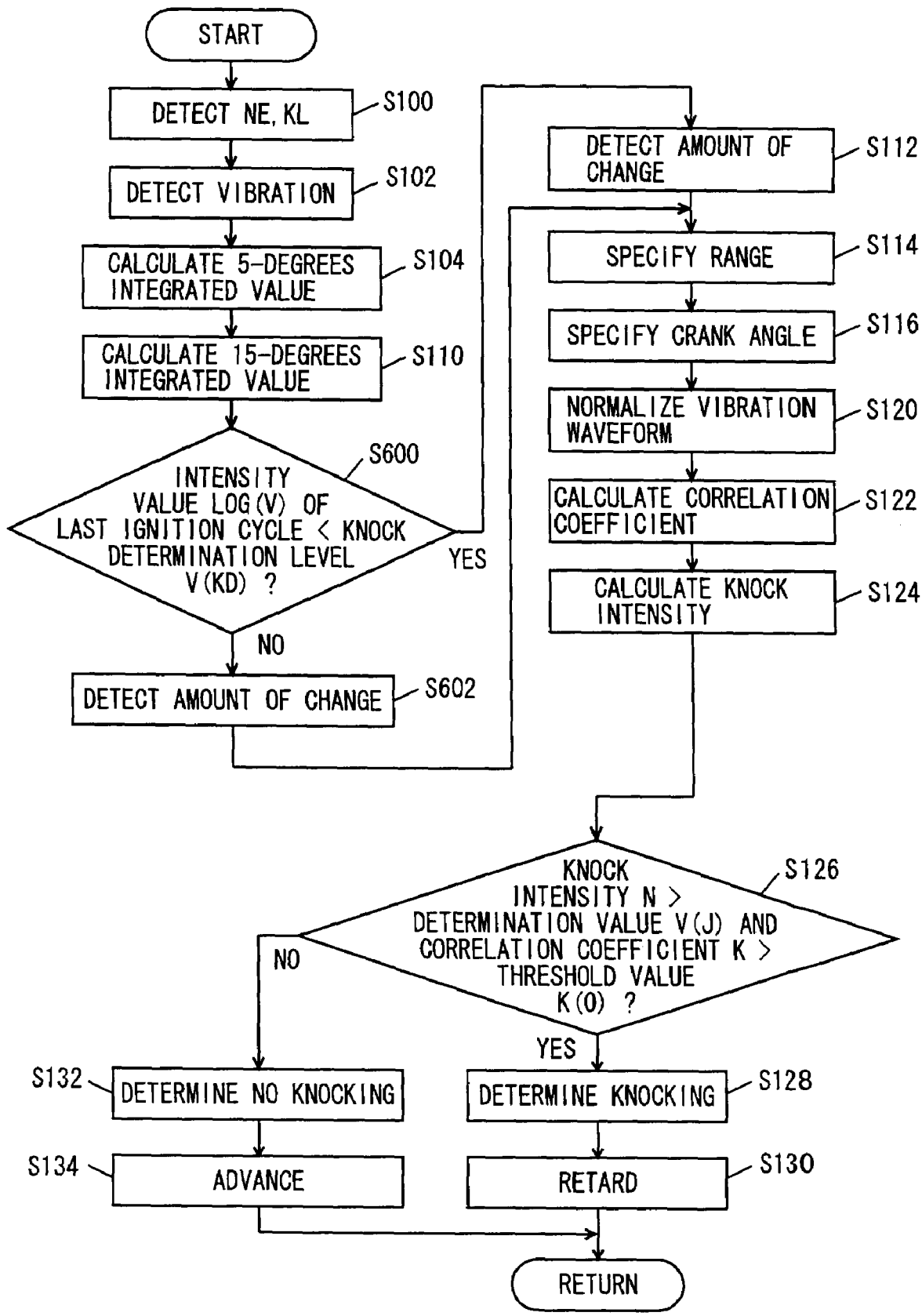
FIG. 23 is a flowchart representing a control structure of a program executed by engine ECU as the knock determination device in accordance with a sixth embodiment of the present invention.

Referring to FIG. 23, the control structure of the program executed by engine ECU 200 as the knock determination device in accordance with the present embodiment will be described. The same processes as those of the first embodiment above are denoted by the same step numbers. Therefore, detailed description thereof will not be repeated.

At S600, engine ECU 200 determines whether the intensity value LOG(V) of the last ignition cycle is smaller than the knock determination level V(KD) or not. If the intensity value LOG(V) of the last ignition cycle is smaller than the knock determination level V(KD) (YES at S600), the process proceeds to S1112. If not (NO at S600), the process proceeds to S602.

At S602, engine ECU 200 detects the amounts of change ΔV(1) to ΔV(6) in the 15-degrees integrated value, based on the difference between the 15-degrees integrated values of the present ignition cycle and the 15-degrees integrated values of that one the second last or more previous ignition cycles which is the latest and having the intensity value LOG(V) smaller than the knock determination level V(KD).

It is noted that one of the second last or more previous ignition cycles having the intensity value LOG(V) smaller than the knock determination level V(KD) and not the latest ignition cycle may be used.

An operation of engine ECU 200 as the knock determination device according to the present embodiment based on the above-described configuration and flowchart will be described.

If knock has occurred or vibration of high intensity has occurred because of some factor other than knocking in the last ignition cycle, the 15-degrees integration value of the last ignition cycle could be large. If the amounts of change ΔV(1) to ΔV(6) in the 15-degrees integrated value are detected based on the 15-degrees integration value of the ignition cycle as such, the amounts of change themselves become smaller even if knock has occurred in the present ignition cycle.

Therefore, if the intensity value LOG(V) of the last ignition cycle is larger than the knock determination level V(KD) (NO at S600), the amounts of change ΔV(1) to ΔV(6) in the 15-degrees integrated value are detected based on the difference between the 15-degrees integrated value of the present ignition cycle and the 15-degrees integrated value of that one the second last or more previous ignition cycles which is the latest and having the intensity value LOG(V) smaller than the knock determination level V(KD) (S602).

Specifically, the amounts of change ΔV(1) to ΔV(6) in the 15-degrees integrated value are detected, using the 15-degrees integrated values of the ignition cycle free of vibration caused by knocking or vibration caused by a factor other than knocking as the reference.

Therefore, a situation where the amounts of change become small despite of knocking occurrence can be avoided. As a result, a range in which knocking has possibly been occurred may be specified with high accuracy.

If the intensity value LOG(V) of the last ignition cycle is smaller than the knock determination level V(KD) (YES at S600), the amounts of change ΔV(1) to ΔV(6) in the 15-degrees integrated value are detected based on the difference between the 15-degrees integrated values of the present ignition cycle and the 15-degrees integrated values of the last (immediately preceding) ignition cycle (S112).

Seventh Embodiment

In the following, the seventh embodiment of the present invention will be described. In the present embodiment, the amounts of change ΔV(1) to ΔV(6) in the 15-degrees integrated value are detected based on the difference from the 15-degrees integrated value of a plurality of last and more previous ignition cycles that continuously satisfy for more than a predetermined number of times the condition that the intensity value LOG(V) is larger than the knock determination level V(KD) and, in this point, the present embodiment differs from the sixth embodiment. Except for this point, other configurations are the same as those of the first and sixth embodiments described above. Functions are also the same. Therefore, detailed description thereof will not be repeated.

Figure 24:
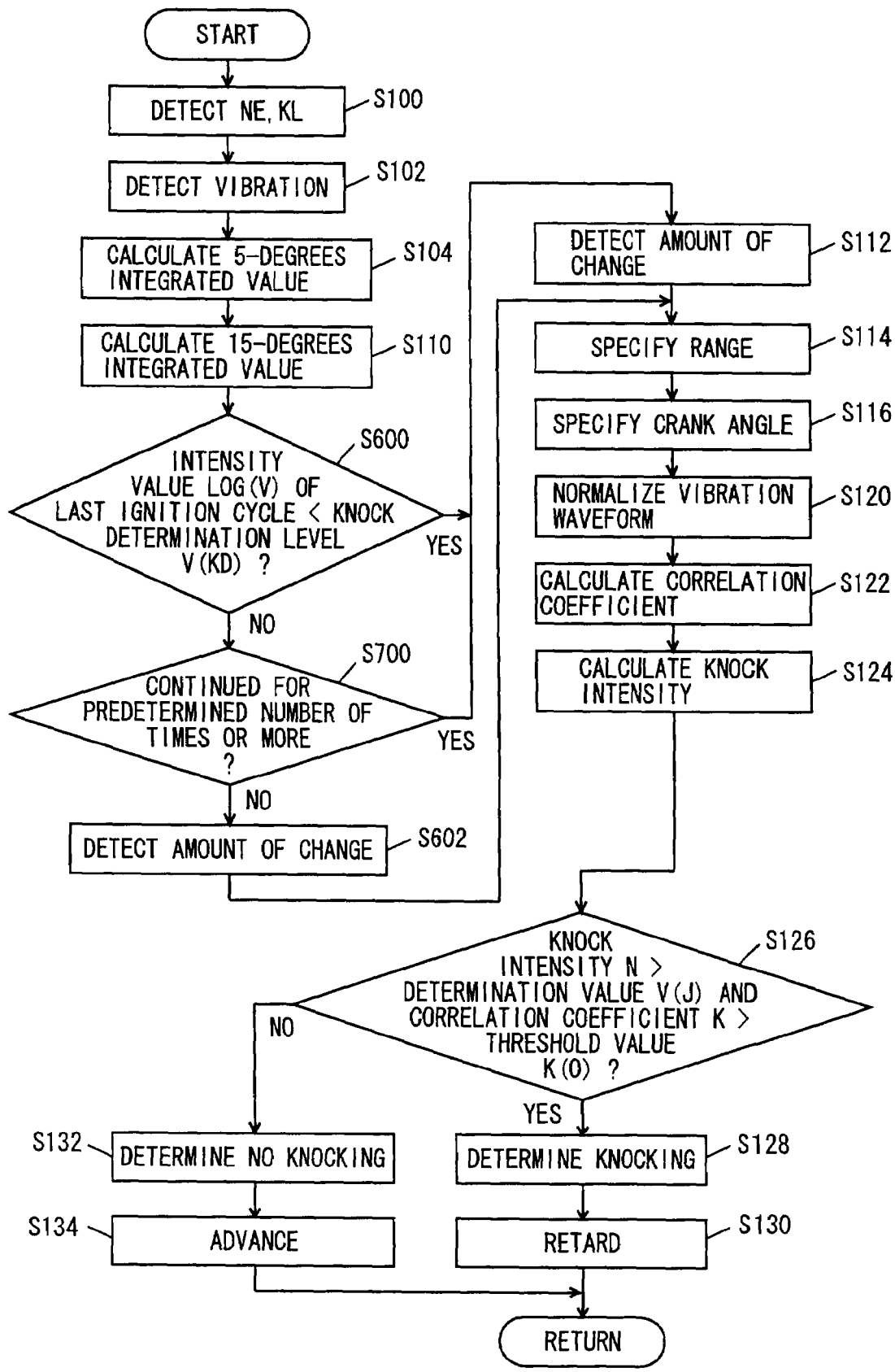
FIG. 24 is a flowchart representing a control structure of a program executed by engine ECU as the knock determination device in accordance with a seventh embodiment of the present invention.

Referring to FIG. 24, the control structure of the program executed by engine ECU 200 as the knock determination device in accordance with the present embodiment will be described. The same processes as those of the first or sixth embodiment above are denoted by the same step numbers. Therefore, detailed description thereof will not be repeated.

At S700, engine ECU 200 determines whether ignition cycles having the intensity value LOG(V) larger than the knock determination level V(KD) had continued for a predetermined number of times or more until the last ignition cycle. If the ignition cycles having the intensity value LOG(V) larger than the knock determination level V(KD) had continued for a predetermined number of times or more (YES at S700), the process proceeds to S112. If not (NO at S700), the process proceeds to S602.

An operation of engine ECU 200 as the knock determination device according to the present embodiment based on the above-described configuration and flowchart will be described.

If the intensity value LOG(V) of the last ignition cycle is larger than the knock determination level V(KD) (NO at S600), whether or not ignition cycles having the intensity value LOG(V) larger than the knock determination level V(KD) had continued for a predetermined number of times or more until the last ignition cycle is determined (S700).

If ignition cycles having the intensity value LOG(V) larger than the knock determination level V(KD) had continued for a predetermined number of times or more (YES at S700), it is considered that vibration of high intensity is not an abrupt vibration caused by knocking or the like but constant vibration generated in engine 100 itself.

In this case, the amounts of change ΔV(1) to ΔV(6) in the 15-degrees integrated value are detected based on the difference between the 15-degrees integrated values of the present ignition cycle and the 15-degrees integrated values of the last (immediately preceding) ignition cycle (S112), as is normally done. Thus, it becomes possible to determine whether knock has occurred or not based on the vibration generated constantly in engine 100. Therefore, false determination that knock has occurred when actually there is no knocking can be avoided.

If ignition cycles having the intensity value LOG(V) larger than the knock determination level V(KD) had not continued for a predetermined number of times or more (NO at S700), it is considered that the vibration of high intensity corresponds to a vibration abruptly occurred because of knocking or the like.

In this case, the amounts of change ΔV(1) to ΔV(6) in the 15-degrees integrated value are detected based on the difference between the 15-degrees integrated values of the present ignition cycle and the 15-degrees integrated values of that one the second last or more previous ignition cycles which is the latest and having the intensity value LOG(V) smaller than the knock determination level V(KD) (S602).

Specifically, the amounts of change ΔV(1) to ΔV(6) in the 15-degrees integrated value are detected, using as the reference the 15-degrees integrated value of the ignition cycle free of vibration caused by knocking or vibration of high intensity caused by a factor other than knocking.

Therefore, a situation where the amounts of change become small despite of knocking occurrence can be avoided. As a result, a range in which knock has possibly been occurred may be specified with high accuracy.

If ignition cycles having the intensity value LOG(V) larger than the knock determination level V(KD) had continued for a predetermined number of times or more until the last ignition cycle, the 15-degrees integrated value of any of the plurality of ignition cycles continuously satisfying, for a predetermined number or larger times, the condition that the intensity value LOG(V) is larger than the knock determination level V(KD) may be used, in place of the last ignition cycle.

Eighth Embodiment

In the following, the eighth embodiment of the present invention will be described. In the present embodiment, the amounts of change ΔV(1) to ΔV(6) in the 15-degrees integrated value are detected based on the difference between the 15-degrees integrated value of the present ignition cycle and the operation value calculated from past 15-degrees integrated value using a method of smoothing referred to as exponential smoothing, that is, the operation value obtained by smoothing the 15-degrees integrated value and, in this the point, the present embodiment differs from the first embodiment. Except for this point, other configurations are the same as those of the first embodiment described above. Functions are also the same. Therefore, detailed description thereof will not be repeated.

Figure 25:
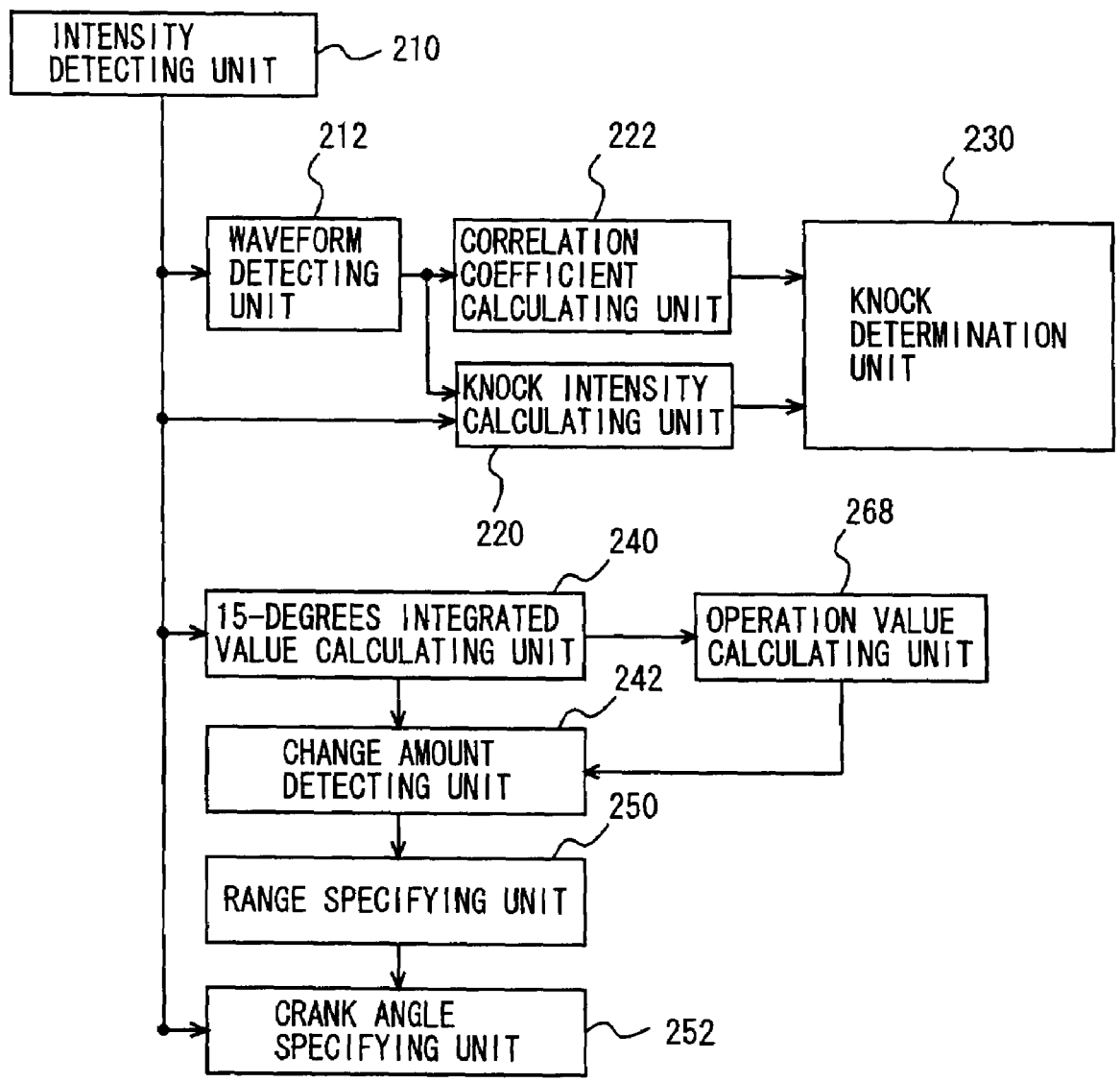
FIG. 25 is a functional block diagram of engine ECU as the knock determination device in accordance with an eighth embodiment of the present invention.

Referring to FIG. 25, functions of an engine ECU 200 as the knock determination device in accordance with the present embodiment will be described. The functions of engine ECU 200 described below may be implemented by hardware or software. The same components as in the first embodiment above are denoted by the same reference characters and detailed description thereof will not be repeated here.

Engine ECU 200 additionally includes an operation value calculating unit 268. Operation value calculating unit 268 calculates an operation value (smoothed 15-degrees integrated value) VN in accordance with Equation (1) below. In Equation (1), VN(i) represents the operation value VN calculated in the present ignition cycle. VN(i−1) represents the operation value calculated in the last ignition cycle. V15(i−1) represents 15-degrees integrated value of the last ignition cycle. Z is a constant.

$$VN(i)=VN(i-1)+Z\times(V15(i-1)-VN(i-1)) \quad (1)$$

The operation value VN is calculated for each of the plurality of crank angle ranges.

Figure 26:
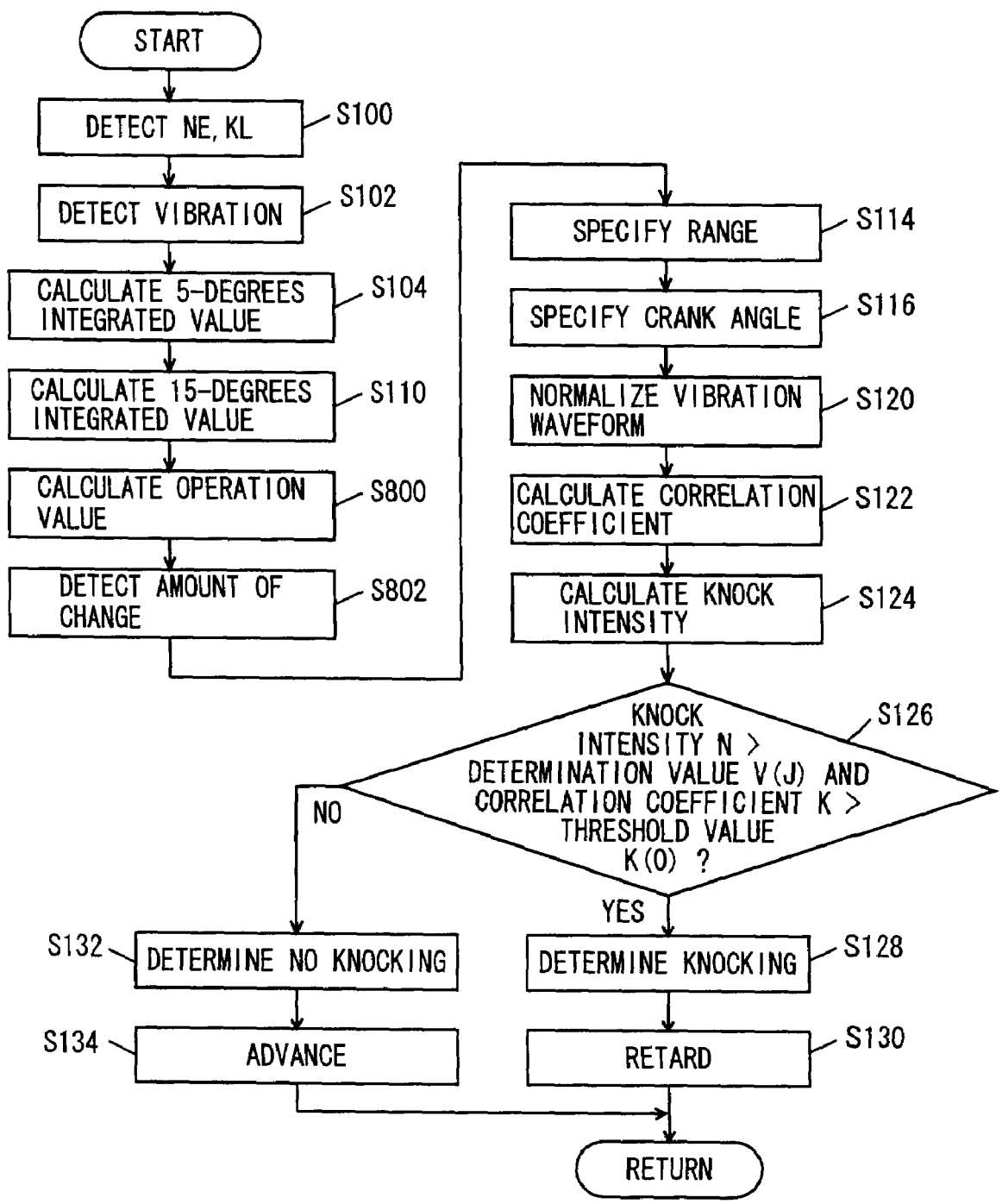
FIG. 26 is a flowchart representing a control structure of a program executed by engine ECU as the knock determination device in accordance with the eighth embodiment of the present invention.

Referring to FIG. 26, the control structure of the program executed by engine ECU 200 as the knock determination device in accordance with the present embodiment will be described. The same processes as those of the first embodiment above are denoted by the same step numbers. Therefore, detailed description thereof will not be repeated.

At S800, engine ECU 200 calculates the operation value VN from 15-degrees integrated value through exponential smoothing.

At S802, engine ECU 200 detects the amounts of change ΔV(1) to ΔV(6) in the 15-degrees integrated value based on the difference between the 15-degrees integrated value of the present ignition cycle and the operation value VN.

In this manner, it is possible to detect the amounts of change ΔV(1) to ΔV(6) in the 15-degrees integrated value using the operation value VN that not much vary ignition cycle by ignition cycle as a reference. Therefore, it becomes possible to determine whether knock has occurred or not stably with high accuracy. The method of smoothing is not limited to the one described above and it may be realized by using simple moving average or a filter.

Ninth Embodiment

In the following, the ninth embodiment of the present invention will be described. In the present embodiment, the operation value VN is calculated using the 15-degrees integrated values of only those ignition cycles which satisfy the condition that the intensity value LOG(V) is smaller than the knock determination level V(KD) and, in this point, the present embodiment differs from the first embodiment. Except for this point, other configurations are the same as those of the first and eighth embodiments described above. Functions are also the same. Therefore, detailed description thereof will not be repeated.

Figure 27:
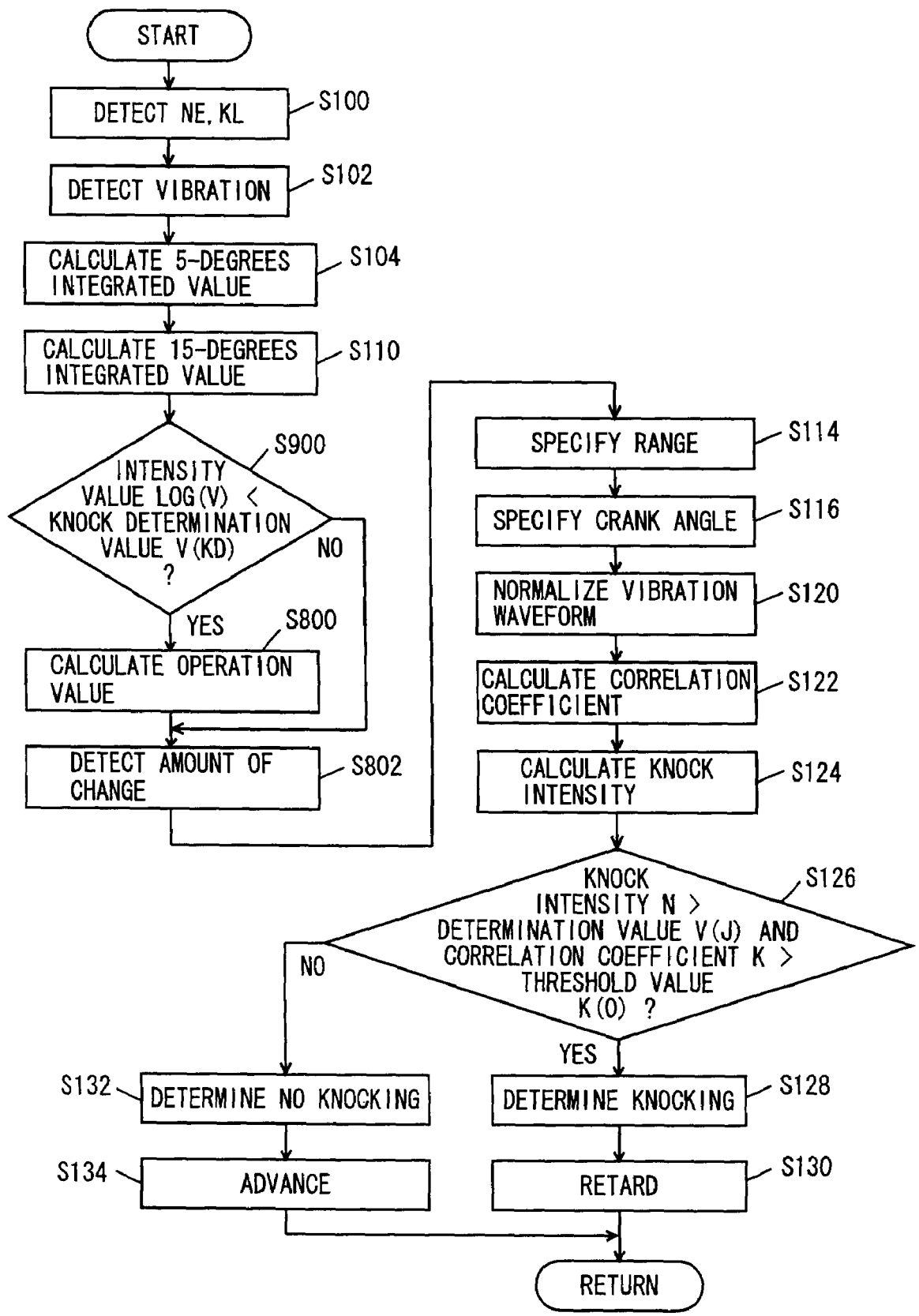
FIG. 27 is a flowchart representing a control structure of a program executed by engine ECU as the knock determination device in accordance with a ninth embodiment of the present invention.

Referring to FIG. 27, the control structure of the program executed by engine ECU 200 as the knock determination device in accordance with the present embodiment will be described. The same processes as those of the first or ninth embodiment above are denoted by the same step numbers. Therefore, detailed description thereof will not be repeated.

At S900, engine ECU 200 determines whether the intensity value LOG(V) was smaller than the knock determination level V(KD) in the last ignition cycle or not. If the intensity value LOG(V) is smaller than the knock determination level V(KD) in the last ignition cycle (YES at S900), the process proceeds to S800. If not (NO at S900), the process proceeds to S802.

In this manner, it becomes possible to calculate the operation value VN from the 15-degrees integrated values excluding the 15-degrees integrated value of the ignition cycle in which knock occurred. The amounts of change ΔV(1) to ΔV(6) in the 15-degrees integrated value are detected using as a reference the operation value VN as such. Therefore, it is possible to detect amounts of change ΔV(1) to ΔV(6) in the 15-degrees integrated value using the operation value VN that not much vary by ignition cycle as a reference. Therefore, it becomes possible to determine whether knock has occurred or not stably with high accuracy.

Tenth Embodiment

In the following, the tenth embodiment of the present invention will be described. In the present embodiment, if the coefficient of correlation K is not larger than the threshold value K(0), or if the crank angle specified as the crank angle having peak intensity exists in a retarded side (larger crank angle) one of two ranges obtained by equally dividing the knock detection gate by two, the detected vibration waveform is corrected. In this point, it is different from the first embodiment described above.

Figure 28:
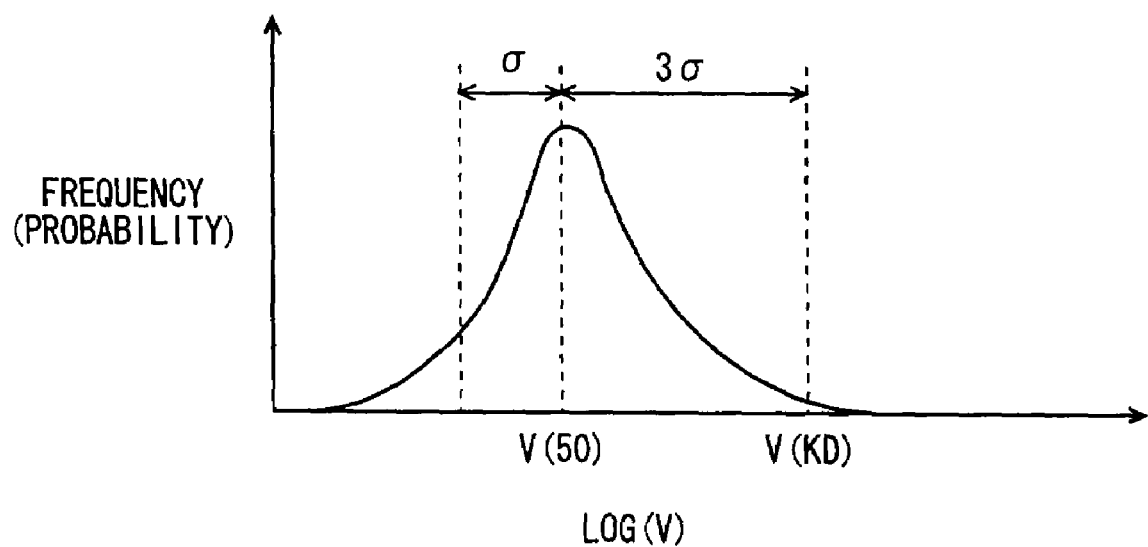
FIG. 28 is a (third) diagram representing frequency distribution of intensity value LOG(V).

Further, in the present embodiment, the intensity value LOG(V) used for the frequency distribution shown in FIG. 28 is calculated by logarithmic transformation of a value obtained by integrating intensities from the top dead center to 90° in a combustion stroke (hereinafter also referred to as a 90-degrees integrated value). Further, in the present embodiment, knock intensity N is calculated by dividing the 90-degrees integrated value by BGL. Specifically, in the present embodiment, using 90-degrees integrated value in place of 5-degrees integrated value, the frequency distribution is formed and the knock intensity is calculated.

Except for these points, structure of engine 100 itself and the like are the same as those of the first embodiment. Functions are also the same. Therefore, detailed description thereof will not be repeated.

Figure 29:
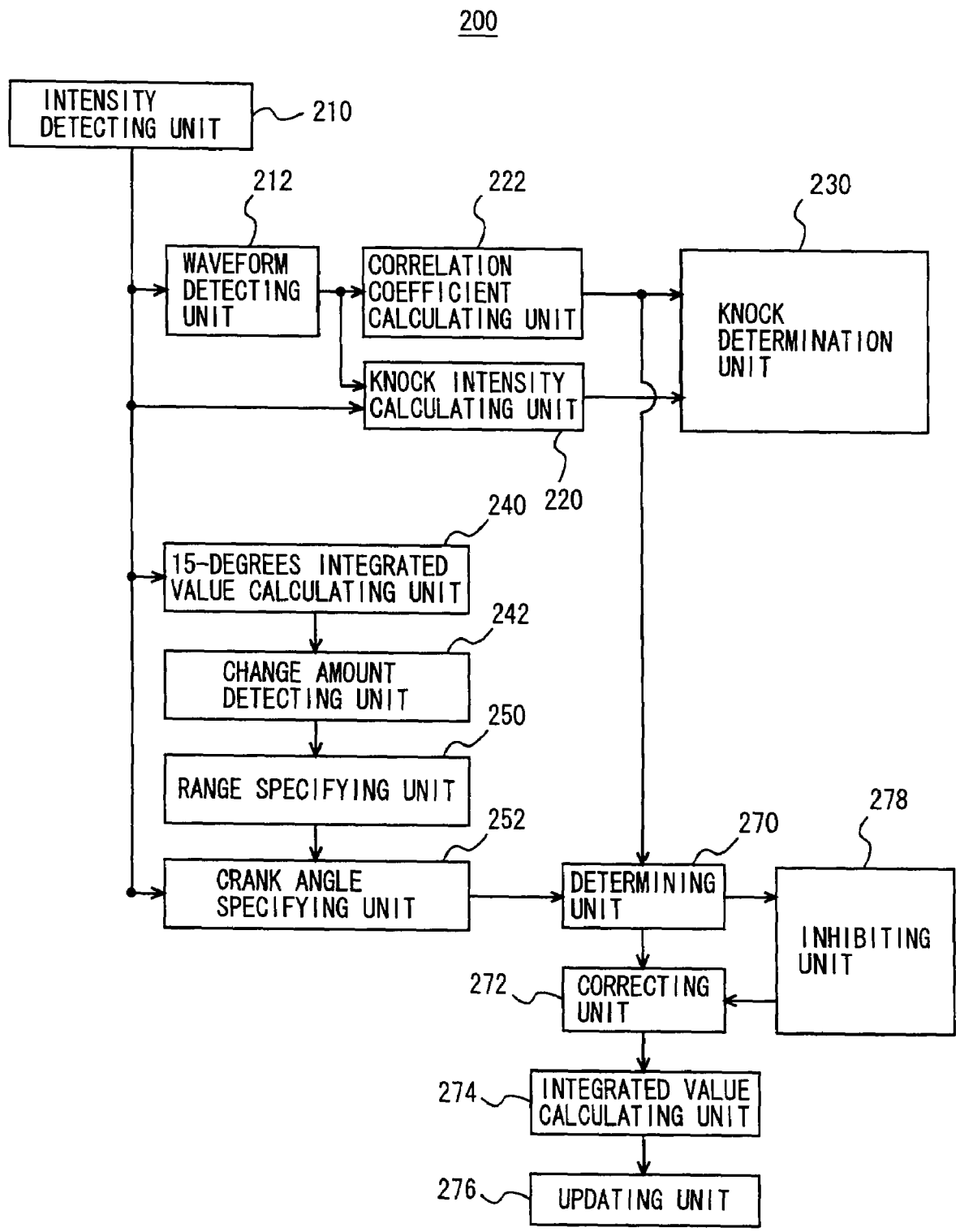
FIG. 29 is a functional block diagram of engine ECU as the knock determination device in accordance with a tenth embodiment of the present invention.

Referring to FIG. 29, functions of an engine ECU 200 as the knock determination device in accordance with the present embodiment will be described. The functions of engine ECU 200 described below may be implemented by hardware or software. The same components as in the first embodiment above are denoted by the same reference characters and detailed description thereof will not be repeated here.

Engine ECU 200 additionally includes a determining unit 270, a correcting unit 272, an integrated value calculating unit 274, an updating unit 276, and an inhibiting unit 278. Determining unit 270 determines whether the 15-degrees integrated value of the range specified as the crank angle range having large amount of change in 15-degrees integrated value has changed by a factor other than knocking or not. Specifically, if the change is caused by mechanical vibration derived from an operation of components (intake valve 116, exhaust valve 118 or the like) of engine 100 itself or not is determined.

By way of example, if the coefficient of correlation K is not larger than the threshold value K(0), or if the crank angle specified as the crank angle having peak intensity exists in a retarded side (larger crank angle) one of two ranges obtained by equally dividing the knock detection gate by two, it is determined that the 15-degrees integrated value has changed not because of knocking.

On the contrary, if the coefficient of correlation K is larger than the threshold value K(0), or if the crank angle specified as the crank angle having peak intensity exists in an advanced side (larger crank angle) one of two ranges obtained by equally dividing the knock detection gate by two, it is determined that the 15-degrees integrated value has changed because of knocking.

Whether the 15-degrees integrated value has changed because of knocking or not is determined for each of the plurality of (in the present embodiment, two) ranges specified as the crank angle ranges having large amount of change in 15-degrees integrated value. Therefore, a plurality of (in the present embodiment, two) coefficients of correlation K are calculated using respective crank angles specified as crank angles with peak intensity. The method of calculating the coefficient of correlation K is the same as in the first embodiment described above and, therefore, detailed description thereof will not be repeated.

The method of determining whether the 15-degrees integrated value has changed because of knocking or not is not limited to the one described above. Further, if the crank angle specified as the crank angle having peak intensity exists in a retarded side (larger crank angle) one of two ranges obtained by equally dividing the knock detection gate by two, the coefficient of correlation K may be calculated as "0".

Correcting unit 272 corrects the detected vibration waveform such that the amount of change in 15-degrees integrated value of the range in which 15-degrees integrated value is determined to have changed not because of knocking becomes smaller. More specifically, the 15-degrees integrated value is adjusted to be equal to the 15-degrees integrated value calculated in the last ignition cycle.

Integrated value calculating unit 274 calculates the 15-degrees integrated value and the 90-degrees integrated value of the intensity in the corrected vibration waveform. Updating unit 276 updates frequency distribution of intensity value LOG(V), using the 90-degrees integrated value. By updating the frequency distribution, calculation of BGL, calculation of knock determination level V(KD) and correction of determination value V(J) are executed.

Inhibiting unit 278 inhibits correction of vibration waveform if the 15-degrees integrated value of at least one of the plurality of ranges specified as crank angle ranges having large amount of change in 15-degrees integrated value is determined to be derived from knocking. Specifically, correction of vibration waveform is inhibited in all ranges.

Figure 30:
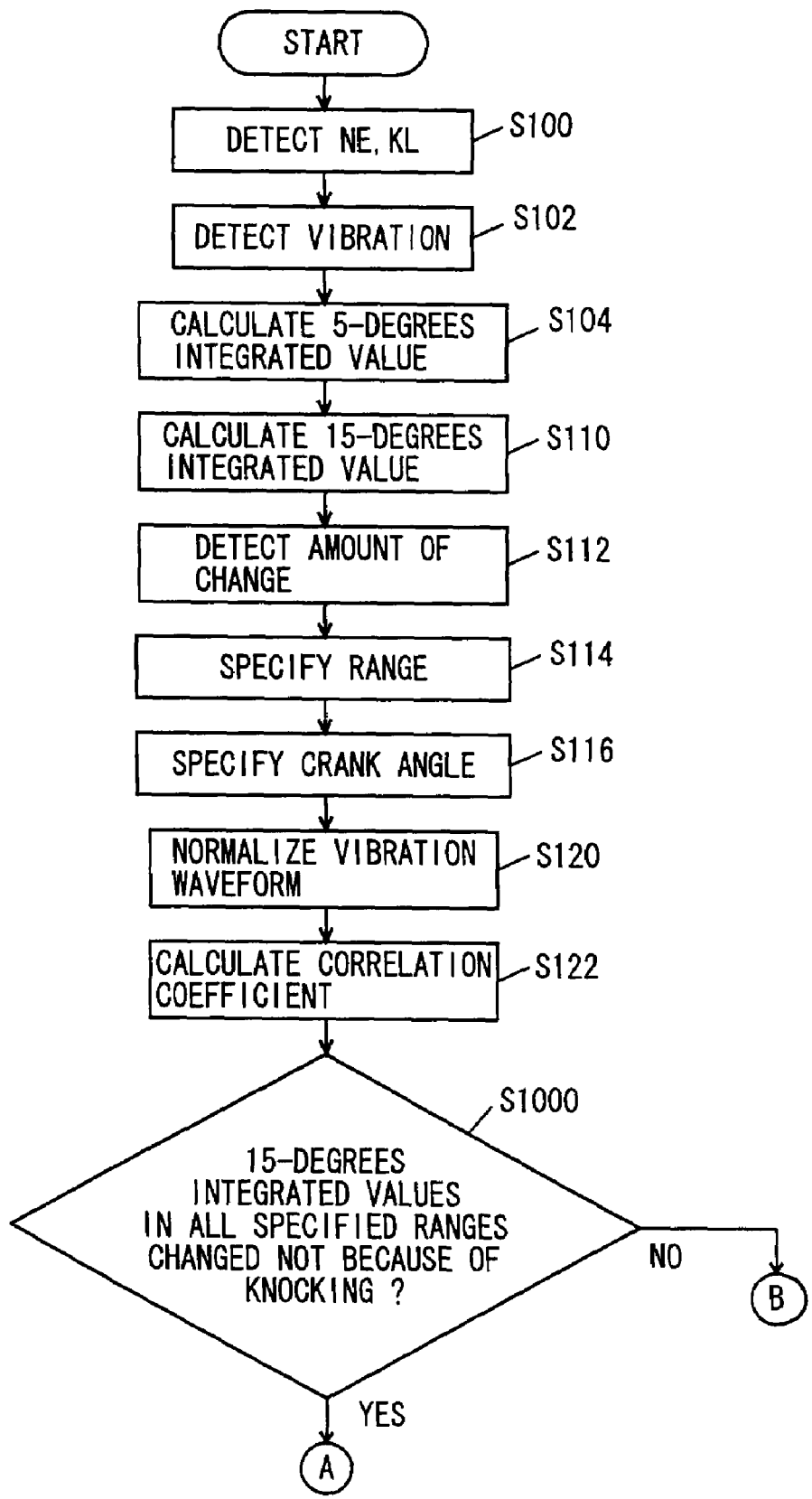
FIG. 30 is a (first) flowchart representing a control structure of a program executed by engine ECU as the knock determination device in accordance with the tenth embodiment of the present invention.
Figure 31:
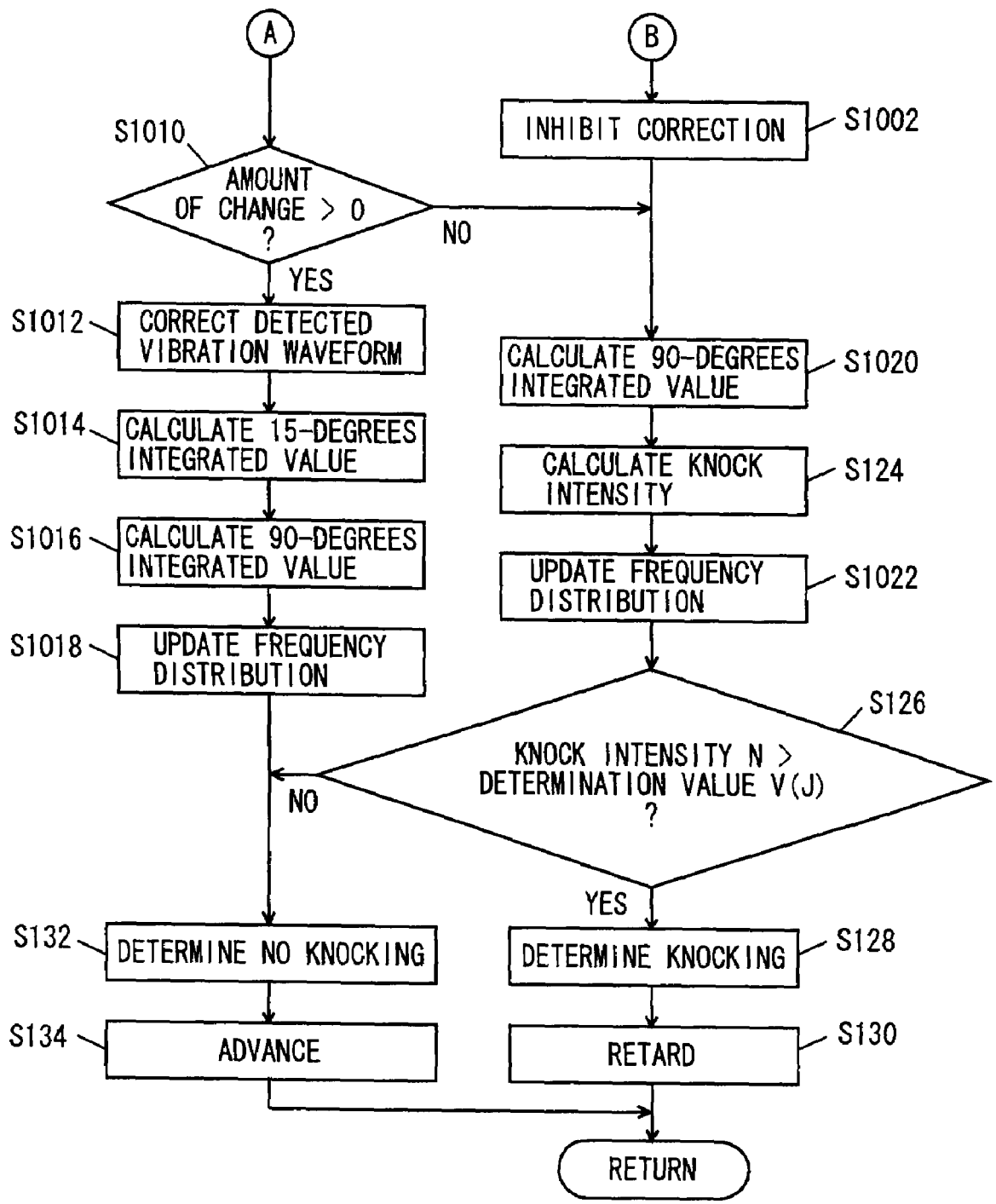
FIG. 31 is a (second) flowchart representing a control structure of a program executed by engine ECU as the knock determination device in accordance with the tenth embodiment of the present invention.

Referring to FIGS. 30 and 31, the control structure of the program executed by engine ECU 200 as the knock determination device in accordance with the present embodiment will be described. The same processes as those of the first embodiment above are denoted by the same step numbers. Therefore, detailed description thereof will not be repeated.

At S1000, engine ECU 200 determines whether or not the 15-degrees integrated values of all the ranges specified as ranges of large 15-degrees integrated values have changed because of a factor other than knocking. If 15-degrees integrated values have changed because of a factor other than knocking in all the ranges (YES at S1000), the process proceeds to S1010. If not (NO at S1000), the process proceeds to S1002. At S1002, engine ECU 200 inhibits correction of vibration waveform.

At S1010, engine ECU 200 determines whether the amount of change of 15-degrees integrated value (present 15-degrees integrated value—last 15-degrees integrated value) in the range specified as the range of large 15-degrees integrated value is a positive value or not. If the amount of change is positive (YES at S1010), the process proceeds to S1012. If not (NO at S1010), the process proceeds to S1020.

At S1012, engine ECU 200 corrects the detected vibration waveform. At S1014, engine ECU 200 calculates the 15-degrees integrated value of the corrected vibration waveform. At S1016, engine ECU 200 calculates the sum of 15-degrees integrated values of the corrected vibration waveform, that is, 90-degrees integrated value of the corrected vibration waveform.

At S1018, engine ECU 200 updates the frequency distribution of intensity value LOG(V), using the 90-degrees integrated value of corrected vibration waveform. By updating the frequency distribution, calculation of BGL, calculation of knock determination level V(KD) and correction of determination value V(J) are executed.

At S1020, engine ECU 200 calculates the 90-degrees integrated value of the uncorrected vibration waveform. At S1022, engine ECU 200 updates frequency distribution of intensity value LOG(V), using the 90-degrees integrated value calculated without correcting the vibration waveform.

At S1030, engine ECU 200 determines whether knock intensity N is larger than the determination value V(J) or not. If the knock intensity N is larger than the determination value V(J) (YES at S1040), the process proceeds to step S128. If not (NO at S1040), the process proceeds to S132.

An operation of engine ECU 200 as the knock determination device according to the present embodiment based on the above-described configuration and flowchart will be described.

Figure 32:
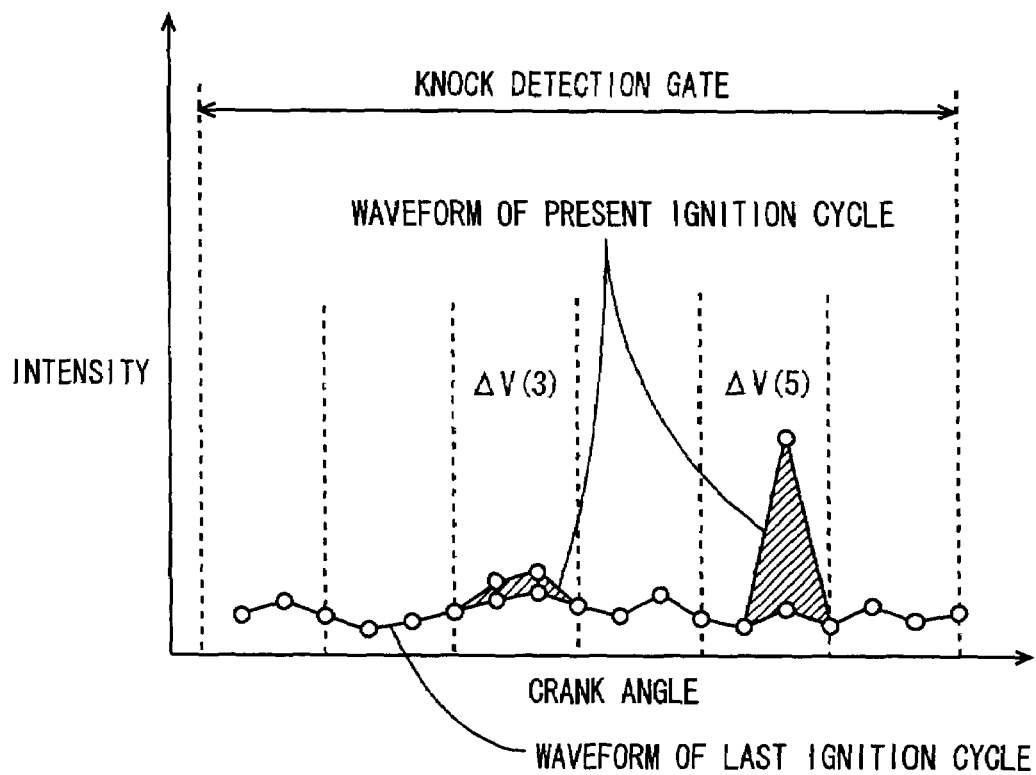
FIG. 32 is a (fifth) diagram representing amount of change of 15-degrees integrated value.

As shown by hatching in FIG. 32, if the amount of change in 15-degrees integrated value is large in the range near the end point of knock detection gate, that is, near the crank angle of 90 degrees, the crank angle in which the intensity peaks can be specified from the retarded side one of two ranges obtained by equally dividing the knock detection gate by two.

It is known that knock occurs near the top dead center in engine 100. In other words, vibration that occurs near the crank angle of 90° is caused not by knocking.

Therefore, if the range specified as the range in which the amount of change in 15-degrees integrated value is larger exists in the retarded side one of the ranges obtained by equally dividing the knock detection gate by two, it is determined that 15-degrees integrated value has changed not because of knocking. If the calculated coefficient of correlation K is not higher than the threshold value K(0), it is determined that 15-degrees integrated value has changed not because of knocking. Here, it is assumed that 15-degrees integrated value is determined to have changed not because of knocking in each of the specified ranges (YES at S1000).

Figure 33:
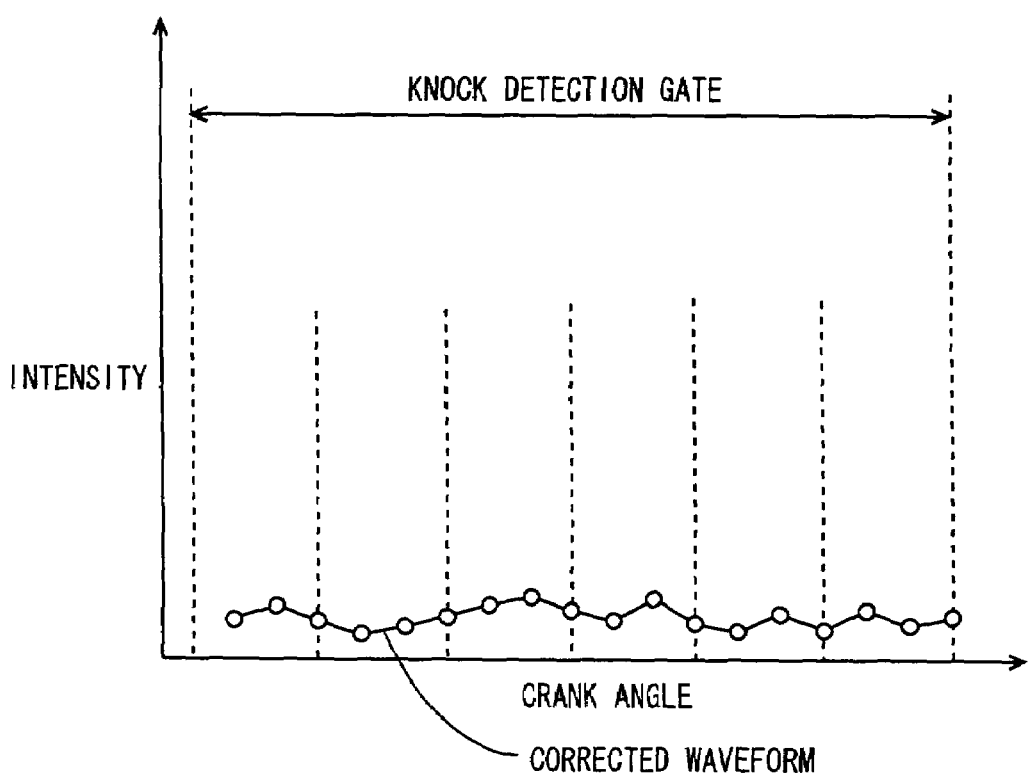
FIG. 33 shows corrected vibration waveform.

If the amount of change in 15-degrees integrated value is positive (YES at S1010), the vibration waveform is corrected such that the 15-degrees integrated value in the specified range becomes equal to the 15-degrees integrated value calculated in the last ignition cycle (S1012). Specifically, the hatched portion in FIG. 32 is removed. As a result, a waveform such as shown in FIG. 33 is obtained.

The 15-degrees integrated value of the corrected waveform is calculated (S1014). Further, 90-degrees integrated value of the corrected vibration waveform is calculated (S1016). Using the 90-degrees integrated value, frequency distribution of intensity value LOG(V) is updated (S1018). By updating the frequency distribution, calculation of BGL, calculation of knock determination level V(KD) and correction of determination value V(J) are executed.

In this manner, if a mechanical vibration of high intensity occurs abruptly, it is possible to determine whether knock has occurred or not using the vibration waveform with the intensity of such a vibration removed. Therefore, whether knock has occurred or not can be determined using the vibration waveform not much influenced by the intensity increased not because of knocking. As a result, erroneous determination as to whether knock has occurred or not can be reduced.

On the contrary, if the 15-degrees integrated value of at least one of the plurality of ranges specified as crank angle ranges in which the amount of change in 15-degrees integrated value is large is determined to have changed because of knocking, correction of vibration waveform is inhibited (S1002).

Further, 90-degrees integrated value of the uncorrected vibration waveform is calculated (S1020). Using the 90-degrees integrated value calculated without correcting vibration waveform, the frequency distribution of intensity value LOG (V) is updated (S1022).

Further, knock intensity N is calculated (S1124). If knock intensity N is larger than the determination value V(J) (YES at S1030), it is determined that knock has occurred (S128), and the ignition timing is retarded (S130). If the knock intensity N is not larger than the determination value V(J) (NO at S1030), it is determined that knock has not occurred (S132), and the ignition timing is advanced (S134).

As described above, in engine ECU 1000 as the controller in accordance with the present embodiment, if it is determined that 15-degrees integrated value has changed not because of knocking, the detected vibration waveform is corrected such that the amount of change in 15-degrees integrated value becomes smaller. Using the 90-degrees integrated value of the corrected vibration waveform, frequency distribution of intensity value LOG(V) is updated. Therefore, if a mechanical vibration of high intensity occurs abruptly, it is possible to determine whether knock has occurred or not using the vibration waveform with the intensity of such a vibration removed. Therefore, whether knock has occurred or not can be determined using the vibration waveform not much influenced by the intensity increased not because of knocking. As a result, erroneous determination as to whether knock has occurred or not can be reduced.

In place of the difference between the 15-degrees integrated value of the present ignition cycle and the 15-degrees integrated value of the last ignition cycle, an absolute value of the difference between the 15-degrees integrated value of the present ignition cycle and the 15-degrees integrated value of the last ignition cycle may be used as the amount of change in 15-degrees integrated value.

As in the eighth embodiment described above, the difference or the absolute value of difference between the 15-degrees integrated value of the present ignition cycle and the operation value obtained from the past 15-degrees integrated value using smoothing method such as exponential smoothing, simple moving average or a filter (low pass filter), that is, the operation value obtained by smoothing the 15-degrees integrated value, may be detected as the amount of change in 15-degrees integrated value. In such a case, the detected vibration waveform may be corrected such that the 15-degrees integrated value of the range in which the 15-degrees integrated value is determined to have changed not because of knocking comes to have the same value as the smoothed operation value.

Further, even when it is determined that 15-degrees integrated value of at least one of the plurality of ranges specified as the crank angle ranges having large amount of change in 15-degrees integrated value has changed because of knocking, the vibration waveform may be corrected in a range in which 15-degrees integrated value is determined to have changed not because of knocking.

Other Embodiments

The first to tenth embodiments described above may be used in arbitrary combination.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A knock determination device for an internal combustion engine, comprising:
    a knock sensor detecting intensity of vibration of said internal combustion engine; and
    an operation unit; wherein
    said operation unit detects a waveform of vibration of said internal combustion engine based on the detected intensity,
    calculates, for each of a predetermined plurality of crank angle ranges, an integrated value integrating the vibration intensity of said waveform,
    detects an amount of change in said integrated value between ignition cycles, based on a difference between said integrated value and a predetermined value,
    specifies a predetermined number of crank angle ranges in which the amount of change in said integrated value is larger, among said plurality of crank angle ranges,
    specifies a crank angle having an intensity higher than the intensity in a neighboring crank angle, in a search range determined with reference to a specified crank angle range, and
    while a timing at which intensity becomes the highest in a waveform model defined as a reference of vibration in said internal combustion engine is matched with the specified crank angle, based on a result of comparison between the waveform and the waveform model in this state, determines whether knock has occurred in the internal combustion engine or not.

2. The knock determination device for an internal combustion engine according to claim 1, wherein
    said operation unit determines that knock has not occurred in said internal combustion engine if said specified crank angle is in a predetermined range.

3. The knock determination device for an internal combustion engine according to claim 1, wherein
    a range same as said specified crank angle range is determined to be said search range.

4. The knock determination device for an internal combustion engine according to claim 1, wherein
    a range including said specified crank angle range and wider than said specified crank angle range is determined to be said search range.

5. The knock determination device for an internal combustion engine according to claim 4, wherein
    said operation unit determines that knock has not occurred in said internal combustion engine if a crank angle having higher intensity than a neighboring crank angle does not exist in said search range.

6. The knock determination device for an internal combustion engine according to claim 1, wherein
    said operation unit detects the amount of change in said integrated value between ignition cycles, based on an absolute value of difference between said integrated value and said predetermined value.

7. The knock determination device for an internal combustion engine according to claim 1, wherein
    said operation unit calculates ratio of the amount of change of said integrated value with respect to a sum of amounts of change in said integrated value; and
    a number corresponding to the calculated ratio is determined to be said predetermined number.

8. The knock determination device for an internal combustion engine according to claim 7, wherein
    if at least one of said ratios is larger than a predetermined ratio, 1 is determined to be said predetermined number.

9. The knock determination device for an internal combustion engine according to claim 1, wherein
    vibration intensity and said waveform of said internal combustion engine are detected in a plurality of ignition cycles;
    said integrated value is calculated for each ignition cycle; and
    said predetermined value is an integrated value of an ignition cycle preceding the ignition cycle in which the waveform to be compared with said waveform model is detected.

10. The knock determination device for an internal combustion engine according to claim 9, wherein
    said predetermined value is an integrated value of an ignition cycle preceding the ignition cycle in which the waveform to be compared with said waveform model is detected and satisfying a condition that maximum vibration intensity is smaller than a predetermined intensity.

11. The knock determination device for an internal combustion engine according to claim 9, wherein
    said predetermined value is an integrated value of an ignition cycle preceding the ignition cycle in which the waveform to be compared with said waveform model is detected and being any one of a plurality of ignition cycles continuously satisfying, for more than a predetermined number of times, the condition that maximum vibration intensity is larger than a predetermined intensity.

12. The knock determination device for an internal combustion engine according to claim 1, wherein
said predetermined value is an operation value obtained by smoothing said integrated value.

13. The knock determination device for an internal combustion engine according to claim 12, wherein
said predetermined value is an operation value obtained by smoothing said integrated value in an ignition cycle of which maximum vibration intensity is smaller than a predetermined intensity.

14. The knock determination device for an internal combustion engine according to claim 1, wherein
said operation unit calculates a value corresponding to a difference between said waveform and said waveform model such that the value becomes larger as the difference between said waveform and said waveform model becomes smaller, and
when the value corresponding to the difference becomes larger than a threshold value, determines that knock has occurred.

15. A knock determination method for an internal combustion engine, comprising the steps of:
detecting intensity of vibration of said internal combustion engine;
detecting waveform of vibration of said internal combustion engine based on the detected intensity;
calculating, for each of a predetermined plurality of crank angle ranges, an integrated value integrating the vibration intensity of said waveform;
detecting an amount of change in said integrated value between ignition cycles, based on a difference between said integrated value and a predetermined value;
specifying a predetermined number of crank angle ranges in which the amount of change in said integrated value is larger, among said plurality of crank angle ranges;
specifying a crank angle having an intensity higher than the intensity in a neighboring crank angle, in a search range determined with reference to a specified crank angle range; and
while a timing at which intensity becomes the highest in a waveform model defined as a reference of vibration in said internal combustion engine is matched with the specified crank angle, based on a result of comparison between the waveform and the waveform model in this state, determining whether knock has occurred in the internal combustion engine or not.

16. The knock determination method for an internal combustion engine according to claim 15, further comprising the step of determining that knock has not occurred in said internal combustion engine, if said specified crank angle is in a predetermined range.

17. The knock determination method for an internal combustion engine according to claim 15, wherein
a range same as said specified crank angle range is determined to be said search range.

18. The knock determination method for an internal combustion engine according to claim 15, wherein
a range including said specified crank angle range and wider than said specified crank angle range is determined to be said search range.

19. The knock determination method for an internal combustion engine according to claim 18, further comprising the step of
determining that knock has not occurred in said internal combustion engine, if a crank angle having higher intensity than a neighboring crank angle does not exist in said search range.

20. The knock determination method for an internal combustion engine according to claim 15, wherein
said step of detecting amount of change in said integrated value includes the step of detecting the amount of change in said integrated value between ignition cycles, based on an absolute value of difference between said integrated value and said predetermined value.

21. The knock determination method for an internal combustion engine according to claim 15, further comprising the step of calculating ratio of the amount of change of said integrated value with respect to a sum of amounts of change in said integrated value; wherein
a number corresponding to the calculated ratio is determined to be said predetermined number.

22. The knock determination method for an internal combustion engine according to claim 21, wherein
if at least one of said ratios is larger than a predetermined ratio, 1 is determined to be said predetermined number.

23. The knock determination method for an internal combustion engine according to claim 15, wherein
vibration intensity and said waveform of said internal combustion engine are detected in a plurality of ignition cycles;
said integrated value is calculated for each ignition cycle; and
said predetermined value is an integrated value of an ignition cycle preceding the ignition cycle in which the waveform to be compared with said waveform model is detected.

24. The knock determination method for an internal combustion engine according to claim 23, wherein
said predetermined value is an integrated value of an ignition cycle preceding the ignition cycle in which the waveform to be compared with said waveform model is detected and satisfying a condition that maximum vibration intensity is smaller than a predetermined intensity.

25. The knock determination method for an internal combustion engine according to claim 23, wherein
said predetermined value is an integrated value of an ignition cycle preceding the ignition cycle in which the waveform to be compared with said waveform model is detected and being any one of a plurality of ignition cycles continuously satisfying, for more than a predetermined number of times, the condition that maximum vibration intensity is larger than a predetermined intensity.

26. The knock determination method for an internal combustion engine according to claim 15, wherein
said predetermined value is an operation value obtained by smoothing said integrated value.

27. The knock determination method for an internal combustion engine according to claim 26, wherein
said predetermined value is an operation value obtained by smoothing said integrated value in an ignition cycle of which maximum vibration intensity is smaller than a predetermined intensity.

28. The knock determination method for an internal combustion engine according to claim 15, further comprising the step of
calculating a value corresponding to a difference between said waveform and said waveform model such that the value becomes larger as the difference between said waveform and said waveform model becomes smaller; wherein said step of determining whether knock occurred or not includes the step of determining, when the value corresponding to the difference becomes larger than a threshold value, that knock has occurred.

29. A knock determination device for an internal combustion engine, comprising:

means for detecting intensity of vibration of said internal combustion engine;

means for detecting waveform of vibration of said internal combustion engine based on the detected intensity;

means for calculating, for each of a predetermined plurality of crank angle ranges, an integrated value integrating the vibration intensity of said waveform;

detecting means for detecting an amount of change in said integrated value between ignition cycles, based on a difference between said integrated value and a predetermined value;

first specifying means for specifying a predetermined number of crank angle ranges in which the amount of change in said integrated value is larger, among said plurality of crank angle ranges;

second specifying means for specifying a crank angle having an intensity higher than the intensity in a neighboring crank angle, in a search range determined with reference to a specified crank angle range; and determining means for determining, while a timing at which intensity becomes the highest in a waveform model defined as a reference of vibration in said internal combustion engine is matched with the specified crank angle, based on a result of comparison between the waveform and the waveform model in this state, whether knock has occurred in the internal combustion engine or not.

30. The knock determination device for an internal combustion engine according to claim 29, further comprising means for determining that knock has not occurred in said internal combustion engine, if said specified crank angle is in a predetermined range.

31. The knock determination device for an internal combustion engine according to claim 29, wherein a range same as said specified crank angle range is determined to be said search range.

32. The knock determination device for an internal combustion engine according to claim 29, wherein a range including said specified crank angle range and wider than said specified crank angle range is determined to be said search range.

33. The knock determination device for an internal combustion engine according to claim 32, further comprising means for determining that knock has not occurred in said internal combustion engine if a crank angle having higher intensity than a neighboring crank angle does not exist in said search range.

34. The knock determination device for an internal combustion engine according to claim 29, wherein said detecting means includes means for detecting the amount of change in said integrated value between ignition cycles, based on an absolute value of difference between said integrated value and said predetermined value.

35. The knock determination device for an internal combustion engine according to claim 29, further comprising means for calculating ratio of the amount of change of said integrated value with respect to a sum of amounts of change in said integrated value; wherein a number corresponding to the calculated ratio is determined to be said predetermined number.

36. The knock determination device for an internal combustion engine according to claim 35, wherein if at least one of said ratios is larger than a predetermined ratio, I is determined to be said predetermined number.

37. The knock determination device for an internal combustion engine according to claim 29, wherein vibration intensity and said waveform of said internal combustion engine are detected in a plurality of ignition cycles;

said integrated value is calculated for each ignition cycle; and said predetermined value is an integrated value of an ignition cycle preceding the ignition cycle in which the waveform to be compared with said waveform model is detected.

38. The knock determination device for an internal combustion engine according to claim 37, wherein said predetermined value is an integrated value of an ignition cycle preceding the ignition cycle in which the waveform to be compared with said waveform model is detected and satisfying a condition that maximum vibration intensity is smaller than a predetermined intensity.

39. The knock determination device for an internal combustion engine according to claim 37, wherein said predetermined value is an integrated value of an ignition cycle preceding the ignition cycle in which the waveform to be compared with said waveform model is detected and being any one of a plurality of ignition cycles continuously satisfying, for more than a predetermined number of times, the condition that maximum vibration intensity is larger than a predetermined intensity.

40. The knock determination device for an internal combustion engine according to claim 29, wherein said predetermined value is an operation value obtained by smoothing said integrated value.

41. The knock determination device for an internal combustion engine according to claim 40, wherein said predetermined value is an operation value obtained by smoothing said integrated value in an ignition cycle of which maximum vibration intensity is smaller than a predetermined intensity.

42. The knock determination device for an internal combustion engine according to claim 29, further comprising means for calculating a value corresponding to a difference between said waveform and said waveform model such that the value becomes larger as the difference between said waveform and said waveform model becomes smaller; wherein said determining means includes means for determining, when the value corresponding to the difference becomes larger than a threshold value, that knock has occurred.

43. A knock determination device for an internal combustion engine, comprising:

a knock sensor detecting intensity of vibration of said internal combustion engine; and an operation unit; wherein said operation unit detects a waveform of vibration of said internal combustion engine based on the detected intensity, calculates, for each of a predetermined plurality of crank angle ranges, an integrated value integrating the vibration intensity of said waveform, detects an amount of change in said integrated value between ignition cycles for each of said plurality of crank angle ranges, specifies a predetermined number of crank angle ranges in which the amount of change in said integrated value is larger, among said plurality of crank angle ranges, determines whether the integrated value in said specified range has changed not because of knocking, if it is determined that the integrated value in said specified range has changed not because of knocking, corrects said detected vibration waveform such that amount of change in the integrated value in said specified range becomes smaller, calculates for each of said plurality of crank angle ranges, an integrated value integrating vibration intensities of said corrected waveform, and determines whether knock has occurred or not using a sum of each of said integrated values of said corrected waveform.

44. The knock determination device for an internal combustion engine according to claim 43, wherein if it is determined that the integrated value in said specified range has changed not because of knocking, said operation unit corrects said detected vibration waveform such that the integrated value of said specified range becomes equal to an integrated value calculated in the last ignition cycle, so that the amount of change of said integrated value becomes smaller.

45. The knock determination device for an internal combustion engine according to claim 44, wherein said operation unit detects the amount of change of said integrated value based on a difference of said integrated values of continuous ignition cycles.

46. The knock determination device for an internal combustion engine according to claim 44, wherein said operation unit detects the amount of change of said integrated value based on an absolute value of difference of said integrated values of continuous ignition cycles.

47. The knock determination device for an internal combustion engine according to claim 43, wherein said operation unit calculates an operation value by smoothing said integrated value for each of said plurality of crank angle ranges, and if it is determined that the integrated value in said specified range has changed not because of knocking, corrects said detected vibration waveform such that the integrated value of said specified range becomes equal to said operation value, so that the amount of change of said integrated value becomes smaller.

48. The knock determination device for an internal combustion engine according to claim 47, wherein said operation unit detects the amount of change of said integrated value based on a difference between said integrated value and said operation value.

49. The knock determination device for an internal combustion engine according to claim 47, wherein said operation unit detects the amount of change of said integrated value based on an absolute value of difference between said integrated value and said operation value.

50. The knock determination device for an internal combustion engine according to claim 43, wherein said operation unit specifies a crank angle having an intensity higher than the intensity of a neighboring crank angle, in a search range determined with reference to said specified range, and while a timing at which intensity becomes the highest in a waveform model defined as a reference of vibration in said internal combustion engine is matched with the specified crank angle, based on a result of comparison between the waveform and the waveform model in this state, determines whether the integrated value in said specified range has changed not because of knocking.

51. The knock determination device for an internal combustion engine according to claim 50, wherein said operation unit calculates a coefficient corresponding to a difference between said waveform and said waveform model such that the coefficient becomes larger as the difference between said waveform and said waveform model becomes smaller, and determines, if said coefficient is larger than a threshold value, that the integrated value in the specified range has changed because of knocking, and determines, if said coefficient is smaller than the threshold, that the integrated value in the specified range has changed not because of knocking.

52. The knock determination device for an internal combustion engine according to claim 43, wherein said operation unit determines, if said specified crank angle is in a predetermined range, that the integrated value in said specified range has changed not because of knocking.

53. The knock determination device for an internal combustion engine according to claim 43, wherein said operation unit specifies a plurality of crank angle ranges in which the amount of change in said integrated value is larger, among said plurality of crank angle ranges, and said operation unit determines whether the integrated values in said plurality of specified ranges have changed not because of knocking.

54. The knock determination device for an internal combustion engine according to claim 53, wherein if it is determined that the integrated value in at least one of said plurality of specified ranges has changed because of knocking, said operation unit inhibits correction of said detected waveform.

55. The knock determination device for an internal combustion engine according to claim 53, wherein if it is determined that the integrated value in at least one of said plurality of specified ranges has changed not because of knocking, said operation unit corrects said detected vibration waveform such that the amount of change in the integrated value in the range in which said integrated value is determined to have changed not because of knocking becomes smaller.

56. The knock determination device for an internal combustion engine according to claim 43, wherein said operation unit corrects a determination value used for determining whether knock has occurred or not, using a sum of said integrated values of said corrected waveform, and determines whether knock has occurred or not based on a result of comparison between vibration intensity of said internal combustion engine and said corrected determination value, and thereby determines whether knock has occurred or not using the sum of each of said integrated values of said corrected waveform.

57. A knock determination method for an internal combustion engine, comprising the steps of:
  detecting intensity of vibration of said internal combustion engine;
  detecting waveform of vibration of said internal combustion engine based on the detected intensity;
  calculating, for each of a predetermined plurality of crank angle ranges, an integrated value integrating the vibration intensity of said waveform;
  detecting an amount of change in said integrated value between ignition cycles for each of said plurality of crank angle ranges;
  specifying a predetermined number of crank angle ranges in which the amount of change in said integrated value is larger, among said plurality of crank angle ranges;
  determining whether the integrated value in said specified ranges has changed not because of knocking,
  if it is determined that the integrated value in said specified range has changed not because of knocking, correcting said detected vibration waveform such that amount of change in the integrated value in said specified range becomes smaller;
  calculating, for each of said plurality of crank angle ranges, an integrated value integrating vibration intensities of said corrected waveform; and
  determining whether knock has occurred or not using a sum of each of said integrated values of said corrected waveform.

58. The knock determination method for an internal combustion engine according to claim 57, wherein
  said step of correcting detected vibration waveform includes the step of correcting, if it is determined that the integrated value in said specified range has changed not because of knocking, said detected vibration waveform such that the integrated value of said specified range becomes equal to an integrated value calculated in the last ignition cycle, so that the amount of change of said integrated value becomes smaller.

59. The knock determination method for an internal combustion engine according to claim 58, wherein
  said step of detecting the amount of change in the integrated value includes the step of detecting the amount of change of said integrated value based on a difference of said integrated values of continuous ignition cycles.

60. The knock determination method for an internal combustion engine according to claim 58, wherein
  said step of detecting the amount of change in the integrated value includes the step of detecting the amount of change of said integrated value based on an absolute value of difference of said integrated values of continuous ignition cycles.

61. The knock determination method for an internal combustion engine according to claim 57, further comprising the step of
  calculating an operation value by smoothing said integrated value for each of said plurality of crank angle ranges; wherein
  said step of correcting said detected vibration waveform includes the step of correcting, if it is determined that the integrated value in said specified range has changed not because of knocking, said detected vibration waveform such that the integrated value of said specified range becomes equal to said operation value, so that the amount of change of said integrated value becomes smaller.

62. The knock determination method for an internal combustion engine according to claim 61, wherein
  said step of detecting the amount of change in the integrated value includes the step of detecting the amount of change of said integrated value based on a difference between said integrated value and said operation value.

63. The knock determination method for an internal combustion engine according to claim 61, wherein
  said step of detecting the amount of change in the integrated value includes the step of detecting the amount of change of said integrated value based on an absolute value of difference between said integrated value and said operation value.

64. The knock determination method for an internal combustion engine according to claim 57, further comprising the step of
  specifying a crank angle having an intensity higher than the intensity in a neighboring crank angle, in a search range determined with reference to said specified range; wherein
  said step of determining whether said integrated value has changed not because of knocking includes the step of determining, while a timing at which intensity becomes the highest in a waveform model defined as a reference of vibration in said internal combustion engine is matched with the specified crank angle, based on a result of comparison between the waveform and the waveform model in this state, whether the integrated value in said specified range has changed not because of knocking.

65. The knock determination method for an internal combustion engine according to claim 64, further comprising the step of
  calculating a coefficient corresponding to a difference between said waveform and said waveform model such that the coefficient becomes larger as the difference between said waveform and said waveform model becomes smaller; wherein
  said step of determining whether said integrated value has changed not because of knocking includes the steps of
  determining, if said coefficient is larger than a threshold value, that the integrated value in the specified range has changed because of knocking, and
  determining, if said coefficient is smaller than the threshold, that the integrated value in the specified range has changed not because of knocking.

66. The knock determination method for an internal combustion engine according to claim 57, wherein
  said step of determining whether said integrated value has changed not because of knocking includes the step of determining, if said specified crank angle is in a predetermined range, that the integrated value in said specified range has changed not because of knocking.

67. The knock determination method for an internal combustion engine according to claim 57, wherein
  said step of specifying the range in which the amount of change in said integrated value is larger includes the step of specifying a plurality of crank angle ranges in which the amount of change in said integrated value is larger, among said plurality of crank angle ranges; and
  said step of determining whether said integrated value has changed not because of knocking includes the step of determining whether the integrated values in said plurality of specified ranges have changed not because of knocking.

68. The knock determination method for an internal combustion engine according to claim 67, further comprising the step of inhibiting, if it is determined that the integrated value in at least one of said plurality of specified ranges has changed because of knocking, correction of said detected waveform.

69. The knock determination method for an internal combustion engine according to claim 67, wherein
said step of correcting the detected vibration waveform includes the step of correcting, if it is determined that the integrated value in at least one of said plurality of specified ranges has changed not because of knocking, said detected vibration waveform such that the amount of change in the integrated value in the range in which said integrated value is determined to have changed not because of knocking becomes smaller.

70. The knock determination method for an internal combustion engine according to claim 57, further comprising the step of correcting a determination value used for determining whether knock has occurred or not, using a sum of said integrated values of said corrected waveform; wherein
said step of determining whether knock has occurred or not includes the step of determining whether knock has occurred or not based on a result of comparison between vibration intensity of said internal combustion engine and said corrected determination value, and thereby determining whether knock has occurred or not using the sum of each of said integrated values of said corrected waveform.

71. A knock determination device for an internal combustion engine, comprising:
means for detecting intensity of vibration of said internal combustion engine;
means for detecting waveform of vibration of said internal combustion engine based on the detected intensity;
means for calculating, for each of a predetermined plurality of crank angle ranges, an integrated value integrating the vibration intensity of said waveform;
detecting means for detecting an amount of change in said integrated value between ignition cycles for each of said plurality of crank angle ranges;
specifying means for specifying a predetermined number of crank angle ranges in which the amount of change in said integrated value is larger, among said plurality of crank angle ranges;
first determining means for determining whether the integrated value in said specified ranges has changed not because of knocking;
correcting means for correcting, if it is determined that the integrated value in said specified range has changed not because of knocking, said detected vibration waveform such that amount of change in the integrated value in said specified ranges becomes smaller;
means for calculating for each of said plurality of crank angle ranges, an integrated value integrating vibration intensities of said corrected waveform; and
second determining means for determining whether knock has occurred or not using a sum of each of said integrated values of said corrected waveform.

72. The knock determination device for an internal combustion engine according to claim 71, wherein
said correcting means includes means for correcting, if it is determined that the integrated value in said specified ranges has changed not because of knocking, said detected vibration waveform such that the integrated value of said specified range becomes equal to an integrated value calculated in the last ignition cycle, so that the amount of change of said integrated value becomes smaller.

73. The knock determination device for an internal combustion engine according to claim 72, wherein
said detecting means includes means for detecting the amount of change of said integrated value based on a difference of said integrated values of continuous ignition cycles.

74. The knock determination device for an internal combustion engine according to claim 72, wherein
said detecting means includes means for detecting the amount of change of said integrated value based on an absolute value of difference of said integrated values of continuous ignition cycles.

75. The knock determination device for an internal combustion engine according to claim 71, further comprising means for calculating an operation value by smoothing said integrated value for each of said plurality of crank angle ranges; wherein
said correcting means includes means for correcting, if it is determined that the integrated value in said specified range has changed not because of knocking, said detected vibration waveform such that the integrated value of said specified range becomes equal to said operation value, so that the amount of change of said integrated value becomes smaller.

76. The knock determination device for an internal combustion engine according to claim 75, wherein
said detecting means includes means for detecting the amount of change of said integrated value based on a difference between said integrated value and said operation value.

77. The knock determination device for an internal combustion engine according to claim 75, wherein
said detecting means includes means for detecting the amount of change of said integrated value based on an absolute value of difference between said integrated value and said operation value.

78. The knock determination device for an internal combustion engine according to claim 71, further comprising means for specifying a crank angle having an intensity higher than the intensity of a neighboring crank angle, in a search range determined with reference to said specified range; wherein
said first determining means includes means for determining, while a timing at which intensity becomes the highest in a waveform model defined as a reference of vibration in said internal combustion engine is matched with the specified crank angle, based on a result of comparison between the waveform and the waveform model in this state, whether the integrated value in said specified range has changed not because of knocking.

79. The knock determination device for an internal combustion engine according to claim 78, further comprising means for calculating a coefficient corresponding to a difference between said waveform and said waveform model such that the coefficient becomes larger as the difference between said waveform and said waveform model becomes smaller; wherein
said first determining means includes
means for determining, if said coefficient is larger than a threshold value, that the integrated value in the specified range has changed because of knocking, and
means for determining, if said coefficient is smaller than the threshold, that the integrated value in the specified range has changed not because of knocking.

80. The knock determination device for an internal combustion engine according to claim 71, wherein
said first determining means includes means for determining, if said specified crank angle is in a predetermined range, that the integrated value in said specified range has changed not because of knocking.

81. The knock determination device for an internal combustion engine according to claim 71, wherein
said specifying means includes means for specifying a plurality of crank angle ranges in which the amount of change in said integrated value is larger, among said plurality of crank angle ranges; and
said first determining means includes means for determining whether the integrated values in said plurality of specified ranges have changed not because of knocking.

82. The knock determination device for an internal combustion engine according to claim 81, further comprising
means for inhibiting, if it is determined that the integrated value in at least one of said plurality of specified ranges has changed because of knocking, correction of said detected waveform.

83. The knock determination device for an internal combustion engine according to claim 81, wherein
said correcting means includes means for correcting, if it is determined that the integrated value in at least one of said plurality of specified ranges has changed not because of knocking, said detected vibration waveform such that the amount of change in the integrated value in the range in which said integrated value is determined to have changed not because of knocking becomes smaller.

84. The knock determination device for an internal combustion engine according to claim 71, further comprising
means for correcting a determination value used for determining whether knock has occurred or not, using a sum of said integrated values of said corrected waveform; wherein
said second determining means includes means for determining whether knock has occurred or not based on a result of comparison between vibration intensity of said internal combustion engine and said corrected determination value, and thereby determining whether knock has occurred or not using the sum of each of said integrated values of said corrected waveform.

* * * * *